(12) United States Patent
Yamasaki et al.

(10) Patent No.: US 11,398,041 B2
(45) Date of Patent: Jul. 26, 2022

(54) IMAGE PROCESSING APPARATUS AND METHOD

(71) Applicant: SONY CORPORATION, Tokyo (JP)

(72) Inventors: Rio Yamasaki, Tokyo (JP); Hiromasa Doi, Kanagawa (JP); Takaaki Nakagawa, Kanagawa (JP); Hideo Okamoto, Kanagawa (JP); Kazuhiro Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 288 days.

(21) Appl. No.: 15/754,049

(22) PCT Filed: Aug. 26, 2016

(86) PCT No.: PCT/JP2016/074917
§ 371 (c)(1),
(2) Date: Feb. 21, 2018

(87) PCT Pub. No.: WO2017/043332
PCT Pub. Date: Mar. 16, 2017

(65) Prior Publication Data
US 2019/0012796 A1 Jan. 10, 2019

(30) Foreign Application Priority Data
Sep. 10, 2015 (JP) .............................. JP2015-178329

(51) Int. Cl.
*G01B 11/22* (2006.01)
*G06T 7/11* (2017.01)
(Continued)

(52) U.S. Cl.
CPC ................ *G06T 7/50* (2017.01); *G01B 11/22* (2013.01); *G06T 7/11* (2017.01); *G06T 7/12* (2017.01); *G06T 2207/10028* (2013.01)

(58) Field of Classification Search
CPC ............. G01B 11/22; G06T 7/11; G06T 7/12; G06T 7/50; G06T 2207/10028
See application file for complete search history.

(56) References Cited

U.S. PATENT DOCUMENTS 5,182,775 A * 1/1993 Matsui .................. G06T 7/0004
706/912
6,453,052 B1 * 9/2002 Kurokawa ................ G06T 7/33
30/30

(Continued)

FOREIGN PATENT DOCUMENTS

CN 1918604 A 2/2007
CN 101639354 A 2/2010

(Continued)

OTHER PUBLICATIONS

Dai et al. ("Face-texture model based on SGLD and its application in face detection in a color scene," Pattern Recognition, vol. 29, Iss. 6, Jun. 1996) (Year: 1996).*

(Continued)

*Primary Examiner* — Yubin Hung
(74) *Attorney, Agent, or Firm* — Chip Law Group

(57) ABSTRACT

The present technology relates to an image processing apparatus and method that allow to more accurately identify image processing target areas in an image. An image processing apparatus of the present technology includes a determination unit that determines, on the basis of reliability information indicating reliability of depth information, whether to make a determination on the basis of the depth information, the determination being as to whether an area is a target area for predetermined image processing, and the depth information indicating a depth of an image. The present technology can be applied to, for example, an (Continued)

imaging apparatus that captures a subject, a server that processes a captured image, etc.

10 Claims, 32 Drawing Sheets

(51) Int. Cl.
  *G06T 7/12* (2017.01)
  *G06T 7/50* (2017.01)

(56) References Cited

U.S. PATENT DOCUMENTS

| | | | | |
|---|---|---|---|---|
| 6,577,759 | B1* | 6/2003 | Caron | G06K 9/342 382/164 |
| 6,754,367 | B1* | 6/2004 | Ito | G06K 9/00771 348/154 |
| 2003/0012277 | A1* | 1/2003 | Azuma | G06T 7/70 375/240.08 |
| 2005/0036709 | A1* | 2/2005 | Imai | H04N 1/6086 382/286 |
| 2006/0126933 | A1 | 6/2006 | Porikli | |
| 2006/0126941 | A1* | 6/2006 | Higaki | G06V 40/103 382/103 |
| 2008/0170787 | A1* | 7/2008 | Cheng | G06T 7/11 382/180 |
| 2009/0245579 | A1* | 10/2009 | Hu | G03B 13/00 382/103 |
| 2010/0026801 | A1 | 2/2010 | Williams et al. | |
| 2010/0142767 | A1* | 6/2010 | Fleming | G06T 7/11 382/117 |
| 2010/0208994 | A1* | 8/2010 | Yao | G06T 5/005 382/173 |
| 2011/0110585 | A1* | 5/2011 | Kang | G06K 9/00201 382/164 |
| 2011/0123113 | A1* | 5/2011 | Berretty | H04N 19/17 382/173 |
| 2011/0141306 | A1* | 6/2011 | Nakano | G06V 10/255 348/222.1 |
| 2012/0148151 | A1* | 6/2012 | Hamada | G06T 11/60 382/164 |
| 2012/0155717 | A1* | 6/2012 | Ma | G06F 16/5854 382/118 |
| 2013/0084006 | A1* | 4/2013 | Zhang | G06T 7/11 382/173 |
| 2013/0163813 | A1* | 6/2013 | Shoji | G06T 11/60 382/103 |
| 2013/0170742 | A1 | 7/2013 | Dai | |
| 2013/0251267 | A1* | 9/2013 | Kafuku | G06T 11/60 382/195 |
| 2014/0278403 | A1* | 9/2014 | Jacob | G06F 3/011 704/235 |
| 2014/0306982 | A1* | 10/2014 | Ollivier | G09G 5/026 345/589 |
| 2015/0254863 | A1* | 9/2015 | Kim | H04N 13/128 382/154 |
| 2016/0154993 | A1* | 6/2016 | Aarabi | G06T 7/11 382/118 |
| 2016/0375524 | A1* | 12/2016 | Hsu | B23K 31/02 228/8 |

FOREIGN PATENT DOCUMENTS

| | | | | |
|---|---|---|---|---|
| EP | 1697901 | A1 | 9/2006 | |
| EP | 2149883 | A1 | 2/2010 | |
| GB | 2465538 | A | 5/2010 | |
| JP | 2005-250712 | A | 9/2005 | |
| JP | 2006-031390 | A | 2/2006 | |
| JP | 2006301962 | A * | 11/2006 | |
| JP | 2007-148663 | A | 6/2007 | |
| JP | 2008-523454 | A | 7/2008 | |
| JP | 2010-041725 | A | 2/2010 | |
| JP | 2012-079251 | A | 4/2012 | |
| JP | 2013-140437 | A | 7/2013 | |
| JP | 2014-191400 | A | 10/2014 | |
| JP | 2015511339 | A * | 4/2015 | |
| KR | 20110090764 | A * | 8/2011 | |
| RU | 2009129556 | A | 2/2011 | |
| WO | WO-8911235 | A * | 11/1989 | A45D 44/005 |
| WO | 2006/064895 | A1 | 6/2006 | |

OTHER PUBLICATIONS

Wu et al. ("Face detection from color images using a fuzzy pattern matching method," IEEE Transactions on Pattern Analysis and Machine Intelligence, vol. 21, No. 6, pp. 557-563, 1999) (Year: 1999).*

Oggier et al. ("Miniature 3D TOF Camera for Real-Time Imaging," Proc. of Perception and Interactive Technologies, Jun. 2006) (Year: 2006).*

Mirante et al. ("A fast image segmentation algorithm using color and depth map," 3DTV Conference: The True Vision—Capture, Transmission and Display of 3D Video (3DTV-CON), May 16-18, 2011) (Year: 2011).*

Korting et al. ("A Resegmentation Approach for Detecting Rectangular Objects in High-Resolution Imagery," IEEE Geoscience and Remote Sensing Letters, vol. 8, Issue: 4, Jul. 2011) (Year: 2011).*

Rousset et al. ("Transferable Belief Model for hair mask segmentation," IEEE International Conference on Image Processing; Date of Conference: Sep. 26-29, 2010) (Year: 2010).*

International Search Report and Written Opinion of PCT Application No. PCT/JP2016/074917, dated Oct. 11, 2016, 11 pages.

* cited by examiner

IMAGE PROCESSING APPARATUS AND METHOD

CROSS REFERENCE TO RELATED APPLICATIONS

This application is a U.S. National Phase of International Patent Application No. PCT/JP2016/074917 filed on Aug. 26, 2016, which claims priority benefit of Japanese Patent Application No. JP 2015-178329 filed in the Japan Patent Office on Sep. 10, 2015. Each of the above-referenced applications is hereby incorporated herein by reference in its entirety.

TECHNICAL FIELD

The present technology relates to an image processing apparatus and method, and more particularly to an image processing apparatus and method that allow to more accurately identify image processing target areas in an image.

BACKGROUND ART

Conventionally, there is a method in which in a case where image processing such as cutting out of an image is performed on a part of an image, a partial area which is a target for the image processing is identified on the basis of depth information indicating a depth of the image.

However, the depth information may have a portion whose reliability is low depending on the characteristics of a distance measurement scheme. Thus, if a partial area which is a target for image processing is identified on the basis of the depth information with low reliability, the accuracy of the identification of the area may decrease.

Hence, other methods are considered. For example, it is proposed that for a pixel whose depth information is difficult to obtain, a moving image is divided in advance into a plurality of areas by color or luminance, and at an internal pixel, the depth information of a non-feature point is complemented using the depth information of a feature point on a per divided area basis (see, for example, Patent Document 1). In addition, it is proposed that for a boundary portion of an object, a recomputation for reducing a distance error is performed for the inside of an edge using edge detection in combination (see, for example, Patent Document 2).

CITATION LIST

Patent Document

Patent Document 1: Japanese Patent Application Laid-Open No. 2006-31390
Patent Document 2: Japanese Patent Application Laid-Open No. 2012-79251

SUMMARY OF THE INVENTION

Problems to be Solved by the Invention

However, these techniques are not always optimal and other methods are also sought.

The present technology is proposed in view of such circumstances, and an object of the present technology is to more accurately identify image processing target areas in an image.

Solutions to Problems

An image processing apparatus of the present technology is an image processing apparatus including a determination unit that determines, on the basis of reliability information indicating reliability of depth information, whether to make a determination on the basis of the depth information, the determination being as to whether an area is a target area for predetermined image processing, and the depth information indicating a depth of an image.

The determination unit can determine, on the basis of the depth information, whether an area whose reliability of depth information is higher than a predetermined threshold value is a target area for the image processing.

The determination unit can determine that an area whose depth is nearer than a predetermined threshold value is a target area for the image processing.

The determination unit can determine, on the basis of other information different than the depth information, whether an area whose reliability of depth information is not higher than a predetermined threshold value is a target area for the image processing.

The determination unit can determine whether the area is a target area for the image processing, on the basis of luminance information indicating a luminance of the image, the luminance information being used as the other information.

The determination unit can determine that an area whose luminance is lower than a predetermined threshold value is a target area for the image processing.

The determination unit can determine that an area having a luminance lower than the predetermined threshold value and adjacent to another target area for the image processing is a target area for the image processing.

The determination unit can determine whether the area is a target area for the image processing, on the basis of color information indicating a color of the image, the color information being used as the other information.

The determination unit can determine that an area whose color difference from a neighboring target area for the image processing is smaller than a predetermined threshold value is a target area for the image processing.

The determination unit can determine, on the basis of hairstyle model data representing a hairstyle model, that an area belonging to a hair area in the hairstyle model is a target area for the image processing, the hairstyle model data being used as the other information.

The determination unit can determine, on the basis of texture model data representing a texture model, that an area whose texture is similar to the texture model is a target area for the image processing, the texture model data being used as the other information.

The determination unit can recognize a shape of a subject belonging to the cut-out target area and determine that an area that can be estimated as a target for the image processing on the basis of the shape of the subject is a target area for the image processing, the shape of the subject being recognized as the other information.

The determination unit can determine, on a per single or plurality of pixels basis, whether to make the determination on the basis of the depth information, the determination being as to whether the area is a target area for the image processing.

The determination unit can create an image processing target map indicating a distribution of determination results as to whether areas are target areas for the image processing.

The image processing apparatus can further include a setting unit that sets the threshold values.

The image processing apparatus can further include an imaging unit that creates the image by capturing a subject.

The image processing apparatus can further include a generating unit that generates the depth information and the reliability information.

The image processing apparatus can further include a treatment unit that performs, as the image processing, cutting out of the target area for the image processing from the image on the basis of a determination result obtained by the determination unit, and synthesizing of the image having been cut out with another image to create a synthetic image.

The image processing apparatus can further include a sending unit that sends the synthetic image created by the treatment unit to another apparatus.

An image processing method of the present technology is an image processing method including determining, on the basis of reliability information indicating reliability of depth information, whether to make a determination on the basis of the depth information, the determination being as to whether an area is a target area for predetermined image processing, and the depth information indicating a depth of an image.

In the image processing apparatus and method of the present technology, it is determined, on the basis of reliability information indicating the reliability of depth information indicating a depth of an image, whether to make a determination on the basis of the depth information, the determination being as to whether an area is a target area for predetermined image processing.

Effects of the Invention

According to the present technology, an image can be processed. In addition, according to the present technology, image processing target areas in an image can be more accurately identified.

MODE FOR CARRYING OUT THE INVENTION

Figure 1:
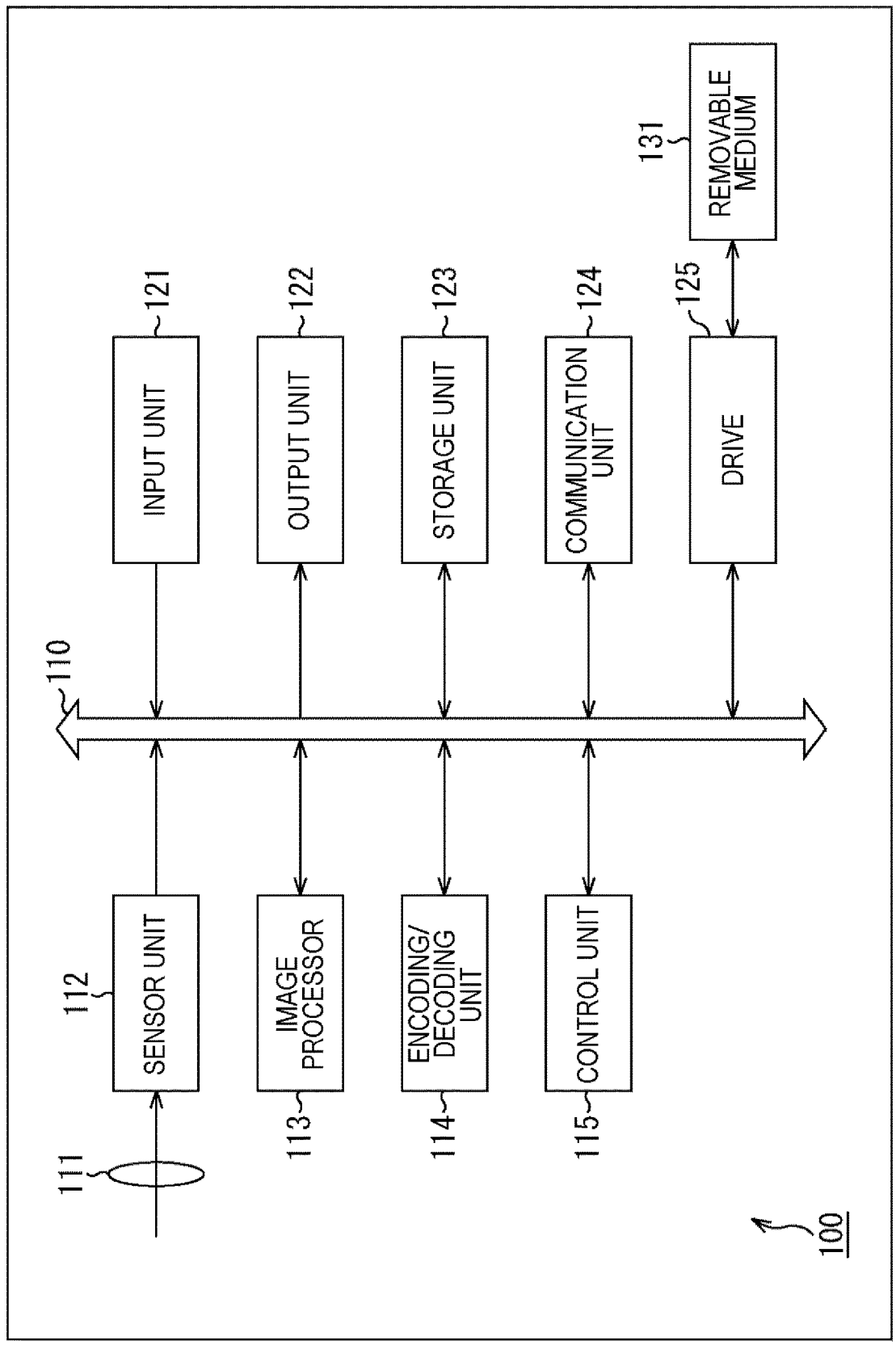
FIG. 1 is a block diagram showing an exemplary main configuration of an imaging apparatus.

Modes for carrying out the present disclosure (hereinafter, referred to as embodiments) will be described below. Note that description is made in the following order:

1. First embodiment (imaging apparatus: redetermination based on a luminance map)
2. Second embodiment (setting of threshold values)
3. Third embodiment (redetermination based on a color map)
4. Fourth embodiment (redetermination based on a hair-style model)
5. Fifth embodiment (redetermination based on a texture model)
6. Sixth embodiment (redetermination based on shape recognition)
7. Seventh embodiment (applications)

1. First Embodiment

<Identification of an Image Processing Target Area Based on Depth Information>

Conventionally, there is a method in which in a case where image processing such as cutting out of an image is performed on a part of an image, a partial area which is a target for the image processing is identified on the basis of depth information indicating a depth of the image.

For example, in a case where a given subject is captured to create a captured image, in general, in many cases, the captured image includes portions which are the foreground and background of the subject, in addition to the subject. In such a captured image, predetermined image processing may be performed only on a subject portion. For example, the subject portion may be identified in the captured image, and as image processing, attention may be focused on that portion as a tracking target or a monitoring target, or what the subject is (e.g., whether the subject is a person, a thing, etc.) may be recognized, or luminance, color, etc., may be adjusted, or zoom-in, zoom-out, deformation, etc., may be performed, or synthesizing with another image may be performed.

As described above, in many cases, portions that are not the subject in the captured image include images of a foreground, a background, etc., with different depths than the subject. Therefore, identifying the subject portion on the basis of depth information of the captured image is one of useful means. That is, for example, if a captured image is such that a subject and a portion that is not the subject have different depths, then by using depth information, it is highly likely that the subject portion and the portion that is not the subject can be easily identified.

However, the depth information may have a portion whose reliability is low depending on the characteristics of a distance measurement scheme used.

For distance measurement methods for generating depth information, there are various methods, e.g., a time of flight (TOF) scheme, a structured light scheme, a stereo matching scheme, a structure from motion (SfM) scheme, etc. For example, the TOF scheme is a scheme in which a target space is irradiated with near-infrared rays, reflected light from an object present in the target space is received, a period of time from when the near-infrared rays are irradiated to when the reflected light is received is measured, and a distance to the object in the target space is obtained on the basis of the period of time. In addition, for example, the structured light scheme is a scheme in which a predetermined projection pattern of near-infrared rays is projected onto an object present in a target space, and a shape (depth) of the object present in the target space is detected on the basis of the state of deformation of the projection pattern. Furthermore, for example, the stereo matching scheme is a scheme in which on the basis of parallax between two captured images which are obtained by capturing a subject from different positions, a distance to the subject is obtained. In addition, for example, the SfM scheme is a scheme in which using a plurality of captured images which are captured from different angles, a relationship between the images such as alignment of feature points is computed to perform optimization, by which depth detection is performed.

For example, in the case of schemes that perform distance measurement using near-infrared rays like the TOF scheme and the structured light scheme, in a low-luminance (dark) portion or a black color portion, a portion with a complex shape like head hair, a predetermined fabric portion such as cotton, etc., the reflection of near-infrared rays may become weak and thus the precision of depth measurement may decrease. In addition, in the case of schemes that perform distance measurement using captured images obtained from a plurality of positions/angles like the stereo matching scheme and the SfM scheme, the precision of depth measurement may decrease in a boundary portion of a subject in which occlusion is likely to occur, etc.

If identification of a partial area, which is a target for image processing, based on depth information is performed on such a location with low reliability of depth information, then the accuracy of the identification of that area may decrease.

Hence, other methods are considered. For example, Patent Document 1 proposes that for a pixel whose depth information is difficult to obtain, a moving image is divided in advance into a plurality of areas by color or luminance, and at an internal pixel, the depth information of a non-feature point is complemented using the depth information of a feature point on a per divided area basis. In addition, for example, Patent Document 2 proposes that for a boundary portion of an object, a recomputation for reducing a distance error is performed for the inside of an edge using edge detection in combination.

However, these techniques are not always optimal. For example, in the method described in Patent Document 1, in a case where the distances of all pixels in a given divided area cannot be measured, depth information may not be able to be interpolated. In addition, in the method described in Patent Document 2, since a process for edge detection and recomputation for the inside of an edge requires a long time, a moving image may not be able to be processed instantly (in real time) without failure. Therefore, other methods are also sought.

<Determination of Reliability>

Hence, it is determined, on the basis of reliability information indicating the reliability of depth information indicating a depth of an image, whether to make a determination on the basis of the depth information, the determination being as to whether an area is a target area for predetermined image processing. For example, an image processing apparatus includes a determination unit that determines, on the basis of reliability information indicating the reliability of depth information indicating a depth of an image, whether to make a determination on the basis of the depth information, the determination being as to whether an area is a target area for predetermined image processing.

By doing so, it becomes possible to control, according to the reliability of depth information, whether to use the depth information for identification of a target area for image processing. Therefore, image processing target areas in an image can be more accurately identified.

<Imaging Apparatus>

FIG. 1 is a diagram showing an exemplary main configuration of an imaging apparatus which is one embodiment of an image processing apparatus to which the present technology is applied. An imaging apparatus 100 shown in FIG. 1 is an apparatus that captures a subject and thereby creates a captured image, etc. The imaging apparatus 100 can further perform various processes such as performing image processing on the captured image and transmitting the captured image to another apparatus.

The imaging apparatus 100 includes a bus 110, an optical unit 111, a sensor unit 112, an image processor 113, an encoding/decoding unit 114, a control unit 115, an input unit 121, an output unit 122, a storage unit 123, a communication unit 124, and a drive 125.

Each of the optical unit 111 to the drive 125 is connected to the bus 110. These units can give and receive arbitrary information (data, programs, etc.) to/from each other through the bus 110. For example, each unit can obtain arbitrary information from another unit through the bus 110. In addition, for example, each unit can supply arbitrary information to another unit through the bus 110.

The optical unit 111 includes, for example, a lens that adjusts the focus to a subject and collects light from a position where the focus is obtained; a diaphragm that adjusts exposure; a shutter that controls image capturing timing; and the like. For example, the optical unit 111 allows light from an external source (incident light) to pass therethrough, and supplies the light to the sensor unit 112.

The sensor unit 112 performs a process related to the detection of arbitrary information. For example, the sensor unit 112 includes a sensor that detects arbitrary information. For example, the sensor unit 112 may include an optical sensor that receives light incident (incident light) through the optical unit 111 and performs photoelectric conversion on the light. The optical sensor may be, for example, a short-pixel sensor like a photodetector, or a multi-pixel sensor like a so-called complementary metal oxide semiconductor (CMOS) image sensor. In addition, the wavelength of incident light received by the optical sensor is any, and the light may be white light containing all wavelengths, or may be visible light, or may be near-infrared light, or may be near-ultraviolet light, or may be light of other wavelengths. In addition, the sensor unit 112 may include an audio sensor that detects audio (vibration) like a microphone and the like. In addition, the sensor unit 112 may include a sensor that detects other information, e.g., current, voltage, power, acceleration, speed, angular velocity, posture, force, temperature, humidity, flow rate, magnetism, chemical substances, odors, or the like.

In addition, the sensor unit 112 may also have a function related to a sensor that is other than to act as a sensor. For example, the sensor unit 112 may include a light-emitting unit that emits light and outputs the light to an external source through the optical unit 111. In this case, the optical sensor may receive light that is emitted from the light-emitting unit and reflected by a subject. Note that the wavelength of light emitted from the light-emitting unit is any. For example, the light may be white light containing all wavelengths, or may be visible light, or may be near-infrared light, or may be near-ultraviolet light, or may be light of other wavelengths. In addition, the wavelength of reflected light that is received by the optical sensor may be a part of a wavelength region of light emitted from the light-emitting unit or may be a different wavelength than the wavelength of light emitted from the light-emitting unit.

Note that the sensor unit 112 can include a plurality of sensors. For example, the sensor unit 112 may include a plurality of sensors of different types. For example, the sensor unit 112 may include an image sensor that receives visible light and creates a captured image, and an infrared sensor that receives near-infrared light. In addition, for example, the sensor unit 112 may include a plurality of sensors of the same type. For example, the sensor unit 112 may include a plurality of image sensors that receive visible light and create captured images. In this case, the plurality of image sensors may be provided in different positions such that parallax occurs between captured images which are created by the image sensors, respectively.

In the following, description is made assuming that the imaging apparatus 100 performs distance measurement by the TOF scheme, and the sensor unit 112 includes: an image sensor that receives visible light from a subject and performs photoelectric conversion and signal processing such as A/D conversion on the light and thereby creates a captured image, the image sensor being one embodiment of an imaging unit that captures a subject and thereby creates a captured image; a light-emitting unit that emits near-infrared light and irradiates a space serving as an imaging range of the imaging apparatus 100 with the light; and an infrared sensor that receives a part of the near-infrared light irradiated from the light-emitting unit that is reflected by the subject, etc.

That is, the sensor unit 112 creates, as sensing results, a captured image created by the image sensor and a map of periods of time from when the light-emitting unit emits near-infrared light to when the infrared sensor receives the near-infrared light (hereinafter, also referred to as periods of time from the emission to reception of near-infrared light). The period of time from the emission to reception of near-infrared light is calculated on a per single or plurality of pixels of the captured image basis. Then, a distribution (map) in which the calculated plurality of periods of time from the emission to reception of near-infrared light are associated with the pixels of the captured image is created as sensing results. That is, the map of the periods of time from the emission to reception of near-infrared light corresponds to the captured image. Note that the numbers of pixels of the captured pixel associated with the respective periods of time from the emission to reception of near-infrared light may be uniform or may not be uniform. In addition, in a case where a captured image is a moving image, a map of periods of time from the emission to reception of near-infrared light may be created for each frame image. Of course, one map of periods of time from the emission to reception of near-infrared light may be created for a plurality of frame image of the captured image. Furthermore, the numbers of frames of the captured image associated with the respective maps of periods of time from the emission to reception of infrared light may be uniform or may not be uniform.

The sensor unit 112 can supply the created sensing results to other processors through the bus 110. For example, the sensor unit 112 may supply the sensing results to the image processor 113 to allow the image processor 113 to perform image processing using the sensing results. In addition, for example, the sensor unit 112 may supply the sensing results to the encoding/decoding unit 114 to allow the encoding/decoding unit 114 to encode the sensing results. Furthermore, for example, the sensor unit 112 may supply the sensing results to the control unit 115 to allow the control unit 115 to perform control based on the sensing results. In addition, for example, the sensor unit 112 may supply the sensing results to the output unit 122 to allow the output unit 122 to display the sensing results as an image, or to output the sensing results as audio, or to output the sensing results as data to an external source. Furthermore, for example, the sensor unit 112 may supply the sensing results to the storage unit 123 to allow the storage unit 123 to store the sensing results therein. In addition, for example, the sensor unit 112 may supply the sensing results to the communication unit 124 to allow the communication unit 124 to supply the sensing results to another apparatus by communication with another apparatus. Furthermore, for example, the sensor unit 112 may supply the sensing results to the drive 125 to allow the drive 125 to store the sensing results in a removable medium 131 placed in the drive 125.

The image processor 113 performs processes related to image processing. For example, the image processor 113 can perform arbitrary image processing on an image. For example, the image processor 113 may perform arbitrary image processing on a partial area of an image. For example, the image processor 113 may perform a process of cutting out the partial area from the image. In addition, for example, the image processor 113 may synthesize the image having been cut out with another image. In addition, for example, the image processor 113 may focus attention on (specify) the partial area as a tracking target or a monitoring target. In addition, for example, the image processor 113 may recognize what the image of the partial area is (whether the image is of a person, a thing, etc.). In addition, for example, the image processor 113 may perform a process, such as adjustment of luminance or color, color mixing correction, black level correction, white balance adjustment, a demosaic process, a matrix process, gamma correction, or YC conversion, on the partial area. In addition, for example, the image processor 113 may perform zoom-in, zoom-out, deformation, etc., on the partial area. Note that the image processor 113 may perform a plurality of types of image processing. In addition, the image processor 113 may repeat the same image processing a plurality of times.

The image processor 113 can obtain an image to be subjected to image processing from another processor. For example, the image processor 113 may obtain from the sensor unit 112 a captured image created by the sensor unit 112 and perform image processing on the captured image. Furthermore, for example, the image processor 113 may obtain from the encoding/decoding unit 114 a decoded image that is obtained by the encoding/decoding unit 114 decoding encoded data in which an image is encoded, and perform image processing on the decoded image. In addition, for example, the image processor 113 may obtain from the control unit 115 an image created by the control unit 115 and perform image processing on the image. Furthermore, for example, the image processor 113 may obtain from the input unit 121 an image that is inputted to the input unit 121 from a source external to the imaging apparatus 100, and perform image processing on the image. In addition, for example, the image processor 113 may read and obtain an image stored in the storage unit 123 and perform image processing on the image. Furthermore, for example, the image processor 113 may obtain from the communication unit 124 an image that is supplied from another apparatus other than the imaging apparatus 100 by the communication unit 124 communicating with that another apparatus, and perform image processing on the image. In addition, for example, the image processor 113 may allow the drive 125 to read an image stored in the removable medium 131 placed in the drive 125 and obtain the image, and perform image processing on the image.

Note that the image processor 113 can also obtain arbitrary information other than images from other processors. For example, the image processor 113 can obtain sensing results supplied from the sensor unit 112 and perform image processing using the sensing results. The sensing results may include, as described above, information other than image information.

In addition, the image processor 113 can supply data of an image having been subjected to image processing, etc., to other processors, as an image processing result. For example, the image processor 113 may supply an image processing result to the encoding/decoding unit 114 to allow the encoding/decoding unit 114 to encode the image processing result. In addition, for example, the image processor 113 may supply an image processing result to the control unit 115 to allow the control unit 115 to use the image processing result for control. Furthermore, for example, the image processor 113 may supply an image processing result to the output unit 122 to allow the output unit 122 to display the image processing result as an image, or to output the image processing result as audio, or to output the image processing result as data to a source external to the imaging apparatus 100. In addition, for example, the image processor 113 may supply an image processing result to the storage unit 123 to allow the storage unit 123 to store the image processing result therein. Furthermore, for example, the image processor 113 may supply an image processing result to the communication unit 124 to allow the communication unit 124 to supply the image processing result to another apparatus. In addition, for example, the image processor 113 may supply an image processing result to the drive 125 to allow the drive 125 to store the image processing result in the removable medium 131.

Note that the image processing result may include arbitrary information other than image information.

The encoding/decoding unit 114 performs processes related to the encoding and decoding of information (programs, data, etc.). The encoding scheme (decoding scheme) is any. For example, the encoding/decoding unit 114 may be allowed to perform encoding by a plurality of schemes. For example, the encoding/decoding unit 114 may support a plurality of encoding schemes and may be allowed to perform encoding by any of those schemes. In addition, for example, the encoding/decoding unit 114 may perform encoding by a combination of a plurality of encoding schemes. Decoding is also performed in a similar manner.

In addition, the encoding/decoding unit 114 may be allowed to encode or decode information obtained from an arbitrary processor. For example, the encoding/decoding unit 114 may obtain information that has not been encoded from the sensor unit 112, the image processor 113, the control unit 115, the input unit 121, the storage unit 123, the communication unit 124, or the drive 125 (removable medium 131), and encode the information. In addition, for example, the encoding/decoding unit 114 may obtain information that has been encoded from the sensor unit 112, the image processor 113, the control unit 115, the input unit 121, the storage unit 123, the communication unit 124, or the drive 125 (removable medium 131), and decode the information.

Furthermore, the encoding/decoding unit 114 may supply data of an encoded result or a decoded result to an arbitrary processor. For example, the encoding/decoding unit 114 may supply data of an encoded result or a decoded result to the sensor unit 112, the image processor 113, the control unit 115, the input unit 121, the storage unit 123, the communication unit 124, or the drive 125 (removable medium 131).

The control unit 115 performs processes related to the control of the imaging apparatus 100. For example, the control unit 115 controls each of the processors including the optical unit 111 to the drive 125. Note that the control unit 115 can obtain information (programs, data, etc.) from other processors and supply information to other processors, as necessary.

The input unit 121 performs processes related to the input of information (programs, data, etc.), instructions, etc. For example, the input unit 121 may include arbitrary input devices such as a Jog Dial (trademark), keys, buttons, and a touch panel, and accept operation input made to any of the input devices by a user, etc., and supply a signal corresponding to the operation input (user instruction) to other processors such as the control unit 115. In addition, for example, the input unit 121 may include an external input terminal, and accept information supplied from a source external to the imaging apparatus 100 (another apparatus connected through the external input terminal, etc.), and supply the information to other processors such as the control unit 115. Note that the input unit 121 may include input devices such as a camera and a microphone, and accept, by the input devices, a user's gesture, audio, etc., as a user instruction.

The output unit 122 performs processes related to the output of information (programs, data, etc.) and the like. For example, the output unit 122 may include a monitor that displays images, and display an arbitrary image on the monitor. For example, the output unit 122 may obtain a captured image created by the sensor unit 112, and display the captured image on the monitor. In addition, for example, the output unit 122 may obtain an image having been subjected to image processing by the image processor 113, and display the image on the monitor. Furthermore, for example, the output unit 122 may obtain a decoded image which is obtained by decoding by the encoding/decoding unit 114, and display the decoded image on the monitor. In addition, for example, the output unit 122 may obtain an image (e.g., a graphical user interface (GUI) image, etc.) which is created by the control unit 115, and display the image on the monitor. Furthermore, for example, the output unit 122 may obtain an image which is inputted to the input unit 121 from an external source, and display the image on the monitor. In addition, for example, the output unit 122 may read and obtain an image stored in the storage unit 123, and display the image on the monitor. Furthermore, for example, the output unit 122 may obtain an image which is supplied from another apparatus by communication by the communication unit 124, and display the image on the monitor. In addition, for example, the output unit 122 may read and obtain an image stored in the removable medium 131 through the drive 125, and display the image on the monitor.

In addition, for example, the output unit 122 may include a speaker that outputs audio, and output arbitrary audio from the speaker. The output unit 122 may obtain data of the audio to be outputted, from an arbitrary processor, e.g., the sensor unit 112, the encoding/decoding unit 114, the control unit 115, the input unit 121, the storage unit 123, the communication unit 124, the drive 125 (removable medium 131), etc.

In addition, for example, the output unit 122 may include an external output terminal and supply arbitrary information (programs, data, etc.) to a source external to the imaging apparatus 100 (another apparatus connected through the external output terminal, etc.). The output unit 122 may obtain the information to be outputted, from an arbitrary processor, e.g., the sensor unit 112, the image processor 113, the encoding/decoding unit 114, the control unit 115, the input unit 121, the storage unit 123, the communication unit 124, the drive 125 (removable medium 131), etc.

The storage unit 123 performs processes related to the storage of information. The storage unit 123 includes an arbitrary storage medium, e.g., a flash memory, a solid state drive (SSD), a hard disk, etc. For example, the storage unit 123 stores arbitrary information (programs, data, etc.) in the storage medium.

For example, the storage unit 123 may store, in the storage medium, image information such as captured images and images having been subjected to image processing, additional information such as depth information maps, reliability information maps, and luminance maps which will be described later, other information such as control information, encoded data of those pieces of information, or the like. For example, the storage unit 123 may obtain the arbitrary information from an arbitrary processor such as the sensor unit 112, the image processor 113, the encoding/decoding unit 114, the control unit 115, the input unit 121, the communication unit 124, or the drive 125 (removable medium 131), and store the arbitrary information in the storage medium. In addition, the storage unit 123 may read information stored in the storage medium in response to a request from an arbitrary processor such as the sensor unit 112, the image processor 113, the encoding/decoding unit 114, the control unit 115, the input unit 121, the communication unit 124, or the drive 125 (removable medium 131), or as necessary, and supply the information to an arbitrary processor.

The communication unit 124 performs processes related to communication. The communication unit 124 has a communication interface of an arbitrary standard, e.g., a wired local area network (LAN), a wireless LAN, Bluetooth (registered trademark), near field communication (NFC), infrared communication, high-definition multimedia interface (HDMI) (registered trademark), universal serial bus (USB), or the like. For example, the communication unit 124 can give and receive arbitrary information by performing communication with another apparatus through the communication another face.

For example, the communication unit 124 may supply to another apparatus image information such as captured images or images having been subjected to image processing, additional information such as depth information maps, reliability information maps, and luminance maps which will be described later, other information such as control information, encoded data of those pieces of information, or the like, or may obtain those information, encoded data, or the like, from another apparatus, by performing communication with another apparatus. For example, the communication unit 124 may obtain the arbitrary information from an arbitrary processor such as the sensor unit 112, the image processor 113, the encoding/decoding unit 114, the control unit 115, the input unit 121, the storage unit 123, or the drive 125 (removable medium 131), and supply the arbitrary information to another apparatus. In addition, the communication unit 124 may obtain arbitrary information from another apparatus and supply the arbitrary information to an arbitrary processor such as the sensor unit 112, the image processor 113, the encoding/decoding unit 114, the control unit 115, the input unit 121, the storage unit 123, or the drive 125 (removable medium 131). That is, the communication unit 124 is one embodiment of a sending unit that sends an image having been subjected to image processing by the image processor 113 to another apparatus.

The drive 125 performs processes related to the removable medium 131 placed therein. The removable medium 131 is a medium removable from the drive 125, the medium including an arbitrary storage medium, e.g., a magnetic disc, an optical disc, a magneto-optical disc, a semiconductor memory, or the like. For example, the drive 125 drives the removable medium 131 placed therein, as necessary, to read arbitrary information (programs, data, etc.) written to the removable medium 131 or to write arbitrary information to the removable medium 131.

For example, the drive 125 may write image information such as captured images or images having been subjected to image processing, additional information such as depth information maps, reliability information maps, and luminance maps which will be described later, other information such as control information, encoded data of those pieces of information, or the like, to the removable medium 131. In addition, for example, the drive 125 may obtain the arbitrary information from an arbitrary processor such as the sensor unit 112, the image processor 113, the encoding/decoding unit 114, the control unit 115, the input unit 121, the storage unit 123, or the communication unit 124, and write the arbitrary information to the removable medium 131. In addition, the drive 125 may read information written to the removable medium 131, in response to a request from an arbitrary processor such as the sensor unit 112, the image processor 113, the encoding/decoding unit 114, the control unit 115, the input unit 121, the storage unit 123, or the communication unit 124, or as necessary, and supply the information to an arbitrary processor.

<Image Processor>

Figure 2:
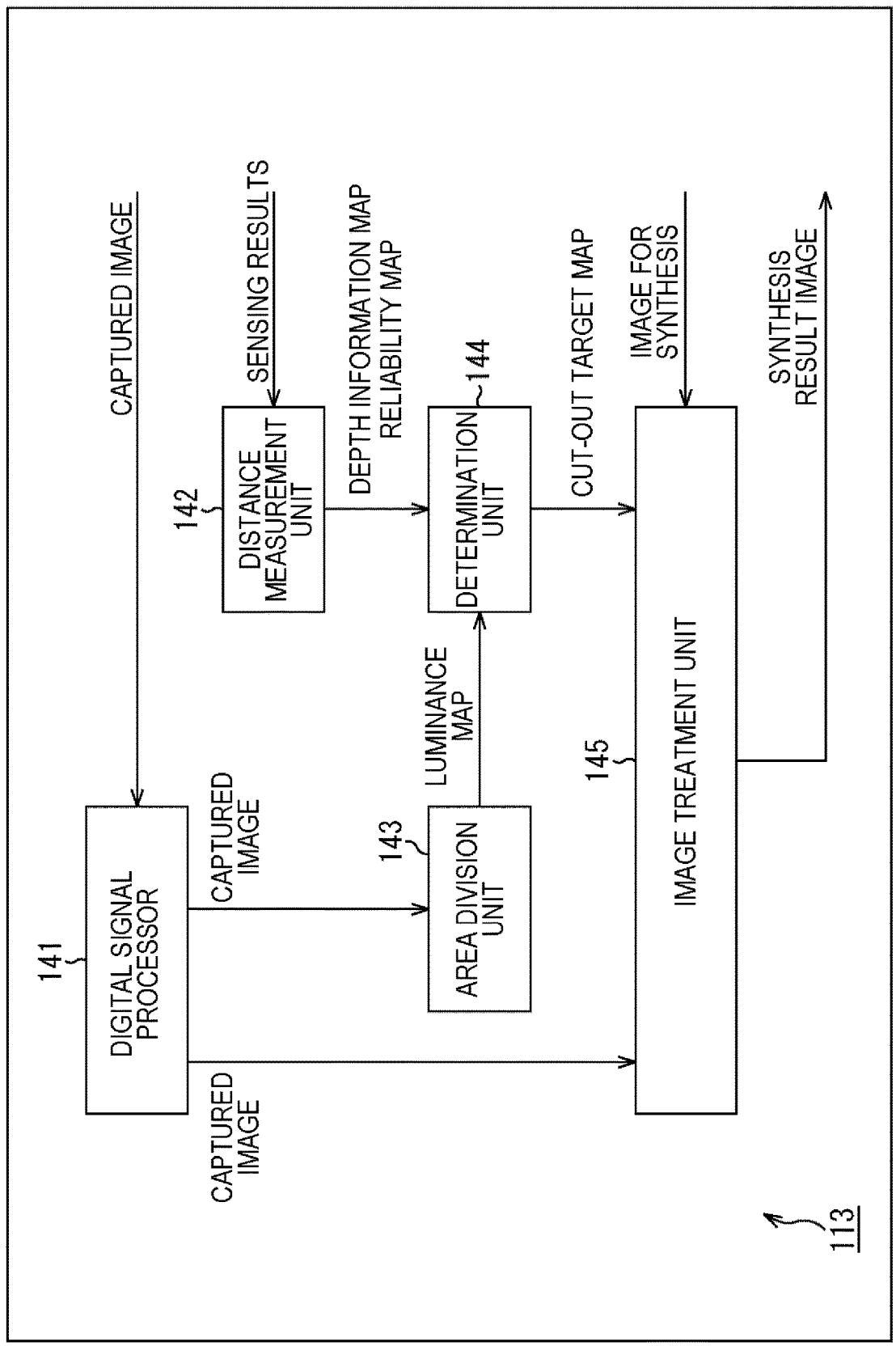
FIG. 2 is a block diagram showing an exemplary main configuration of an image processor.

FIG. 2 is a block diagram showing an exemplary main configuration of the image processor 113. As shown in FIG. 2, the image processor 113 includes a digital signal processor 141, a distance measurement unit 142, an area division unit 143, a determination unit 144, and an image treatment unit 145.

The digital signal processor 141 performs processes related to digital signal processing. For example, the digital signal processor 141 processes a digital signal of a captured image which is supplied as sensing results from the sensor unit 112, etc., and holds the digital signal as data of the captured image. In a case where the captured image is a moving image, the digital signal processor 141 performs the above-described process for each frame image of the moving image. The digital signal processor 141 supplies a captured image which is held at arbitrary timing to the area division unit 143 and the image treatment unit 145.

The distance measurement unit 142 performs processes related to distance measurement. For example, to the distance measurement unit 142 is supplied, as sensing results, a map of periods of time from the emission to reception of near-infrared light, for the captured image held in the digital signal processor 141. The distance measurement unit 142 performs distance measurement by the TOF scheme, using the periods of time from the emission to reception of near-infrared light, and creates a depth information map (a distribution in which pieces of depth information indicating the depths of the captured image are associated with the pixels of the captured image) for the captured image supplied to the digital signal processor 141. Furthermore, the distance measurement unit 142 creates a reliability map (a distribution in which pieces of reliability information indicating the reliability of each piece of depth information of the depth information map are associated with the pixels of the captured image) for the created depth information map. A method for calculating the reliability of depth information is any. That is, the distance measurement unit 142 is one embodiment of a generating unit that generates depth information of an image and reliability information therefor. The distance measurement unit 142 supplies the created depth information map and reliability map to the determination unit 144.

The area division unit 143 performs processes related to the division of areas of the captured image. An area division method is any. For example, the area division unit 143 performs area division on the captured image supplied from the digital signal processor 141, on the basis of the luminance value of each pixel of the captured image, and thereby divides the capture image into a plurality of areas. For example, the area division unit 143 compares the luminance value of each pixel of the captured image with a predetermined threshold value, and divides the captured image into areas according to the magnitude relationship between the values. For example, the area division unit 143 uses one threshold value, and sorts each pixel of the captured image into either one of two areas: an area in which the luminance value of the pixel is greater than the threshold value (or an area in which the luminance value is greater than or equal to the threshold value); and an area in which the luminance value is less than or equal to the threshold value (or an area in which the luminance value is less than the threshold value). That is, in this case, the captured image can be divided into two areas at maximum. The number of areas divided is any. That is, the number of threshold values is any and may be plural. For example, two threshold values may be used so that the captured image can be divided into three areas at maximum. In addition, three or more threshold values may be used so that the captured image can be divided into four or more areas at maximum.

The area division unit 143 creates, as division results such as those described above, a luminance map which is a distribution in which each of the areas thus divided (the areas into which each pixel of the captured image is sorted) on the basis of the luminance value is associated with the pixels of the captured image. The area division unit 143 supplies the created luminance map to the determination unit 144.

The determination unit 144 performs processes related to the determination of a target area for predetermined image processing. For example, the determination unit 144 determines, on the basis of the depth information map, the reliability map, and the luminance map, whether an area is an area (a cut-out target area) in the captured image that is a target for performing cutting out of an image as predetermined image processing. The determination unit 144 creates, on the basis of the determination results, a cut-out target map indicating a distribution of cut-out target areas.

The determination unit 144 supplies the created cut-out target map to the image treatment unit 145. Details of the process of the determination unit 144 will be described later.

The image treatment unit 145 performs processes related to image processing on the captured image. For example, the image treatment unit 145 may cut out the cut-out target areas in the captured image which is supplied from the digital signal processor 141, on the basis of the cut-out target map supplied from the determination unit 144. In addition, for example, the image treatment unit 145 may synthesize the image having been cut out with another image (image for synthesis) which is supplied from a source external to the image processor 113, and thereby create a synthesis result image. Furthermore, for example, the image treatment unit 145 may supply the created synthesis result image to a source external to the image processor 113 (e.g., another processor). That is, the image treatment unit 145 is one embodiment of a treatment unit that performs, as image processing, cutting out of the target areas for image processing from the image on the basis of the cut-out target map which is the determination results obtained by the determination unit 144, and synthesizing of the images having been cut out with another image to create a synthetic image.

<Determination Unit>

Figure 3:
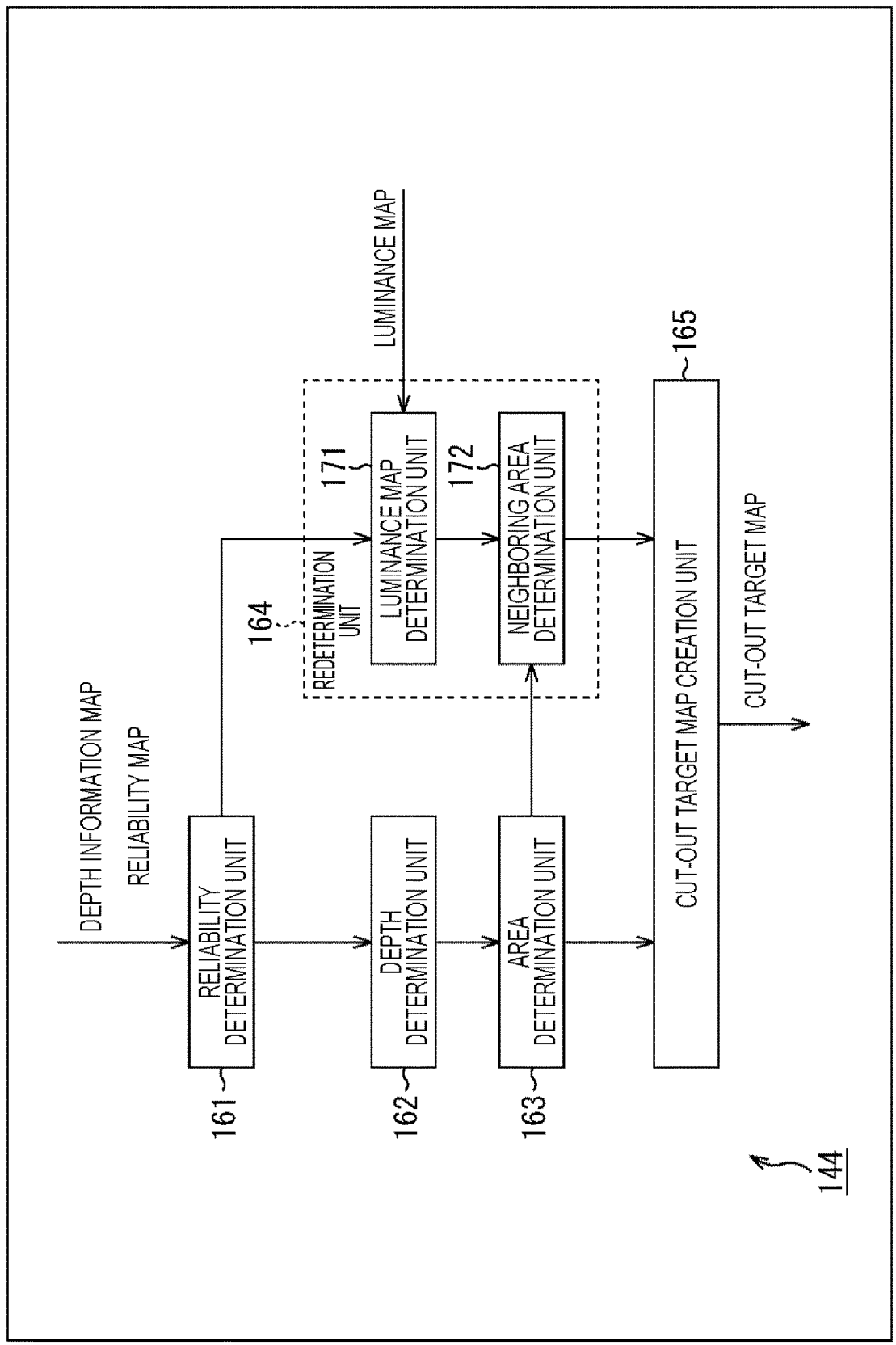
FIG. 3 is a block diagram showing an exemplary main configuration of a determination unit.

FIG. 3 is a block diagram showing an exemplary main configuration of the determination unit 144. As shown in FIG. 3, the determination unit 144 includes, for example, a reliability determination unit 161, a depth determination unit 162, an area determination unit 163, a redetermination unit 164, and a cut-out target map creation unit 165. In addition, the redetermination unit 164 includes a luminance map determination unit 171 and a neighboring area determination unit 172.

The reliability determination unit 161 determines, on the basis of reliability information indicating the reliability of depth information indicating a depth of an image, whether a determination as to whether an area is a target area for predetermined image processing is made on the basis of the depth information. For example, the reliability determination unit 161 determines, on the basis of a reliability map for a captured image which is held in the digital signal processor 141, whether a determination as to whether an area is a cut-out target area is made on the basis of a depth information map provided for the captured image.

Note that a method for determining, based on the reliability map, whether a determination as to whether an area is a cut-out target area is made on the basis of the depth information map is any. For example, the reliability determination unit 161 may determine, on the basis of the depth information, whether an area whose reliability of depth information is higher than a predetermined threshold value (or higher than or equal to the threshold value) is a cut-out target area. In other words, the reliability determination unit 161 may not use depth information whose reliability is lower than or equal to the predetermined threshold value (or lower than the threshold value), for a determination as to whether an area is a cut-out target area. By doing so, the determination unit 144 can use only depth information with sufficiently high reliability, for a determination as to whether an area is a target area for image processing. Accordingly, image processing target areas in an image can be more accurately identified.

In addition, the reliability determination unit 161 makes such a determination for the entire range of the reliability map (i.e., all pixels of the captured image), the determination being as to whether a determination as to whether an area is a cut-out target area is made on the basis of depth information. At that time, the reliability determination unit 161 may make such a determination on a per single or plurality of pixels of the captured image basis. That is, the determination may be made using, as a processing unit, a range of the reliability map (a single or a plurality of pieces of reliability information) corresponding to a processing unit (a single or a plurality of pixels) for the case of conversion in the captured image. The reliability determination unit 161 can make such a determination on a per arbitrary processing unit basis. Note that the sizes (e.g., the numbers of pixels) or shapes of processing units for respective determinations may be uniform or may not be uniform.

Then, the reliability determination unit 161 decides, for an area (e.g., a pixel) having been determined to have depth information with high reliability (e.g., higher than a predetermined threshold value or higher than or equal to the threshold value), that a determination as to whether the area belongs to a cut-out target area is made using the depth information, and passes processing to the depth determination unit 162. Note that the reliability determination unit 161 supplies the depth information map to the depth determination unit 162. In addition, the reliability determination unit 161 decides, for an area (e.g., a pixel) having been determined to have depth information with low reliability (e.g., lower than the predetermined threshold value or lower than or equal to the threshold value), that a determination as to whether the area belongs to a cut-out target area is suspended, and passes processing to the redetermination unit 164.

The depth determination unit 162 makes a depth determination using the depth information map, for the entire range of the areas whose processing has been passed. At that time, the depth determination unit 162 may make the depth determination on a per single or plurality of pixels of the captured image basis. The depth determination unit 162 supplies determination results to the area determination unit 163. The area determination unit 163 determines whether an area belongs to a cut-out target area, on the basis of the determination results obtained by the depth determination unit 162. At that time, for example, the area determination unit 163 may make the above-described determination using the same processing unit as that used for the determination made by the depth determination unit 162 (e.g., on a per single or plurality of pixels of the captured image basis).

Note that a method for determining, by the depth determination unit 162 and the area determination unit 163, whether an area belongs to a cut-out target area is any. For example, an area whose depth has been determined to be nearer than a predetermined threshold value may be determined as a target area for image processing. In this case, an area (e.g., a pixel) having been determined by the depth determination unit 162 to be located nearer than the threshold value is determined by the area determination unit 163 to belong to a cut-out target area. That is, a subject located nearer than the threshold value is determined as a target for image processing. For example, in a case where a subject is located in the most front position in a captured image (a case where there is only a background with respect to the subject), the determination unit 144 makes such a determination and can thereby determine that a subject portion belongs to a cut-out target area.

Note that the number of the threshold values is any and may be, for example, plural. For example, in a case where an object or the like (foreground) on which attention is not focused is present in a more front position than a subject in a captured image, the depth determination unit 162 may make a depth determination using two threshold values. For example, the area determination unit 163 may determine that a subject having been determined by the depth determination unit 162 to be located between the two threshold values (the subject that is located within a predetermined distance range in a depth direction (not always present in the most front position)) belongs to a cut-out target area. By doing so, for a subject that is not present in the most front position in the depth direction (a case where there are a foreground and a background with respect to the subject), too, a subject portion can be determined as a target area for image processing.

Note that the depth determination unit 162 and the area determination unit 163 may determine whether a subject portion of interest belongs to a cut-out target area, without using a threshold value. For example, a subject located in a predetermined position (depth) in the depth direction (or located near the position) may be determined as a target for image processing.

The area determination unit 163 supplies information indicating a determination result for each area (e.g., a pixel) to the cut-out target map creation unit 165 and the redetermination unit 164 (the neighboring area determination unit 172).

The redetermination unit 164 determines (redetermines) whether an area belongs to a cut-out target area, for the entire range of the areas whose processing has been passed. At that time, for example, the redetermination unit 164 may redetermine whether an area having been determined by the reliability determination unit 161 to have depth information with low (not high) reliability belongs to a cut-out target area, using other information different than the depth information (without using the depth information). In addition, for example, the redetermination unit 164 may redetermine whether the area belongs to a cut-out target area, using a luminance map as the other information.

A method for determining a cut-out target area by the redetermination unit 164 is any. For example, in general, there is a tendency that the reflectance of a portion in which the luminance of near-infrared light is low decreases compared to the reflectances of other portions. Hence, using this tendency, the redetermination unit 164 may determine, on the basis of the luminance map, that an area (e.g., a pixel, etc.) whose luminance value is lower than a predetermined threshold value (or lower than or equal to the threshold value) belongs to a cut-out target area. In addition, in general, an area that the redetermination unit 164 wants to be a cut-out target area is often a portion of a subject portion that has depth information with low reliability. That is, it is highly likely that an area having been determined as a cut-out target area is present in a surrounding (nearby) region. Hence, the redetermination unit 164 may determine that an area that has a luminance value lower than the predetermined threshold value (or lower than or equal to the threshold value) and that is adjacent to another surrounding area having been determined as a cut-out target area belongs to a cut-out target area.

The luminance map determination unit 171 makes a luminance value determination using a luminance map, for the areas whose processing has been passed. For example, the luminance map determination unit 171 may make a luminance value determination using the luminance map, for the entire range of the areas whose processing has been passed. In addition, for example, the luminance map determination unit 171 may make the luminance value determination on a per single or plurality of pixels of the captured image basis. The luminance map determination unit 171 supplies determination results to the neighboring area determination unit 172.

The neighboring area determination unit 172 determines whether an area having been determined by the luminance map determination unit 171 to have a luminance value lower than the threshold value (or lower than or equal to the threshold value) belongs to a cut-out target area, according to whether the area is adjacent to a neighboring cut-out target area. For example, the neighboring area determination unit 172 may make the above-described determination using the same processing unit as that used for the determination made by the luminance map determination unit 171 (e.g., on a per single or plurality of pixels of the captured image basis). The neighboring area determination unit 172 supplies information indicating a determination result for each area (e.g., a pixel) to the cut-out target map creation unit 165.

The cut-out target map creation unit 165 creates a cut-out target map indicating a distribution of cut-out target areas, on the basis of the information indicating the determination results which is supplied from the area determination unit 163 and the determination results supplied from the neighboring area determination unit 172. The cut-out target map creation unit 165 supplies the created cut-out target map to the image treatment unit 145.

By each processor of the determination unit 144 performing its process in the above-described manner, the determination unit 144 can obtain target areas for image processing on the basis of depth information with high reliability and other information. Therefore, the determination unit 144 can more accurately identify image processing target areas in an image.

<Various Types of Data>

Next, various types of data generated and processed by the imaging apparatus 100 will be described with reference to FIGS. 4 to 10. Note that although, for convenience of description, various types of data shown in these diagrams are represented by line drawings, in practice, the various types of data each include a set (distribution) of information in pixel units.

Figure 4:
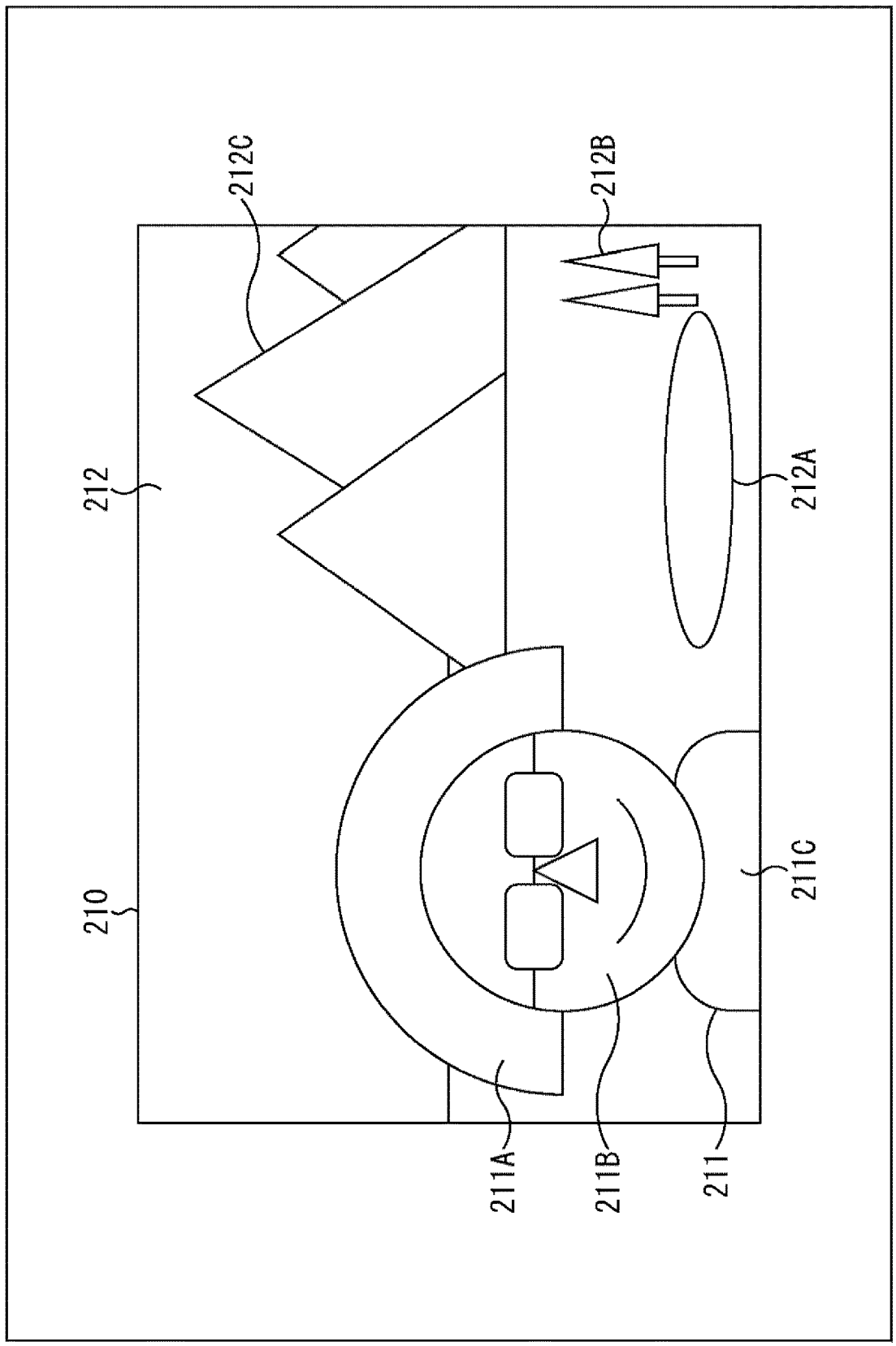
FIG. 4 is a diagram showing an example of a captured image.

FIG. 4 shows an example of a captured image created by the image sensor, etc., of the sensor unit 112. In this case, a captured image 210 includes a "subject 211" portion and a "background image 212" portion thereof. The subject 211 is a person. In the captured image 210, the subject 211 mainly includes a hair area 211A which is a hair portion of the person, a face area 211B which is a face portion of the person, and a body area 211C which is a body portion of the person. In addition, the background image 212 is a landscape behind the subject 211 (further away from the subject 211 in a depth direction), and includes, for example, a pond 212A, trees 212B, mountains 212C, etc.

Figure 5:
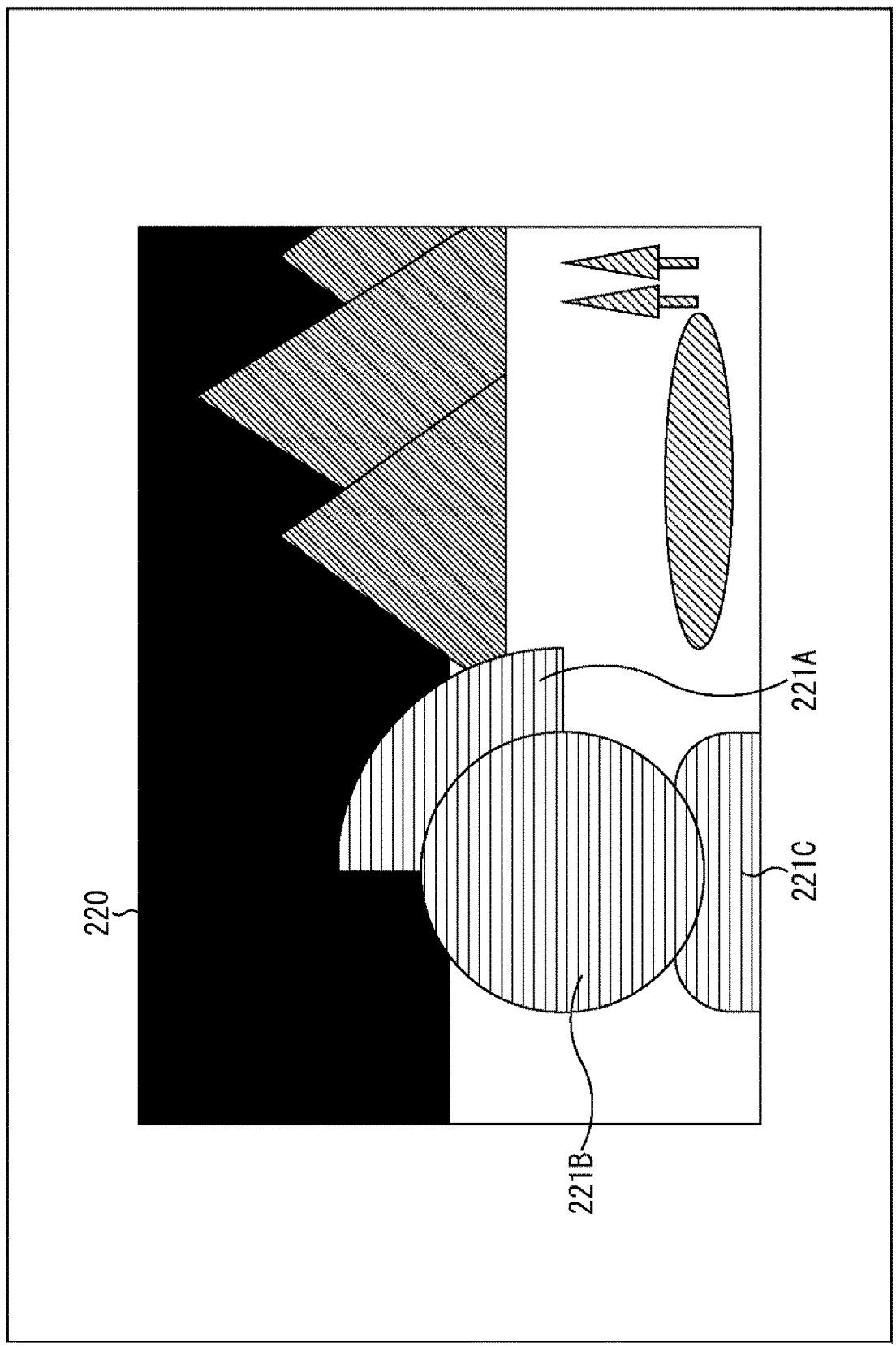
FIG. 5 is a diagram showing an example of a depth information map.

FIG. 5 shows an example of a depth information map created by the distance measurement unit 142. The depth information map 220 is provided for the captured image 210 of FIG. 4, and depth information of each pixel of the captured image 210 is arranged in a similar manner to the pixel arrangement of the captured image 210. That is, depth information for each position of the depth information map 220 indicates a depth of a pixel of the captured image 210 in the same position. For example, the depth information of an area 221A indicates the depth of the hair area 211A in the captured image 210. In addition, the depth information of an area 221B indicates the depth of the face area 211B. Furthermore, an area 221C indicates the depth of the body area 211C.

The pieces of depth information of the areas represented by horizontal strip patterns in FIG. 5 are shown to be located in the most front position in the depth information map 220. That is, the values of the pieces of depth information of the areas are smaller than those of other areas (areas corresponding to the background image 212) in the depth information map 220. In other words, in the depth information map 220, pieces of depth information of areas corresponding to the point 212A, the trees 212B, the mountains 212C, etc., in the captured image 210 have values according to their respective positions (depths), and the pieces of depth information all have values larger than those of the pieces of depth information of the areas 221A to 221C.

Note that, in general, head hair is dark and has a complex shape, and thus, in the hair area 211A it is difficult for near-infrared light to be reflected compared to the face area 211B, etc. Therefore, the area 221A in the depth information map 220 corresponds only to a part (substantially the right half in the drawing) of the hair area 211A. That is, the distance of only a part of the hair area 211A is measured as substantially the same distance as the face area 211B, etc. (the depth information takes a small value), and the distance of the other part (substantially the left half in the drawing) of the hair area 211A is measured as unmeasurable or as a similar distance to that of the background image 212 (the depth information takes a large value).

Figure 6:
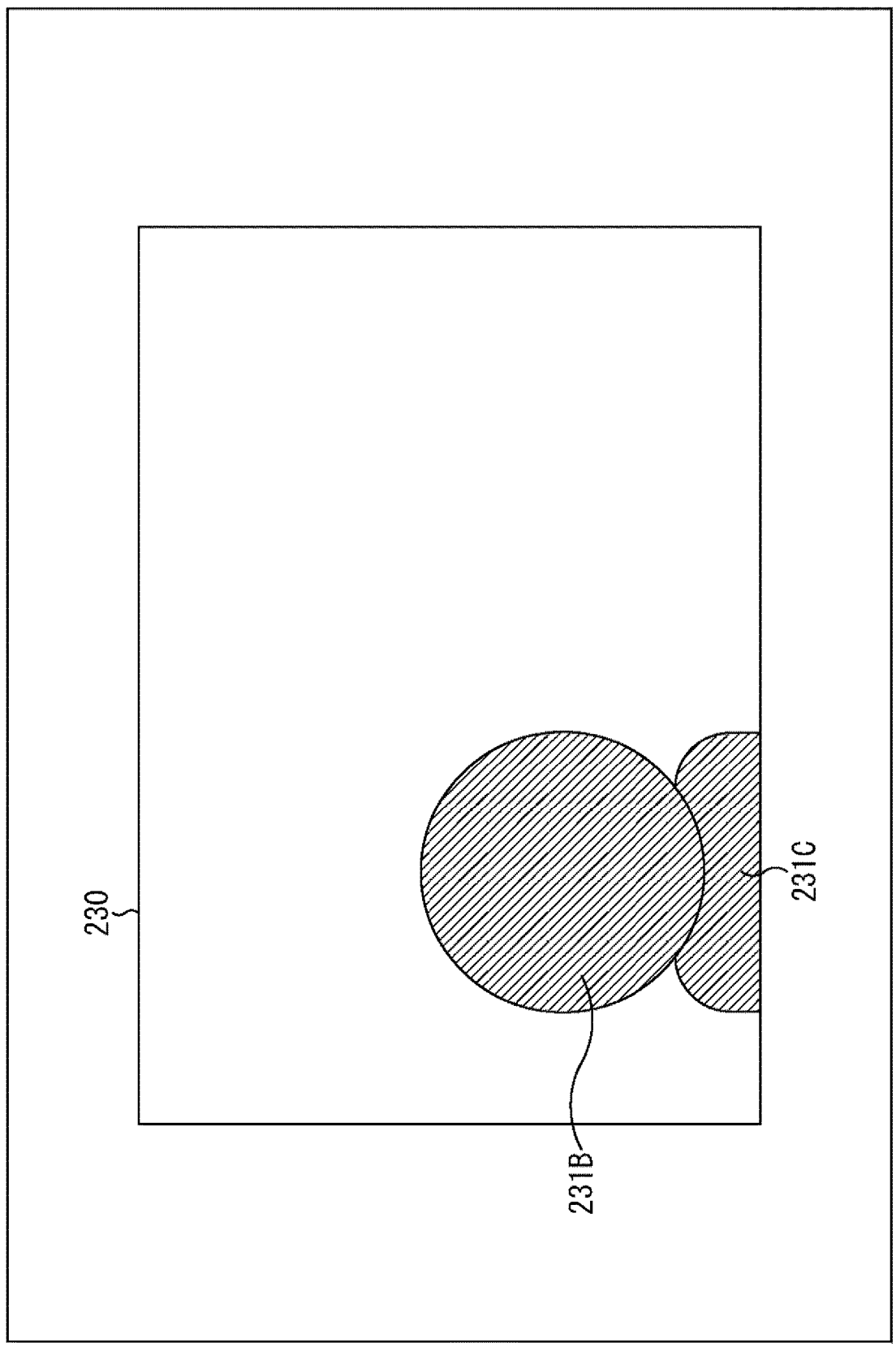
FIG. 6 is a diagram showing an example of a reliability map.

FIG. 6 shows an example of a reliability map created by the distance measurement unit 142. The reliability map 230 is provided for the depth information map 220 of FIG. 5 (i.e., the captured image 210 of FIG. 4), and reliability information of depth information of each pixel of the captured image 210 is arranged in a similar manner to the pixel arrangement of the captured image 210. That is, reliability information for each position of the reliability map 230 indicates the reliability of depth information for the same position in the depth information map 220. In the reliability map 230, an area 231B indicates the reliability of depth information of the area 221B in the depth information map 220 (the face area 211B in the captured image 210). In addition, an area 231C indicates the reliability of depth information of the area 221C in the depth information map 220 (the body area 211C in the captured image 210).

As described above, since the subject 211 is located in a near position in the depth direction (front side), the reliability of depth information of the area 221B corresponding to the face area 211B is high. Likewise, the reliability of depth information of the area 221C corresponding to the body area 211C is also high. That is, the area 231B and the area 231C which are represented by diagonal line patterns in the reliability map 230 take large values.

On the other hand, in the hair area 211A, as described above, the reflectance of near-infrared light is likely to decrease, and thus, the reliability of depth information of the area 221A corresponding to the hair area 211A is low. In addition, areas corresponding to the background image 212 are located far away in the depth direction and thus near-infrared light is not substantially reflected in these areas, either. Therefore, the reliability of depth information of the areas is low. That is, in the reliability map 230, areas other than the area 231B and the area 231C take small values compared to the area 231B and the area 231C.

Figure 7:
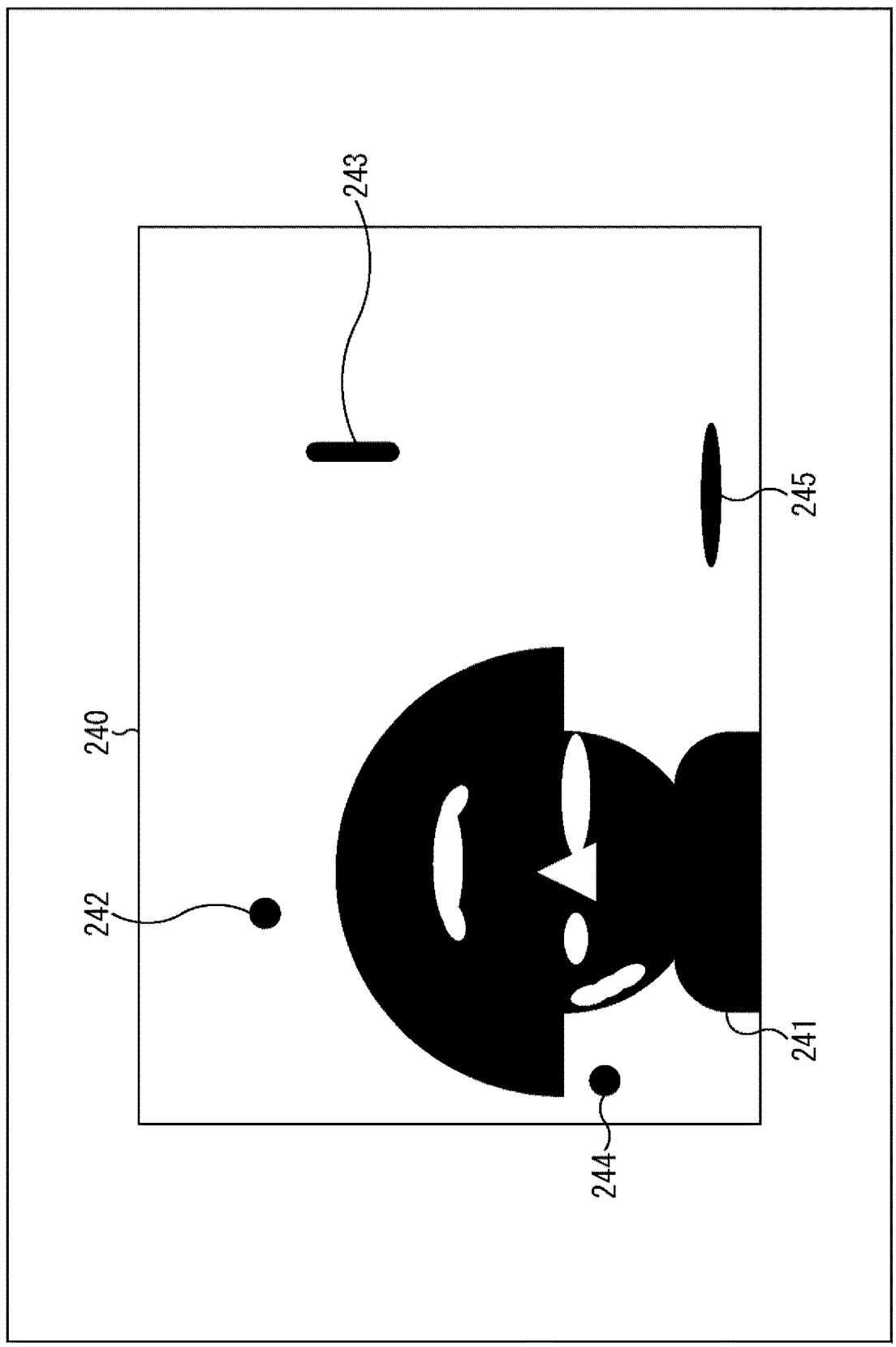
FIG. 7 is a diagram showing an example of a luminance map.

FIG. 7 shows an example of a luminance map created by the area division unit 143. The luminance map 240 is provided for the captured image 210 of FIG. 4. In the luminance map 240, each pixel in the entire area of the captured image 210 is classified by the magnitude of the luminance value of the pixel into either one of two areas, using one threshold value. That is, in this case, the area division unit 143 divides the entire area of the captured image 210 into two areas, using one threshold value. In FIG. 7, areas in the luminance map 240 represented by black indicate areas including pixels whose luminance values are smaller than a threshold value (or smaller than or equal to the threshold value) (i.e., pixels darker than the threshold value). In addition, areas in the luminance map 240 represented by white indicate areas including pixels whose luminance values are greater than or equal to the threshold value (or greater than the threshold value) (i.e., pixels brighter than the threshold value).

As shown in FIG. 7, the luminance values of pixels of the subject 211 located on the front side are basically small. Therefore, these pixels are classified into an area with luminance values smaller than the threshold value (areas represented by black in FIG. 7) like an area 241. Note, however, that even if a pixel is of the subject 211, a partial area, e.g., a portion that light strikes, may have a luminance value greater than the threshold value. In that case, the pixel is classified into an area with luminance values greater than or equal to the threshold value (areas represented by white in FIG. 7).

In addition, the luminance values of pixels located far away in the depth direction like the background image 212 are basically large. Therefore, these pixels are classified into the area with luminance values greater than or equal to the threshold value (areas represented by white in FIG. 7). Note that even in a "background image 212" portion, a pixel of a dark portion or a portion with a noise component may have a luminance value smaller than the threshold value. For example, areas 242 to 245 of FIG. 7 are such areas and classified into the area with luminance values smaller than the threshold value (areas represented by black in FIG. 7).

Pixels of the captured image 210 corresponding to both of a portion whose reliability of depth information is determined to be higher than the predetermined threshold value in the reliability map 230 and a portion whose value of depth information is determined to be smaller than the predetermined threshold value in the depth information map 220 by determination processes performed by the reliability determination unit 161 to the area determination unit 163 are classified into pixels belonging to cut-out target areas (located in the cut-out target areas) (i.e., the pixels serve as cut-out targets).

If the threshold value of the reliability information is set between the values of the area 231B and the area 231C and the values of areas of other portions in the reliability map 230, then the reliability of pieces of depth information of the area 231B and the area 231C is higher than the threshold value (takes a value greater than or equal to the threshold value).

In addition, if the threshold value of the depth information is set between the values of the area 221A to the area 221C and the values of areas of other portions in the depth information map 220, then the values of pieces of depth information of the area 221A to the area 221C are smaller than the threshold value (take values smaller than the threshold value).

That is, pixels of the captured image 210 corresponding to both of any of the depth information areas 221A to 221C and any of the reliability information areas 231B to 231C serve as cut-out targets.

Figure 8:
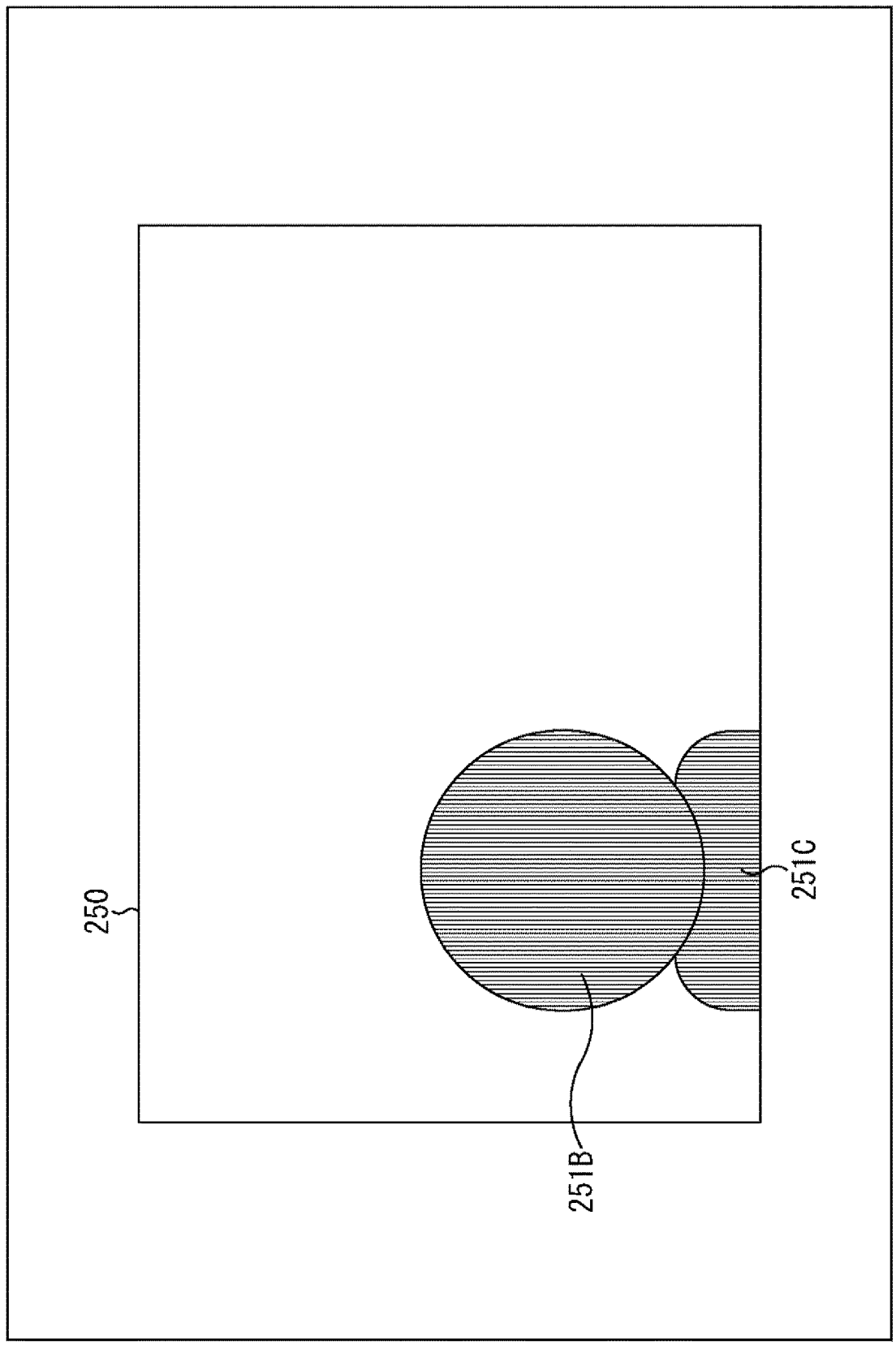
FIG. 8 is a diagram showing an example of a cut-out target area map.

FIG. 8 is a diagram showing an example of portions in a cut-out target map that are created by such determination processes. In FIG. 8, an area 251B and an area 251 in a cut-out target map 250 are areas corresponding to both the depth information areas 221A to 221C and the reliability information areas 231B and 231C. Pixels belonging to areas in the captured image 210 corresponding to the area 251B and the area 251 (i.e., the face area 211B and the body area 211C) serve as cut-out targets.

In addition, pixels of the captured image 210 corresponding to both of a portion whose reliability of depth information is determined to be lower than or equal to the predetermined threshold value in the reliability map 230 and a portion whose luminance value is determined to be smaller than the predetermined threshold value in the luminance map 240 and which is adjacent to a neighboring cut-out target area by determination processes performed by the reliability determination unit 161 and the redetermination unit 164 (the luminance map determination unit 171 and the neighboring area determination unit 172) are classified into pixels belonging to cut-out target areas (i.e., the pixels serve as cut-out targets).

For example, pixels belonging to the hair area 211A are not classified as cut-out targets by determination processes by the reliability determination unit 161 to the area determination unit 163. Note, however, that the pixels belonging to the hair area 211A are classified by the luminance map determination unit 171 into the area 241 in the luminance map 240 (the area with luminance values smaller than the threshold value (an area represented by black in FIG. 7)). Then, the hair area 211A to which the pixels belong is adjacent to the face area 211B which is classified as a cut-out target by determination processes by the reliability determination unit 161 to the area determination unit 163. Therefore, the neighboring area determination unit 172 classifies the pixels (the pixels belonging to the hair area 211A) as cut-out targets.

Figure 9:
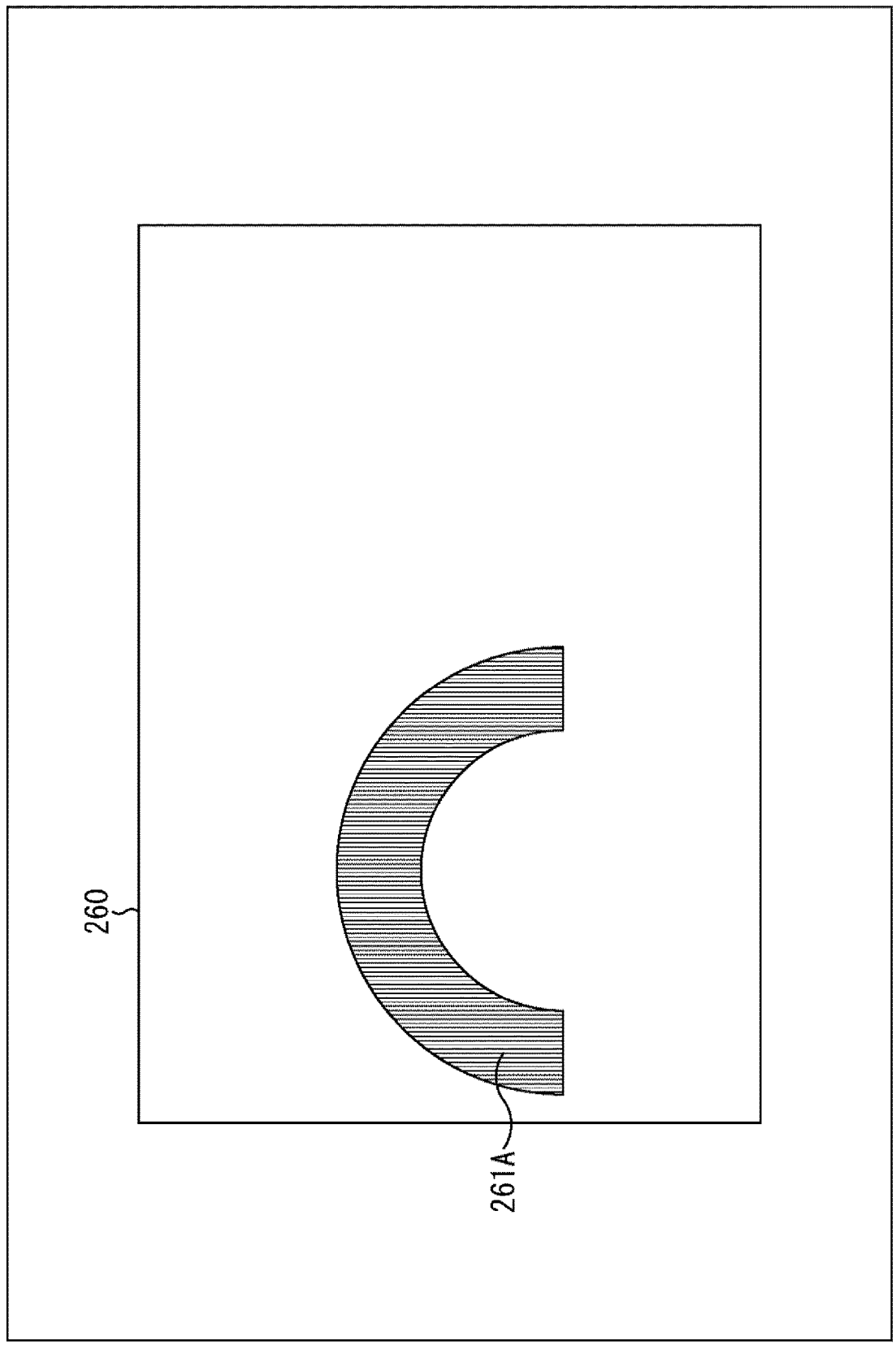
FIG. 9 is a diagram showing an example of a cut-out target area map.

FIG. 9 is a diagram showing an example of a portion in a cut-out target map that is created by such determination processes. In FIG. 9, an area 261A in a cut-out target map 260 is an area corresponding to the hair area 211A. Pixels of the captured image 210 corresponding to the area 261A (i.e., pixels belonging to the hair area 211A) are, as described above, classified as cut-out targets.

The cut-out target map creation unit 165 creates a cut-out target map in which the cut-out target map 250 is synthesized with the cut-out target map 260.

The image treatment unit 145 cuts out areas that are specified as cut-out target areas in the cut-out target map (i.e., the cut-out target map 250 and the cut-out target map 260) from the captured image 210. That is, areas in the captured image 210 corresponding to the area 261A, the area 251B, and the area 251C, i.e., the "subject 211" portion, are cut out and the "background image 212" portion is deleted. The image treatment unit 145 further synthesizes an image of the subject 211 having been cut out with an image for synthesis and thereby creates a synthesis result image.

Figure 10:
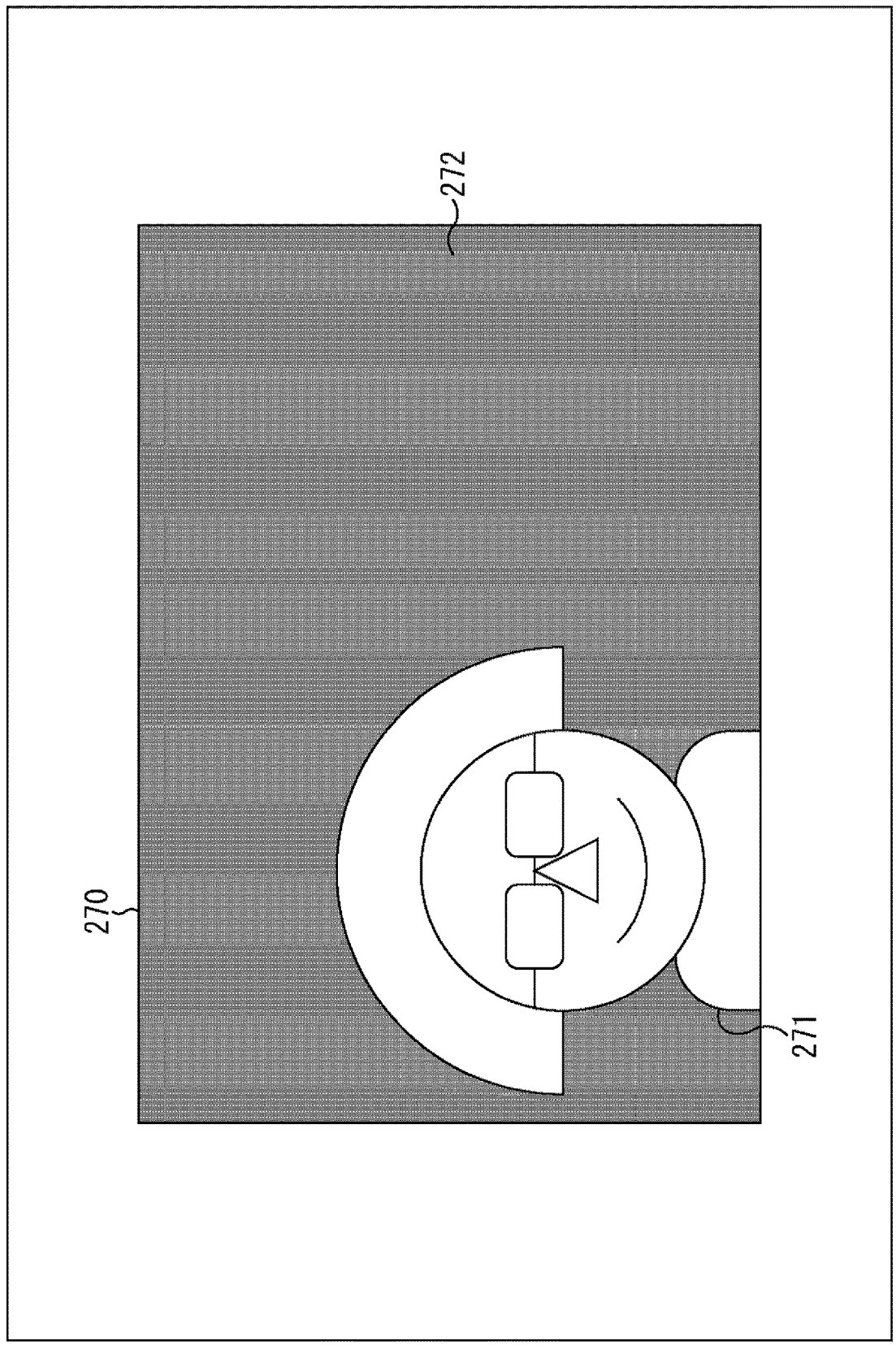
FIG. 10 is a diagram showing an example of a synthetic image.

FIG. 10 is a diagram showing an example of a synthesis result image created by the image treatment unit 145. In a synthesis result image 270 shown in FIG. 10, an image for synthesis 272 is synthesized with an image of a subject 271, as a background of the subject 271. The attributes (pattern, size, aspect ratio, etc.) of the image for synthesis are any.

As described above, the image processor 113 can also set the hair area 211A whose reliability of depth information is low, as a cut-out target. That is, the image processor 113 uses other information for a portion whose reliability of depth information is low, and can thereby more accurately identify image processing target areas in an image.

<Flow of Processes>

Next, an example of the flow of processes performed by the imaging apparatus 100 will be described. First, an example of the flow of an image capturing/sending process performed by the imaging apparatus 100 will be described with reference to a flowchart of FIG. 11. The image capturing/sending process is a process in which the imaging apparatus 100 captures a subject, provides treatment to a captured image to synthesize an image of the subject with another image for synthesis, and encodes and sends a synthesis result image to another apparatus.

When the image capturing/sending process starts, at step S101, the control unit 115 controls the sensor unit 112 in response to an instruction from a user, etc., e.g., pressing of a shutter button of the input unit 121, etc., to allow the sensor unit 112 to capture a subject. The sensor unit 112 captures the subject by the image sensor and thereby creates a captured image, and measures periods of time from the emission to reception of near-infrared light, using the light-emitting unit, the infrared sensor, etc.

At step S102, the image processor 113 performs image processing such as extracting (cutting out) of an image of the subject from the captured image, using sensing results obtained at step S101, and synthesizing of the image with an image for synthesis to create a synthesis result image.

At step S103, the encoding/decoding unit 114 encodes the synthesis result image created at step S102 by an arbitrary encoding scheme, and thereby generates encoded data.

At step S104, the communication unit 124 performs communication with another apparatus to send the encoded data generated at step S103 to another apparatus that is the one the communication unit 124 is communicating with.

When the process at step S104 is completed, the image capturing/sending process ends.

Next, with reference to a flowchart of FIG. 12, an example of the flow of the image processing which is performed at step S102 of FIG. 11 will be described.

When the image processing starts, at step S121, the digital signal processor 141 of the image processor 113 performs predetermined image processing on the captured image obtained at step S101.

At step S122, the distance measurement unit 142 creates a depth information map and a reliability map on the basis of the periods of time from the emission to reception of near-infrared light which are the sensing results obtained at step S101, etc.

At step S123, the area division unit 143 creates a luminance map from the captured image obtained at step S101.

At step S124, the determination unit 144 performs a cut-out target map creation process using the depth information map and reliability map created at step S122, the luminance map created at step S123, the captured image, etc., and thereby creates a cut-out target map for the captured image.

At step S125, the image treatment unit 145 cuts out cut-out target areas in the captured image on the basis of the cut-out target map created at step S124, and synthesizes the images of the cut-out target areas with an image for synthesis and thereby creates a synthesis result image.

Figure 11:
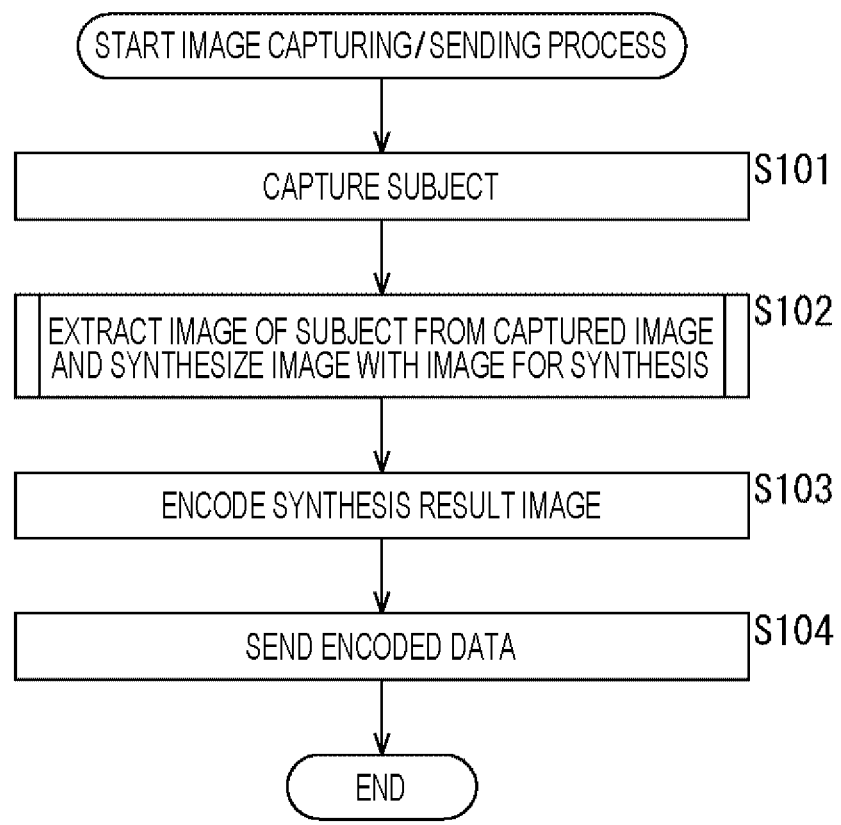
FIG. 11 is a flowchart describing an example of the flow of an image capturing/sending process.
Figure 12:
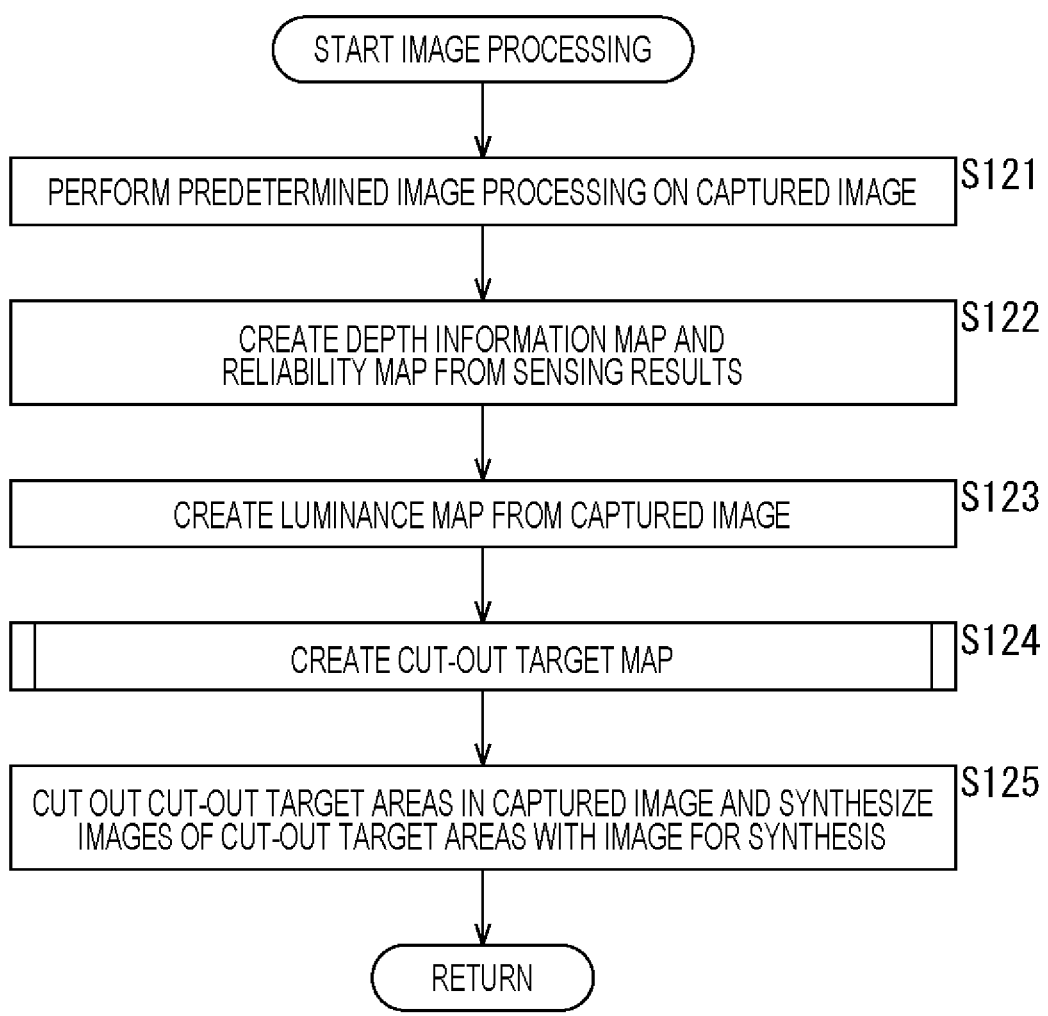
FIG. 12 is a flowchart describing an example of the flow of image processing.

When the process at step S125 is completed, the image processing ends and processing returns to FIG. 11.

Figure 13:
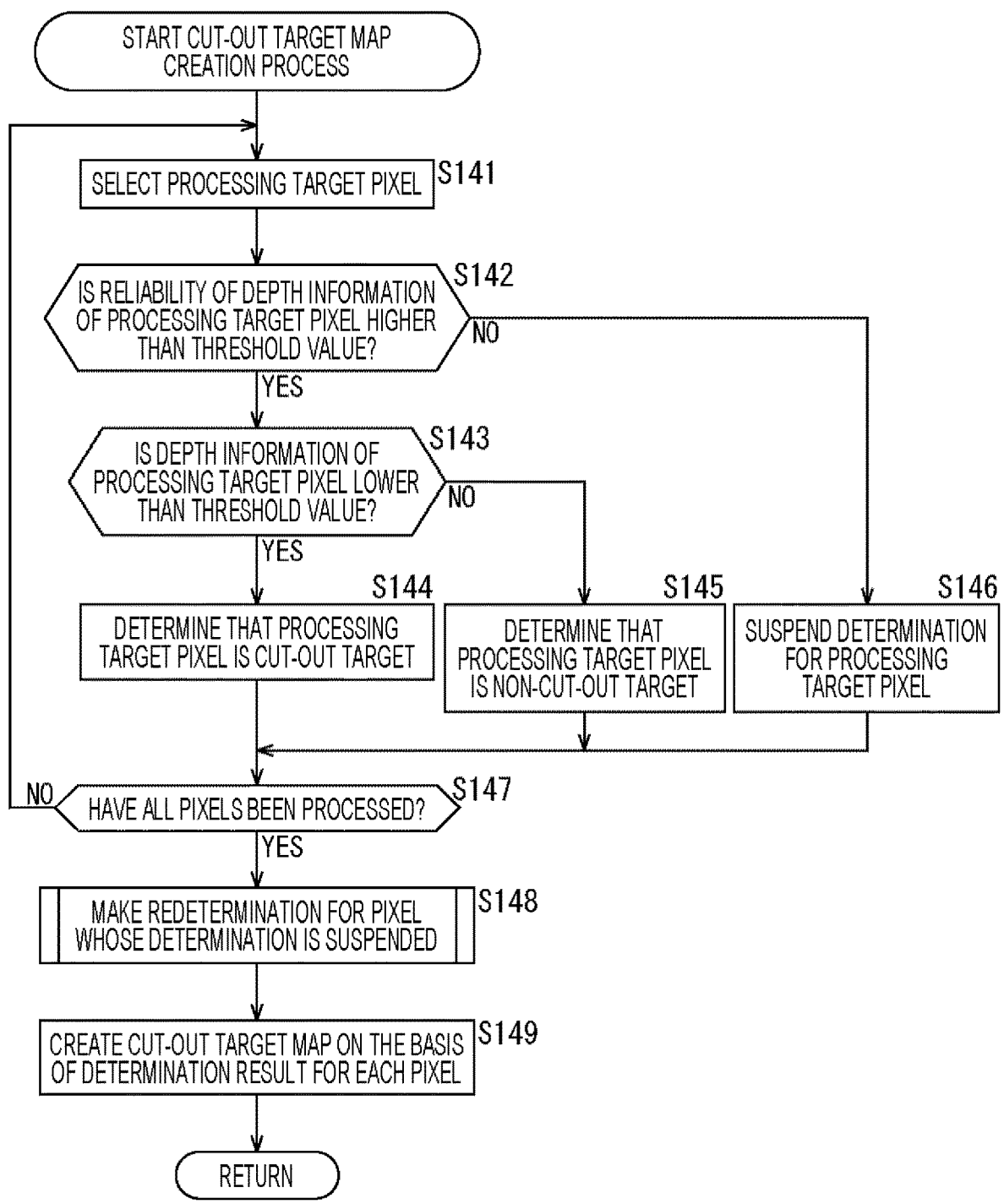
FIG. 13 is a flowchart describing an example of the flow of a cut-out target map creation process.

Next, with reference to a flowchart of FIG. 13, an example of the flow of the cut-out target map creation process which is performed at step S124 of FIG. 12 will be described.

When the cut-out target map creation process starts, at step S141, the reliability determination unit 161 selects a pixel of the captured image serving as a processing target (also referred to as processing target pixel).

At step S142, the reliability determination unit 161 determines, on the basis of the reliability map, whether the reliability of depth information of the processing target pixel is higher than a predetermined threshold value. In a case where it is determined that the reliability of depth information is higher than the threshold value, processing proceeds to step S143.

At step S143, the depth determination unit 162 determines, on the basis of the depth information map, whether the depth information of the processing target pixel is lower than a predetermined threshold value. In a case where an object (a subject, etc.) in an image having the processing target pixel is located more on the front side than a depth corresponding to the threshold value, the depth information has a lower value (smaller value) than the threshold value. In a case where it is determined that the depth information of the processing target pixel is lower than the predetermined threshold value (i.e., the processing target pixel is located more on the front side than the depth corresponding to the threshold value), processing proceeds to step S144.

At step S144, the area determination unit 163 determines that the processing target pixel is a cut-out target (i.e., the processing target pixel belongs to a cut-out target area). When the process at step S144 is completed, processing proceeds to step S147.

In addition, in a case where it is determined at step S143 that the depth information of the processing target pixel is not lower than the predetermined threshold value (greater than or equal to the threshold value (i.e., the processing target pixel is located more on the back side than the depth corresponding to the threshold value)), processing proceeds to step S145.

At step S145, the area determination unit 163 determines that the processing target pixel is not a cut-out target (the processing target pixel is a non-cut-out target (i.e., the processing target pixel belongs to a non-cut-out target area)). When the process at step S145 is completed, processing proceeds to step S147.

In addition, in a case where it is determined at step S142 that the reliability of the depth information is not higher than the threshold value (less than or equal to the threshold value), processing proceeds to step S146.

At step S146, the reliability determination unit 161 suspends a determination as to whether the processing target pixel is a cut-out target.

At step S147, the reliability determination unit 161 determines whether all pixels of the captured image have been processed. In a case where it is determined that there is an unprocessed pixel, processing returns to step S141 and processes thereafter are repeated. That is, a flow from step S141 to S147 is performed for each pixel. Then, in a case where it is determined at step S147 that all pixels of the captured image have been processed, processing proceeds to step S148.

At step S148, the redetermination unit 164 performs a redetermination process for a pixel whose determination is suspended in the process at step S146, and makes a redetermination as to whether the pixel is a cut-out target. The redetermination is made using information other than depth information. When the process at step S148 is completed, processing proceeds to step S149.

At step S149, the cut-out target map creation unit 165 creates a cut-out target map on the basis of a determination result for each pixel that is obtained in the above-described manner. When the cut-out target map is created, the cut-out target map creation process ends and processing returns to FIG. 12.

Figure 14:
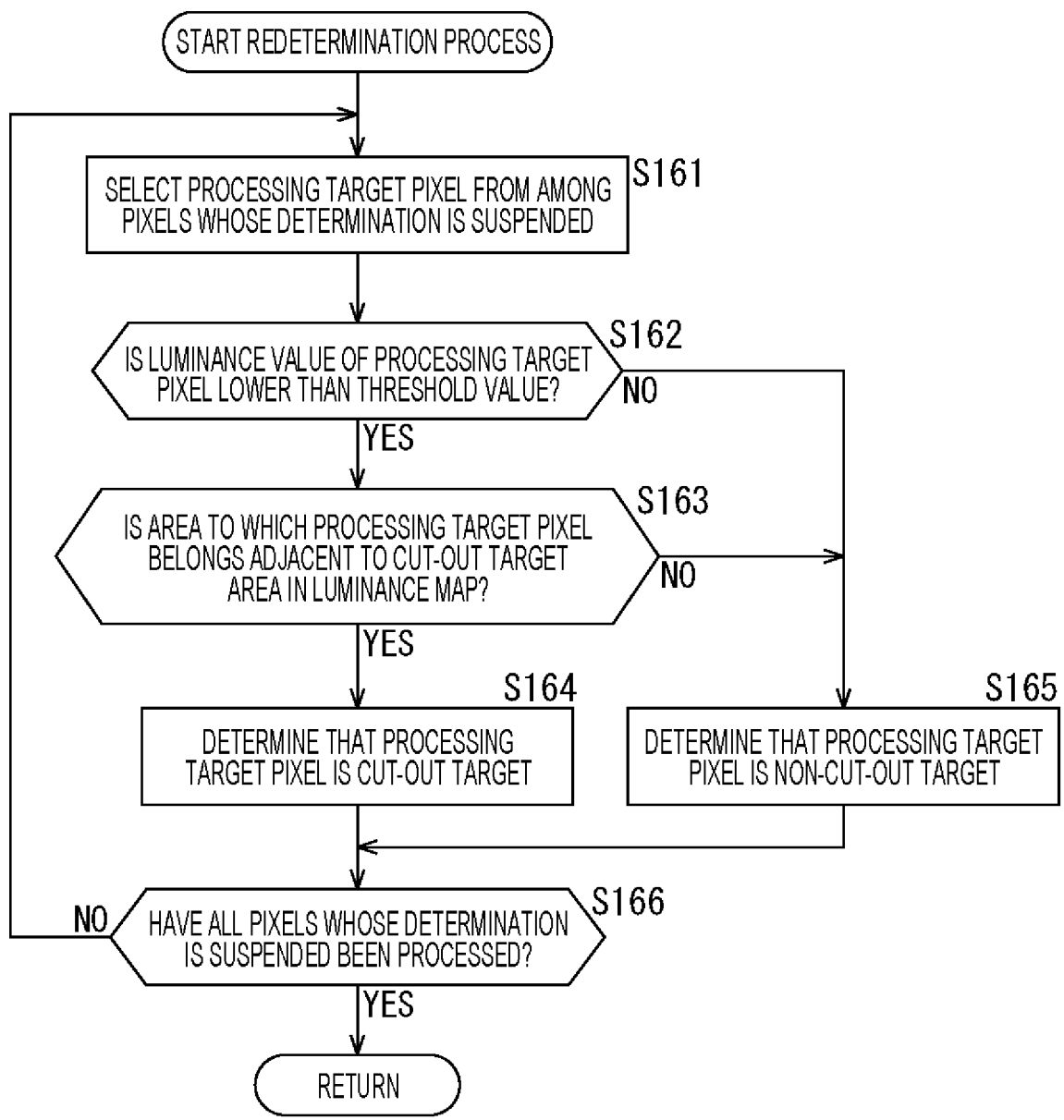
FIG. 14 is a flowchart describing an example of the flow of a redetermination process.

Next, with reference to a flowchart of FIG. 14, an example of the flow of the redetermination process which is performed at step S148 of FIG. 13 will be described.

When the redetermination process starts, at step S161, the luminance map determination unit 171 selects a processing target pixel from among the pixels whose determination is suspended in the process at step S146.

At step S162, the luminance map determination unit 171 determines, on the basis of the luminance map, whether the luminance value of the processing target pixel is lower than a predetermined threshold value (an image having the processing target pixel is darker than brightness corresponding to the threshold value). In a case where it is determined that the luminance value is lower than the threshold value, processing proceeds to step S163.

At step S163, the neighboring area determination unit 172 determines whether an area to which the processing target pixel belongs is adjacent to a cut-out target area in the luminance map. In a case where it is determined that the area is adjacent, processing proceeds to step S164.

At step S164, the neighboring area determination unit 172 determines that the processing target pixel is a cut-out target (i.e., the processing target pixel belongs to a cut-out target area). When the process at step S164 is completed, processing proceeds to step S166.

In addition, in a case where it is determined at step S162 that the luminance value of the processing target pixel is not lower than the threshold value (greater than or equal to the threshold value (the image having the processing target pixel is brighter than the brightness corresponding to the threshold value)), processing proceeds to step S165. In addition, in a case where it is determined at step S163 that the area to which the processing target pixel belongs is not adjacent to a cut-out target area, processing proceeds to step S165.

At step S165, the neighboring area determination unit 172 determines that the processing target pixel is a non-cut-out target (not a cut-out target (i.e., the processing target pixel belongs to a non-cut-out target area)). When the process at step S165 is completed, processing proceeds to step S166.

At step S166, the luminance map determination unit 171 determines whether all pixels whose determination is suspended in the process at step S146 have been processed. In a case where it is determined that there is an unprocessed pixel, processing returns to step S161 and processes thereafter are repeated. That is, a flow from step S161 to S166 is performed for each pixel whose determination is suspended in the process at step S146. Then, in a case where it is determined at step S166 that all pixels whose determination is suspended in the process at step S146 have been processed, the redetermination process ends and processing returns to FIG. 13.

By performing each process in the above-described manner, target areas for image processing can be obtained on the basis of depth information with high reliability and other information, enabling to more accurately identify image processing target areas in an image.

2. Second Embodiment

<Setting of Threshold Values>

Note that various types of threshold values such as the above-described threshold value of reliability information, threshold value of depth information, and threshold value of a luminance value may be predetermined values (fixed values) which are determined in advance, or may be values (variable values) that can be set by a user, etc.

For example, the imaging apparatus 100 (control unit 115) may allow the monitor of the output unit 122 to display a graphical user interface (GUI) that accepts input for setting threshold values by a user, etc., and accept user instructions inputted on the basis of the GUI through the input unit 121, and set various types of threshold values to values specified by the user instructions.

For example, the control unit 115 creates the GUI and supplies the GUI to the output unit 122 to allow the monitor to display the GUI. In addition, the control unit 115 controls the input unit 121 to allow the input unit 121 to accept input of user instructions based on the GUI. Then, the control unit 115 sets various types of threshold values according to the user instructions accepted through the input unit 121. That is, the control unit 115 may be one embodiment of a setting unit that sets threshold values.

Figure 15:
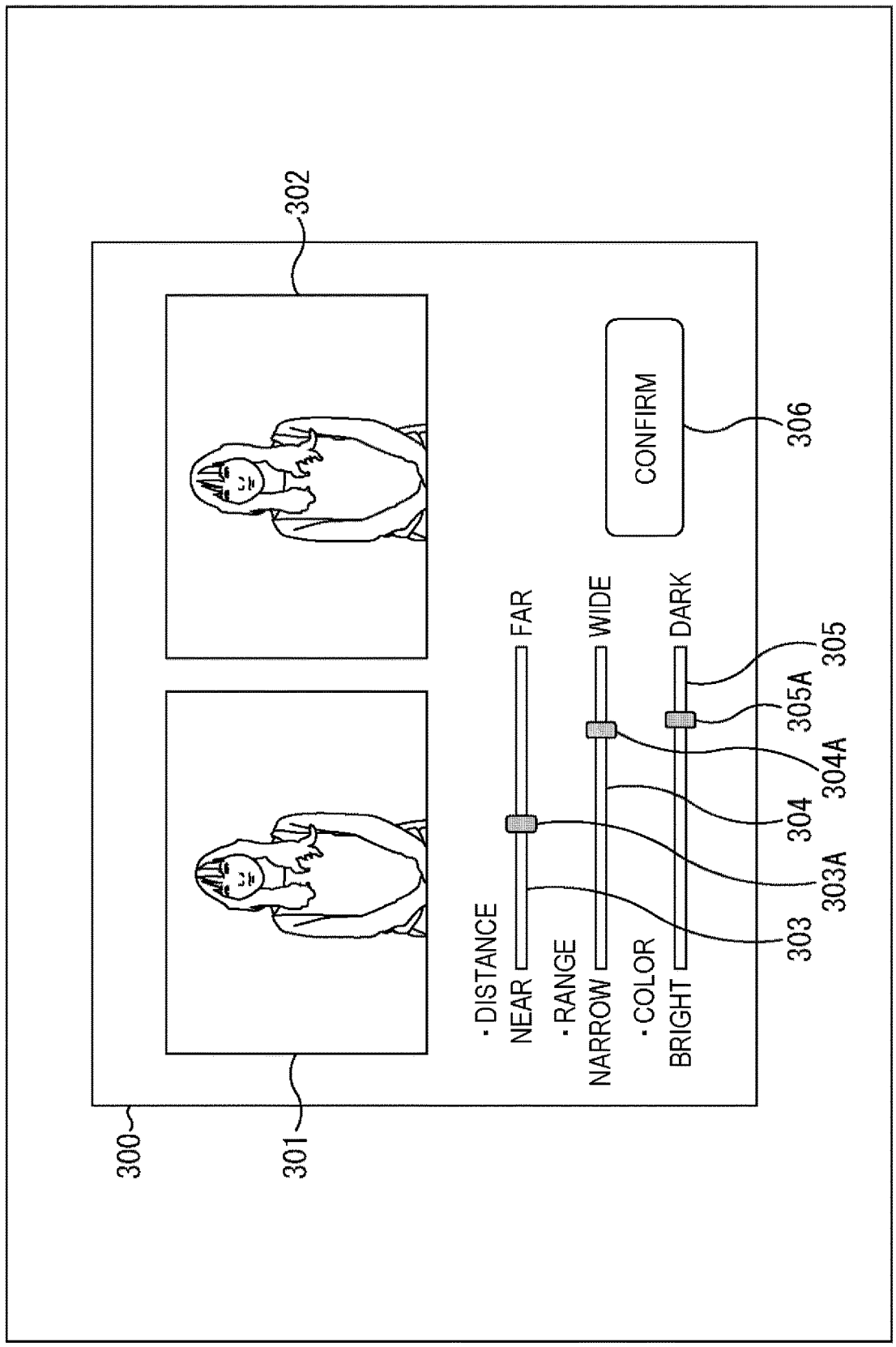
FIG. 15 is a diagram describing an example of a threshold value input screen.

FIG. 15 shows exemplary display of the GUI. A threshold value input screen 300 shown in FIG. 15 is a GUI that accepts input regarding the setting of threshold values by a user, etc. As shown in FIG. 15, the threshold value input screen 300 has an image display portion 301, an image display portion 302, a slide bar 303, a slide bar 304, a slide bar 305, and a confirm button 306.

The image display portion 301 is an area that displays an image (cut-out image) that is cut out from a captured image, on the basis of current threshold value settings. The image display portion 302 is an area that displays a cut-out image in which changes in threshold value settings made with the slide bars 303 to 305 are reflected.

The slide bars 303 to 305 are GUIs for controlling each threshold value setting. By allowing such slide bars to accept control of each threshold value setting, the user can control each threshold value setting easily (just by moving a pointer left or right).

For example, the slide bar 303 is to control the threshold value setting for depth information. For example, by the user moving a pointer 303A of the slide bar 303 in a left or right direction in the drawing along the slide bar 303, the threshold value setting for depth information is changed according to the position of the pointer 303A.

For example, if the user moves the pointer 303A in the left direction in the drawing, the position in the depth direction corresponding to the threshold value (the distance to the position) gets nearer, and if the user moves the pointer 303A in the right direction in the drawing, the position in the depth direction corresponding to the threshold value (the distance to the position) gets further away. That is, by the user controlling the position of the pointer 303A, the user can easily control the range of depth of a subject serving as a cut-out target (from where to where in a range of depth a subject serving as a cut-out target is located).

For example, in a case where there is one threshold value of depth information and a subject present on the front side of the threshold value is a candidate for a cut-out target, if a position in the depth direction corresponding to the threshold value is moved to the back side, a range in the depth direction for a cut-out target increases, and thus, more subjects can serve as cut-out targets. On the other hand, if the position in the depth direction corresponding to the threshold value is moved to the front side, the range in the depth direction for a cut-out target decreases, narrowing the number of subjects serving as cut-out targets.

For example, in a case where a desired subject is not included in a cut-out image, by the user operating the pointer 303A to the right side in the drawing, the desired subject can be included in the cut-out image. In addition, for example, in a case where a cut-out image includes an unwanted subject located more on the back side than a desired subject, by the user operating the pointer 303A to the left side in the drawing, the unwanted subject included in the cut-out image can be reduced.

In addition, for example, the slide bar 304 is to control the threshold value setting for reliability information. For example, by the user moving a pointer 304A of the slide bar 304 in the left or right direction in the drawing along the slide bar 304, the threshold value setting for reliability information is changed according to the position of the pointer 304A.

For example, if the user moves the pointer 304A in the left direction in the drawing, the reliability of depth information corresponding to the threshold value increases, and if the user moves the pointer 304A in the right direction in the drawing, the reliability of depth information corresponding to the threshold value decreases. That is, by the user controlling the position of the pointer 304A, the user can easily control the range of reliability of depth information for a cut-out target.

In general, if the threshold value of reliability information increases, the number of pieces of depth information having larger values than the threshold value decreases. That is, an area that is determined as a cut-out target on the basis of depth information is narrowed. On the other hand, if the threshold value of reliability information decreases, the number of pieces of depth information having larger values than the threshold value increases. That is, an area that is determined as a cut-out target on the basis of depth information is widened.

Therefore, for example, in a case where a part of a desired subject is cut off in a cut-out image (a part of the desired subject is not included in the cut-out image), by the user operating the pointer 304A to the right side in the drawing, a cut-out target area is widened, enabling to include more portions of the desired subject in the cut-out image (to reduce a cut-off portion of an image of the subject). In addition, for example, in a case where a portion other than a desired subject is included in a cut-out image, by the user operating the pointer 304A to the left side in the drawing, a cut-out target area is narrowed, enabling to reduce an unwanted portion other than the desired subject that is included in the cut-out image.

In addition, for example, the slide bar 305 is to control the threshold value setting for a luminance value. For example, by the user moving a pointer 305A of the slide bar 305 in the left or right direction in the drawing along the slide bar 305, the threshold value setting for a luminance value is changed according to the position of the pointer 305A.

For example, if the user moves the pointer 305A in the left direction in the drawing, the luminance value corresponding to the threshold value increases, and if the user moves the pointer 305A in the right direction in the drawing, the luminance value corresponding to the threshold value decreases. That is, by the user controlling the position of the pointer 305A, the user can easily control the range of luminance values (brightness) for a cut-out target.

For example, in a case where there is one threshold value of a luminance value and a pixel with a smaller luminance value (dark portion) than the threshold value serves as a cut-out target, if a luminance value corresponding to the threshold value is increased (moved to the bright side), a range of luminance for a cut-out target increases, and thus, a wider area can serve as a cut-out target. On the other hand, if the luminance value corresponding to the threshold value is reduced (moved to the dark side), the range of luminance for a cut-out target decreases, and thus, an area that can serve as a cut-out target is reduced (limited to a darker area).

For example, in a case where the hair of a subject is too bright and thus a hair portion is not included (cut off) in a cut-out target, by the user operating the pointer 305A to the right side in the drawing, there is a possibility that the hair portion can be prevented from being cut off (included in the cut-out target). In addition, for example, in a case where an area surrounding a subject is too dark and thus the surrounding portion is also included in a cut-out target, by the user operating the pointer 305A to the left side in the drawing, there is a possibility that the surrounding portion of the subject can be cut off (not included in the cut-out target).

Note that the image display portion 302 displays a cut-out image with threshold value settings in which movements of the pointers 303A to 305A such as those described above are reflected. In addition, at this time, the image display portion 301 still displays a cut-out image before changes to the threshold value settings. Therefore, the user can easily grasp the influence on a cut-out target by the movements of the pointers 303A to 305A (i.e., how the cut-out image changes by moving the pointers 303A to 305A) by referring to the image displayed in the image display portion 301 and the image displayed in the image display portion 302.

In addition, in the case of the example of FIG. 15, the threshold value input screen 300 also displays description of each slide bar. By performing such display, the user, etc., can more easily grasp the function of each slide bar. In addition, in this example, for the slide bar 303, "distance" is displayed instead of "threshold value of depth information", for the slide bar 304, "range" is displayed instead of "threshold value of reliability information", and for the slide bar 305, "color" is displayed instead of "threshold value of a luminance value". By thus indirectly representing the description of each slide bar, the user, etc., can more intuitively understand what influence is exerted by an operation on each slide bar.

The confirm button 306 is a GUI button for confirming control of threshold values by slide bar operations. By the user, etc., pressing the confirm button 306, threshold value settings according to the positions of the respective pointers at that time point are registered. That is, the control unit 115 sets various types of threshold values according to user instructions indicated by the positions of the respective pointers. The control unit 115 supplies the threshold value settings to the image processor 113. The image processor 113 determines, using the threshold value settings, whether an area is a target area for image processing, and can thereby create a cut-out image in which the threshold value settings are reflected.

Note that when the confirm button 306 is operated, furthermore, the acceptance of threshold values may be terminated and the threshold value input screen 300 may be closed.

By doing so, the imaging apparatus 100 can more appropriately make a determination for target areas for image processing for more variety of images.

Note that in the case of the example of FIG. 15, the threshold value input screen 300 is provided with slide bars for the respective threshold values. By doing so, the user, etc., can control the threshold values independently of each other. Note that a plurality of threshold values may be able to be controlled by a single slide bar. In addition, threshold values controlled by a plurality of slide bars, respectively, may overlap each other. For example, a threshold value A and a threshold value B may be controlled by a given slide bar, and the threshold value B and a threshold value C may be controlled by another slide bar.

In addition, although in the example of FIG. 15 it is described that the slide bars are provided to control the threshold values, a GUI for controlling the threshold values is any and is not limited to the slide bars. For example, knobs, dials, buttons, etc., may be used.

In addition, the layout of a threshold value input screen is any and is not limited to the example of FIG. 15.

<Flow of a Process>

Figure 16:
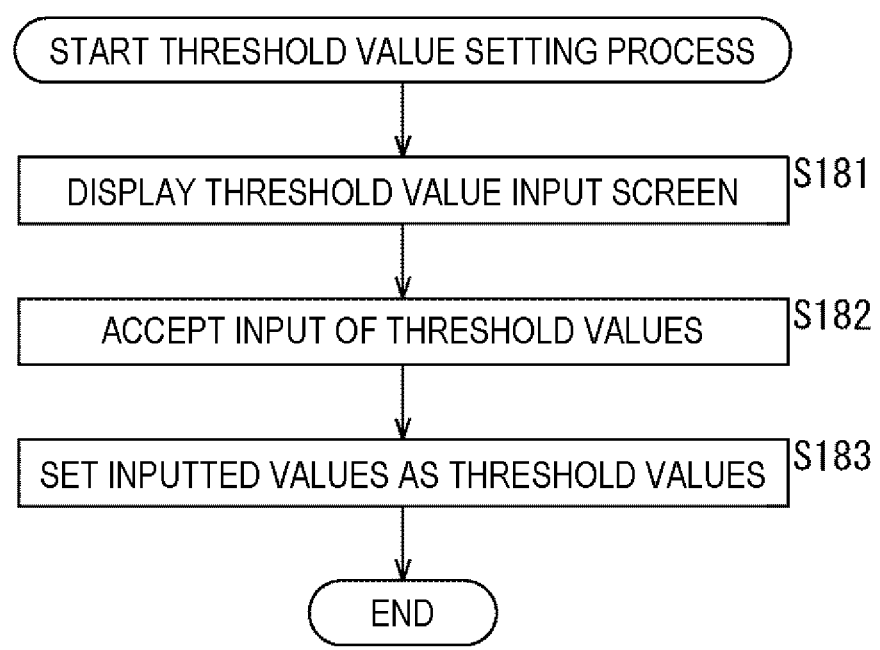
FIG. 16 is a flowchart describing an example of the flow of a threshold value setting process.

In this case, the control unit 115 performs a threshold value setting process. An example of the flow of the threshold value setting process will be described with reference to a flowchart of FIG. 16. For example, by the user performing a predetermined operation to provide an instruction to set threshold values, a threshold value setting process is disclosed.

When the threshold value setting process starts, at step S181, the control unit 115 creates a threshold value input screen which is a GUI, and allows the monitor of the output unit 122 to display the threshold value input screen.

At step S182, the control unit 115 controls the input unit 121 to accept input (user instructions) regarding the setting of threshold values based on the threshold value input screen.

At step S183, the control unit 115 sets various types of threshold values on the basis of the user instructions accepted at step S182. The control unit 115 supplies the updated threshold values to the image processor 113. The image processor 113 performs image processing using the threshold values having been updated.

When the process at step S183 is completed, the threshold value setting process ends.

By thus performing the threshold value setting process, the control unit 115 can update each threshold value. Therefore, the imaging apparatus 100 can more appropriately make a determination for target areas for image processing for more variety of images.

Although the above describes that user instructions are accepted and threshold values are updated on the basis of the user instructions, a method for updating threshold values is any and is not limited to this example. For example, threshold values may be automatically controlled according to an image serving as a target for image processing, such as a captured image.

3. Third Embodiment

<Redetermination Based on a Color Map>

Although the above describes that a redetermination as to whether an area is a target area for image processing is made using a luminance map (luminance value) as other information different than depth information, the other information is any and is not limited to this example. For example, a color map (color information) may be used as the other information.

Then, in that case, in a redetermination, an area whose color difference from a neighboring target area for image processing is smaller than a predetermined threshold value may be determined as a target area for image processing.

<Determination Unit>

Figure 17:
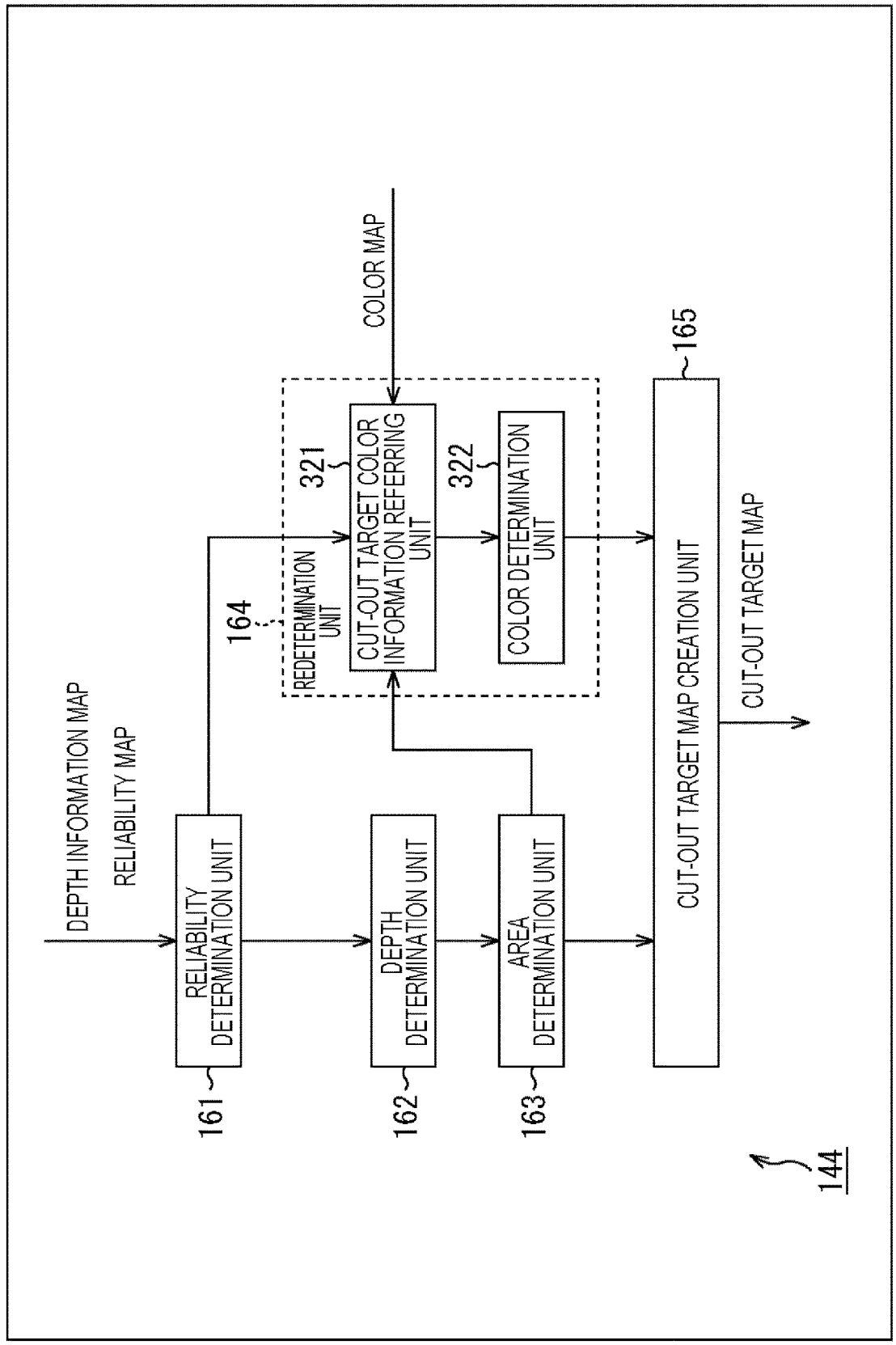
FIG. 17 is a block diagram showing an exemplary main configuration of a determination unit.

FIG. 17 is a block diagram showing an exemplary main configuration of the determination unit 144 for that case. In this case, too, the determination unit 144 basically has a similar configuration to that for the case described with reference to FIG. 3. Note, however, that in the case of FIG. 17, the redetermination unit 164 includes a cut-out target color information referring unit 321 and a color determination unit 322. In addition, the area determination unit 163 supplies a determination result to the cut-out target color information referring unit 321.

Note that, in this case, the area division unit 143 of the image processor 113 (FIG. 2) creates a color map instead of a luminance map. The color map is a distribution in which each of areas in a captured image that are divided on the basis of color information (the areas into which each pixel of the captured image is sorted) is associated with the pixels of the captured image. The format (color scale) of the color information is any. The color format may be RGB, YUV, or others.

Figure 18:
FIG. 18 is a diagram showing an example of a color map.

For example, the area division unit 143 forms an area by putting together pixels of close colors of a captured image, and divides the captured image into a plurality of areas. FIG. 18 is a diagram showing an example of a color map. In a color map 330 shown in FIG. 18, a captured image is divided into seven areas. In other words, the area division unit 143 can divide the captured image into a plurality of areas by reducing the number of colors of the captured image. Note that although in FIG. 18, for convenience of description, the color map is represented by a line drawing, in practice, the color map includes a set (distribution) of information in pixel units.

The area division unit 143 supplies the color map thus created to the cut-out target color information referring unit 321 of the redetermination unit 164.

The cut-out target color information referring unit 321 sets a sample color. The sample color is any and may be, for example, color information of a processing target's neighboring cut-out target area. For example, color information of a pixel closest to a processing target and belonging to a processing target's neighboring cut-out target area may be set as a sample color. The cut-out target color information referring unit 321 supplies information of the sample color and the color map to the color determination unit 322.

The color determination unit 322 compares each color component (or chrominance component) of color information of an area to which the processing target belongs in the color map with each color component (or chrominance component) of the sample color, and determines, on the basis of the degree of similarity therebetween, whether the processing target is a cut-out target.

For example, the color determination unit 322 compares, for each color component (or chrominance component), color information of a processing target area (pixel) with the sample color, and compares a difference (error) therebetween with a threshold value. The threshold value is any. For example, the threshold value may be an absolute value, and the color determination unit 322 may compare the absolute value of the error with the threshold value. In addition, for example, a threshold value may be set for each of the positive and negative directions of an error, and the color determination unit 322 may compare an error with a threshold value for a direction (the threshold value for the positive direction or the threshold value for the negative direction) appropriate to the direction of the error (whether the error is an error in the positive direction or an error in the negative direction). In addition, a threshold value common for all color components (or all chrominance components) may be used, or a threshold value independent for each color component (or chrominance component) may be used.

In a case where the error is smaller than the threshold value (or smaller than or equal to the threshold value), the color determination unit 322 determines that the processing target is a cut-out target. In addition, in a case where the error is greater than or equal to the threshold value (or greater than the threshold value), the color determination unit 322 determines that the processing target is a non-cut-out target.

Note that in a case where an error is smaller than the threshold value (or smaller than or equal to the threshold value) for all color components (or chrominance components), the color determination unit 322 may determine that the processing target is a cut-out target, and in a case where an error is smaller than the threshold value (or smaller than or equal to the threshold value) for only some color components (or chrominance components), too, the color determination unit 322 may determine that the processing target is a cut-out target.

For example, it is assumed that the sample color is (255, 160, 122) in RGB notation. In addition, it is assumed that the color information of a processing target pixel is (250, 128, 114) in RGB notation. In this case, the errors between the processing target pixel and the color information are (−5, −32, −8). Here, assuming that the threshold value is, for example, (+−) 60 for each of RGB, the error is smaller than the threshold value in all RGB. In such a case, the color determination unit 322 determines that the processing target pixel is a cut-out target.

In addition, assuming that the threshold value is, for example, (+−) 20 for each of RGB, the error is smaller than the threshold value in R and B, but the error is larger than the threshold value in G. In such a case, the color determination unit 322 may determine that the processing target pixel is a non-cut-out target or may determine that the processing target pixel is a cut-out target.

The color determination unit 322 supplies information indicating a determination result for each area (e.g., a pixel) to the cut-out target map creation unit 165. In this case, too, as in the case of the first embodiment, the cut-out target map creation unit 165 creates a cut-out target map on the basis of the determination results.

Areas that are determined as cut-out targets may, in some cases, differ between the case of performing a redetermination process on the basis of a luminance map as in the first embodiment and the case of performing a redetermination process on the basis of a color map as in the present embodiment. For example, in the case of using a luminance map, an area with low (dark) luminance is determined as a cut-out target, but in the case of using a color map, an area with a color closer to a sample color is determined as a cut-out target. Therefore, there is a possibility that areas having different features may be determined as cut-out target areas.

That is, by performing a redetermination process on the basis of a color map instead of a luminance map in the above-described manner, as in the case of the first embodiment, not only can an image processing target area in an image be identified more accurately, but also an area having a different feature than that for the case of the first embodiment can be obtained as a target area for image processing.

<Redetermination Process>

In this case, too, an image capturing/sending process, image processing, a cut-out target map creation process, etc., are performed in a similar manner to those for the case of the first embodiment. Note, however, that at step S123 of image processing (FIG. 12), a color map is created instead of a luminance map.

Figure 19:
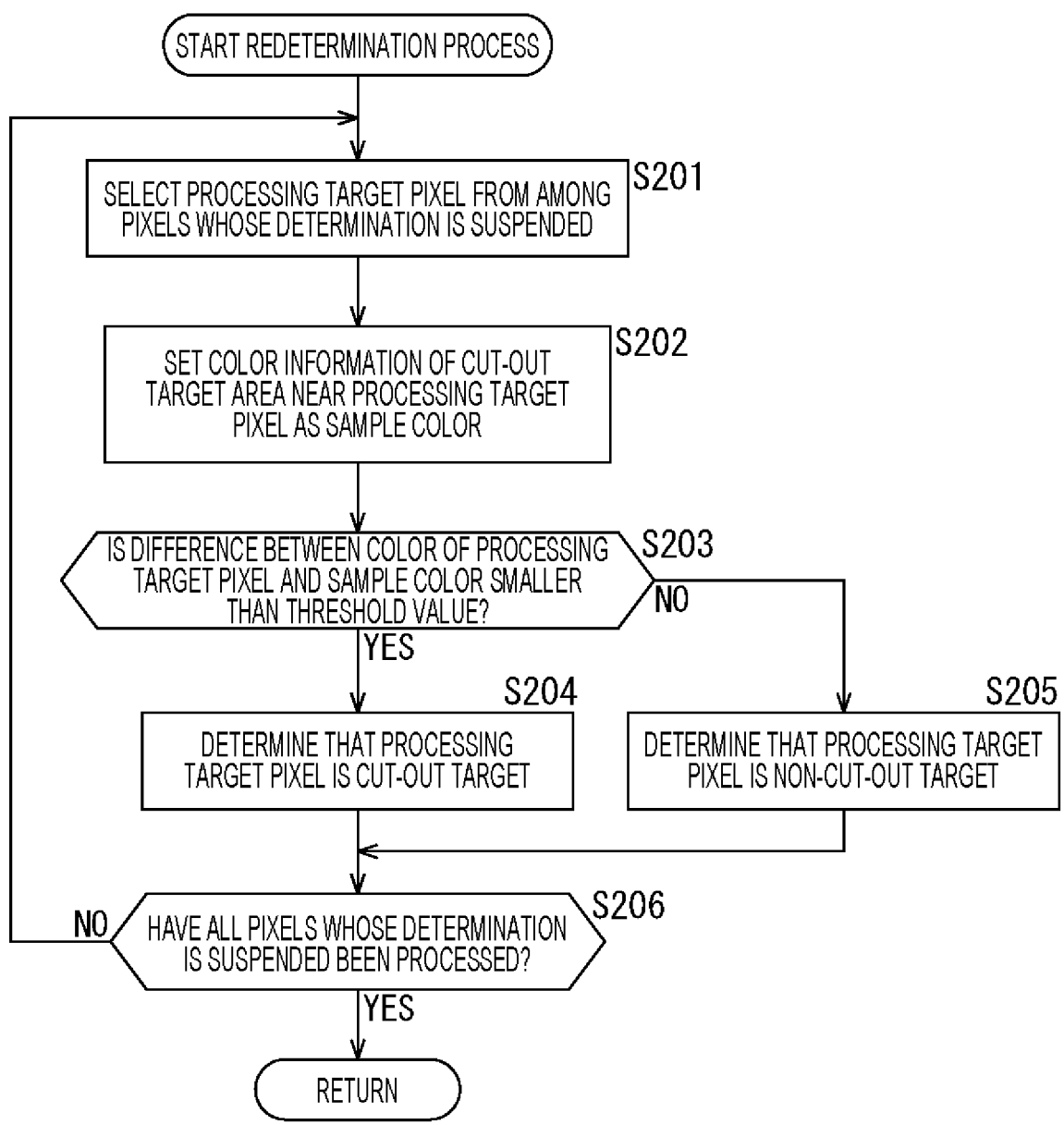
FIG. 19 is a flowchart describing an example of the flow of a redetermination process.

An example of the flow of a redetermination process for this case will be described with reference to a flowchart of FIG. 19.

When the redetermination process starts, at step S201, the cut-out target color information referring unit 321 selects a processing target pixel from among pixels whose determination is suspended in the process at step S146.

At step S202, the cut-out target color information referring unit 321 sets, as a sample color, color information of a pixel closest to the processing target pixel and belonging to a cut-out target area which is near (in the neighborhood of) the processing target pixel selected at step S201.

At step S203, the color determination unit 322 determines whether the difference (error) between color information of the processing target pixel and the sample color is smaller than a threshold value (or smaller than or equal to the threshold value). In a case where it is determined that the error is smaller than the threshold value (or smaller than or equal to the threshold value), processing proceeds to step S204.

At step S204, the color determination unit 322 determines that the processing target pixel is a cut-out target. When the process at step S204 is completed, processing proceeds to step S206.

In addition, in a case where it is determined at step S203 that the error is greater than or equal to the threshold value (or greater than the threshold value), processing proceeds to step S205.

At step S205, the color determination unit 322 determines that the processing target pixel is a non-cut-out target. When the process at step S205 is completed, processing proceeds to step S206.

At step S206, the cut-out target color information referring unit 321 determines whether all pixels whose determination is suspended in the process at step S146 have been processed. In a case where it is determined that there is an unprocessed pixel, processing returns to step S201 and processes thereafter are repeated. That is, a flow from step S201 to S206 is performed for each pixel whose determination is suspended in the process at step S146. Then, in a case where it is determined at step S206 that all pixels whose determination is suspended in the process at step S146 have been processed, the redetermination process ends and processing returns to FIG. 13.

By performing each process in the above-described manner, target areas for image processing can be obtained on the basis of depth information with high reliability and other information, enabling to more accurately identify image processing target areas in an image.

<Threshold Value Control>

Note that, as with the threshold value of a luminance value, etc., the threshold value of color information may also be a predetermined value (fixed value) which is determined in advance, or may be a value (variable value) that can be set by a user, etc. For example, as with the threshold value of a luminance value, etc., the threshold value of color information may also be able to be controlled by the user on the basis of a GUI (threshold value input screen). That is, in the case of the present embodiment, too, for example, the imaging apparatus 100 (control unit 115) may allow the monitor of the output unit 122 to display a GUI that accepts input for setting threshold values by the user, etc., and accept user instructions inputted on the basis of the GUI through the input unit 121, and set various types of threshold values to values specified by the user instructions.

Figure 20:
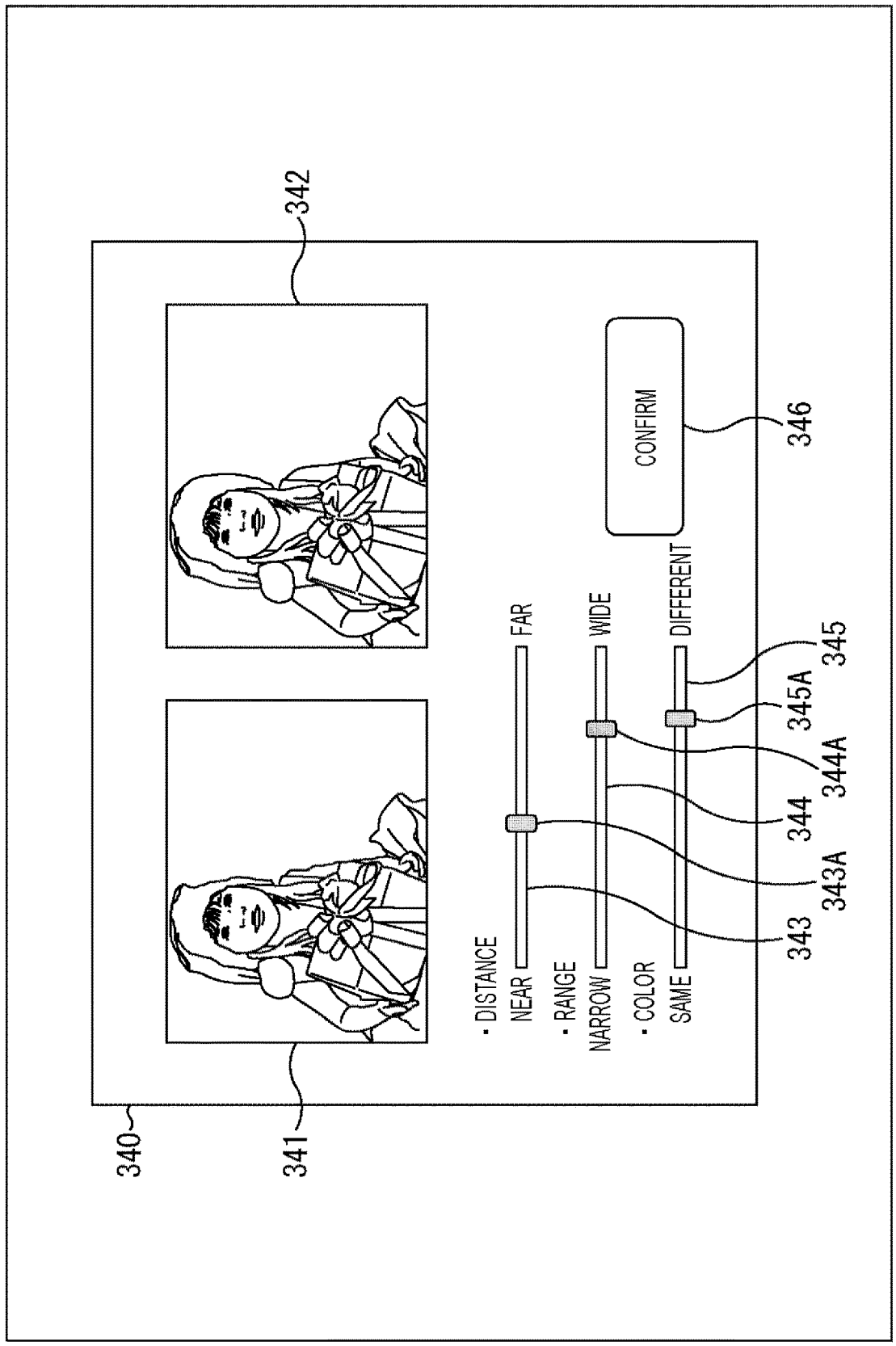
FIG. 20 is a diagram describing an example of a threshold value input screen.

FIG. 20 is a diagram showing an example of a threshold value input screen which is a GUI displayed to set the threshold value of color information. In FIG. 20, a threshold value input screen 340 has an image display portion 341, an image display portion 342, a slide bar 343, a slide bar 344, a slide bar 345, and a confirm button 346.

The image display portion 341 is a display portion similar to the image display portion 301 of the threshold value input screen 300, and displays a captured image in a state in which threshold value setting control based on operations performed on the threshold value input screen 340 is not reflected.

On the other hand, the image display portion 342 is a display portion similar to the image display portion 302 of the threshold value input screen 300, and displays a captured image in a state in which threshold value setting control based on operations performed on the threshold value input screen 340 is reflected.

As with the slide bar 303 of the threshold value input screen 300, the slide bar 343 is to control the threshold value setting for depth information. A pointer 343A corresponds to the pointer 303A of the threshold value input screen 300.

As with the slide bar 304 of the threshold value input screen 300, the slide bar 344 is to control the threshold value setting for reliability information. A pointer 344A corresponds to the pointer 304A of the threshold value input screen 300.

The slide bar 345 is to control the threshold value setting for color information. For example, by the user moving a pointer 345A of the slide bar 345 in the left or right direction in the drawing along the slide bar 345, the threshold value setting for color information is changed according to the position of the pointer 345A.

For example, if the user moves the pointer 345A in the left direction in the drawing, the threshold value decreases, and if the user moves the pointer 345A in the right direction in the drawing, the threshold value increases. That is, by the user controlling the position of the pointer 345A, the user can easily control the range of color information for a cut-out target.

For example, in a case where there is one threshold value of color information and a pixel whose error with respect to a sample color is smaller than the threshold value serves as a cut-out target, if the threshold value is increased (moved to the "different" side), a range of color for a cut-out target increases, and thus, a wider area can serve as a cut-out target. On the other hand, if the threshold value is reduced (moved to the "same" side), the range of color for a cut-out target decreases, and thus, there is a possibility that an area that can serve as a cut-out target may be reduced.

For example, if a redetermination process using color information is performed, a portion with a color (e.g., black, etc.) that is difficult to reflect near-infrared light can be set as a cut-out target area. For example, in a portion in the vicinity of a subject's boundary (a boundary between a subject portion and other portions), due to the occurrence of shade, etc., black increases and the reliability of depth information decreases, and thus, the portion may be determined as a non-cut-out target. By performing a redetermination process using color information, such a portion in the vicinity of a subject's boundary can be set as a cut-out target.

However, for example, in a case where the shade is too dark, there is a possibility that a color error between the shade portion and its surrounding cut-out target area may exceed the threshold value, and accordingly, the shade portion may be set as a non-cut-out target. In such a case, by the user increasing the threshold value by operating the pointer 345A to the right side in the drawing, the color error between the shade portion and its surrounding cut-out target area can be made smaller than the threshold value, and thus, there is a possibility that the shade portion can be set as a cut-out target.

In addition, for example, in a case where a subject portion and its neighboring non-subject portion are close to each other in color, by a redetermination process using color information, there is a possibility that the non-subject portion may also be set as a cut-out target. In such a case, by the user operating the pointer 345A to the left side in the drawing, a color error between the subject portion and its neighboring non-subject portion can be made larger than the threshold value, and thus, there is a possibility that the non-subject portion can be set as a non-cut-out target.

That is, the threshold value input screen is configured to be provided with slide bars for variable threshold values. Note that all threshold values may be variable or some threshold values may be variable. In addition, a slide bar may be provided only for some of the variable threshold values.

The confirm button 346 is a GUI button similar to the confirm button 306 of the threshold value input screen 300. By pressing the confirm button 346, control of the threshold values by slide bar operations is confirmed.

By making various types of threshold values variable and displaying the threshold value input screen 340 to accept instructions regarding the setting of the threshold values in the above-described manner, the imaging apparatus 100 can more appropriately make a determination for target areas for image processing for more variety of images.

4. Fourth Embodiment

<Redetermination Based on a Hairstyle Model>

For example, a hairstyle model may be used as other information used for a redetermination process, and on the basis of hairstyle model data representing the hairstyle model, an area belonging to a hair area in the hairstyle model may be determined as a target area for image processing.

Figure 21:
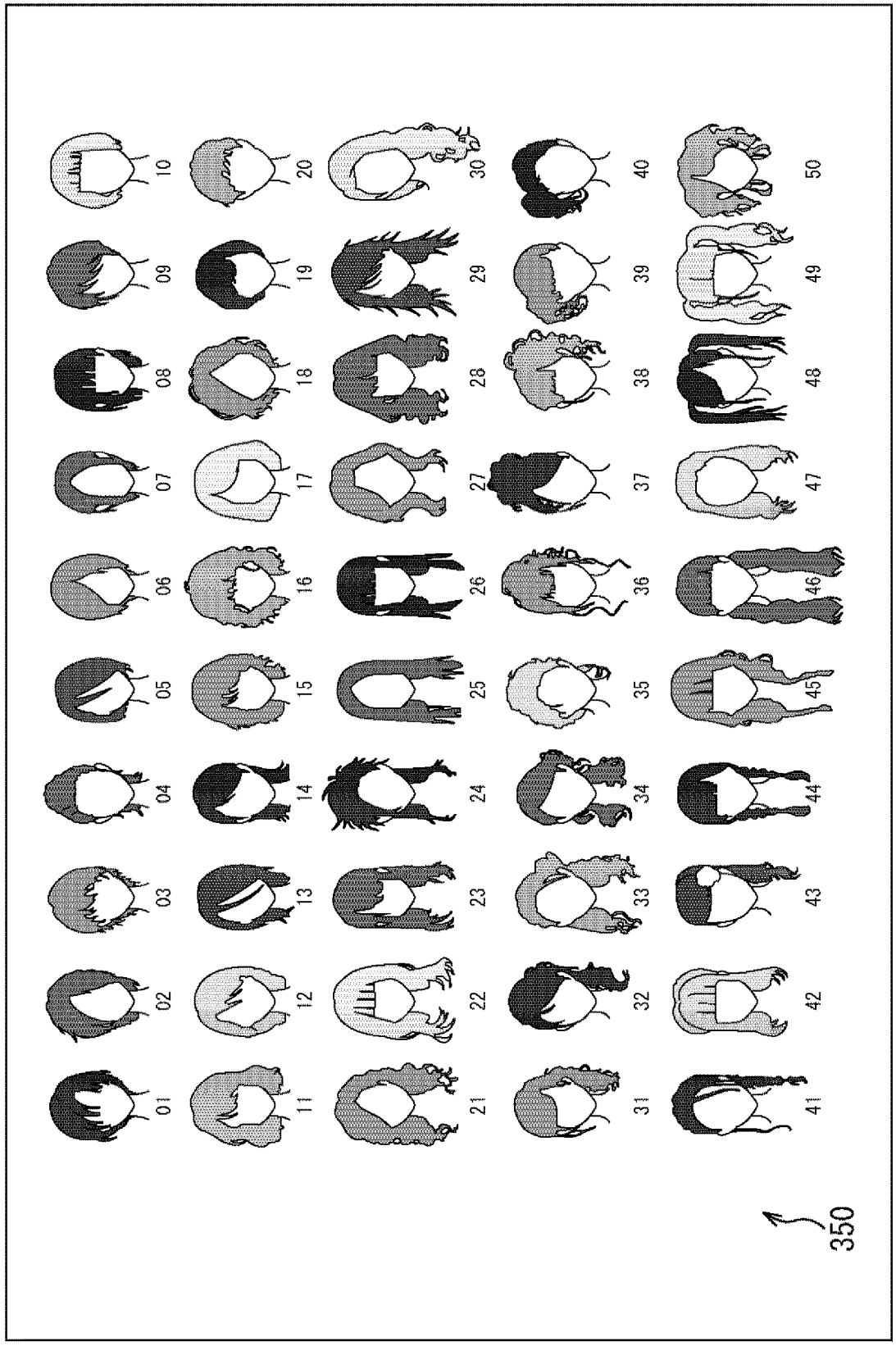
FIG. 21 is a diagram showing an example of hair model data.

For example, a plurality of models for hairstyles (also referred to as hairstyle models) such as those shown in FIG. 21 are prepared in advance, the user is allowed to select a hairstyle model close to the actual hairstyle of a subject from among the hairstyle models, the hairstyle model is placed on the subject in a captured image (the hairstyle model is superimposed on the captured image and the hairstyle model is aligned such that a face portion of the subject in the captured image and the hairstyle model are superimposed on top of each other without any awkwardness), and an area in the captured image corresponding to a hair portion (also referred to as a hair area) in the hairstyle model is set as a cut-out target.

Hairstyle model data 350 shown in FIG. 21 is data including images of 50 types of hairstyle models. Data of a hairstyle model may be image data or may be information indicating a shape, a range, a color, etc. (information that can be formed into an image). In addition, other information regarding hairstyles may be included in the hairstyle model data 350.

The hairstyle model data 350 is, for example, stored in advance in the storage unit 123, the removable medium 131, etc. The control unit 115 reads and obtains the hairstyle model data 350 therefrom. Note that the hairstyle model data 350 may be supplied from an external source through the input unit 121 and the communication unit 124.

The control unit 115 displays a GUI including a list of hairstyle models (characters, images, etc.) which are included in the hairstyle model data 350, on the monitor of the output unit 122 to allow the user to select a hairstyle. The control unit 115 controls the input unit 121 to accept user input, i.e., selection of a hairstyle, on the GUI and supplies data of the selected hairstyle model to the image processor 113. The determination unit 144 of the image processor 113 performs a redetermination process using the supplied data of the hairstyle model.

In general, in a captured image, a head hair portion has a complex shape and thus is an unstable area that can become various patterns depending on the state of light, etc. Hence, if a determination as to whether an area is a cut-out target is made on the basis of image information (luminance, color, etc.) of a captured image, then there is a possibility that a head hair portion may not be able to be stably and accurately set as a cut-out target (there is a possibility of dependence on images). On the other hand, by determining whether an area is a cut-out target, using a hairstyle model in the above-described manner, a cut-out target can be specified by a physical shape (physical range), and thus, a stable area can be set as a cut-out target independently of the image.

Note that a method for aligning a hairstyle model with respect to a captured image (a face portion of a subject) is any. For example, the imaging apparatus 100 may identify a face portion of a subject in a captured image by performing face detection etc., and align a hairstyle model with respect to the face portion, or may display a captured image and a hairstyle model as a GUI on the monitor to allow the user to perform alignment.

In addition, hairstyle models prepared (included in the hairstyle model data 350) are any and are not limited to the example of FIG. 21. In addition, the number of hairstyle models prepared is also any and is not limited to the example of FIG. 21. Furthermore, the user may be allowed to process a hairstyle model (change a hairstyle). In addition, the user may be allowed to create a hairstyle model. For example, the user may be allowed to perform handwriting input of a hairstyle model using a GUI, etc., or the user may be allowed to input another captured image, etc., so that a hairstyle of a subject included in the captured image can be registered as a model.

Note that the method using a hairstyle model and another method may be combined. For example, a method using a luminance value and the method using a hairstyle model may be combined. That is, an area having a luminance lower than a predetermined threshold value and belonging to a hair area in a hairstyle model may be determined as a target area for image processing. By doing so, a hair portion of a subject can be more accurately determined as a target area for image processing.

<Determination Unit>

Figure 22:
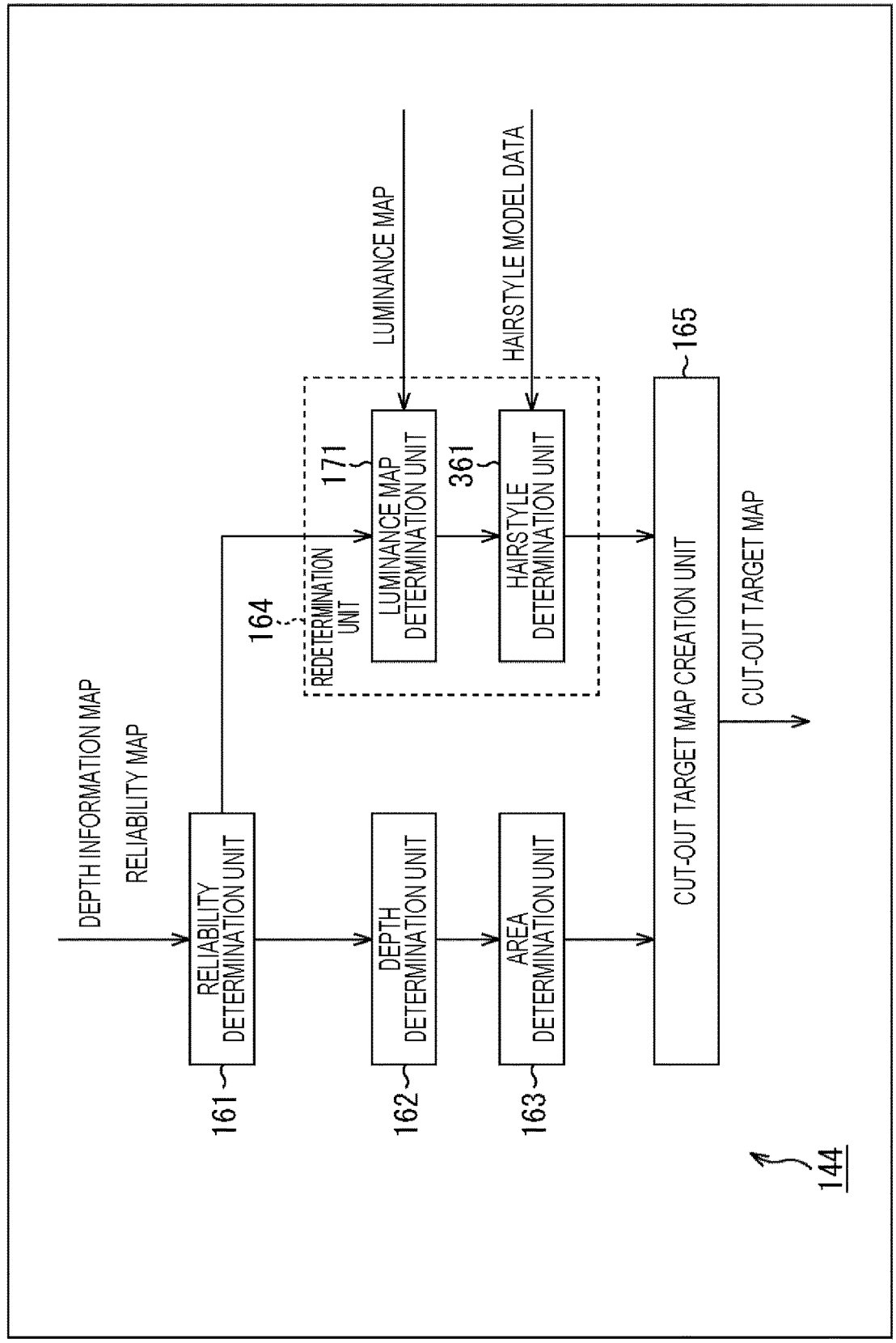
FIG. 22 is a block diagram showing an exemplary main configuration of a determination unit.

FIG. 22 is a block diagram showing an exemplary main configuration of the determination unit 144 for this case. In this case, too, the determination unit 144 basically has a similar configuration to that for the case described with reference to FIG. 3. Note, however, that in the case of FIG. 22, the redetermination unit 164 includes a hairstyle determination unit 361 instead of the neighboring area determination unit 172. In addition, the area determination unit 163 does not supply a determination result to the redetermination unit 164. Note that, in this case, hairstyle model data, etc., selected by the user, etc., is supplied, for example, from the control unit 115, etc., to the hairstyle determination unit 361.

The luminance map determination unit 171 determines, as in the case of FIG. 3, whether an area is a cut-out target area, on the basis of a luminance value and supplies a determination result to the hairstyle determination unit 361.

The hairstyle determination unit 361 compares the position of an area (e.g., a pixel) whose luminance value is determined by the luminance map determination unit 171 to be lower than a predetermined threshold value (or lower than or equal to the threshold value) with the position of an aligned hairstyle model, and determines whether the area is located in a hair area in the hairstyle model (whether the area belongs to the hair area in the hairstyle model). Then, in a case where the area is located in the hair area in the hairstyle model, the area is determined as a cut-out target. In addition, in a case where the area is not located in the hair area in the hairstyle model, the area is determined as a non-cut-out target.

The hairstyle determination unit 361 supplies a determination result to the cut-out target map creation unit 165. The cut-out target map creation unit 165 creates, in this case, too, as in the case of the first embodiment, a cut-out target map on the basis of determination results.

By doing so, a hair portion of a subject can be more stably set as a target area for image processing.

<Redetermination Process>

Figure 23:
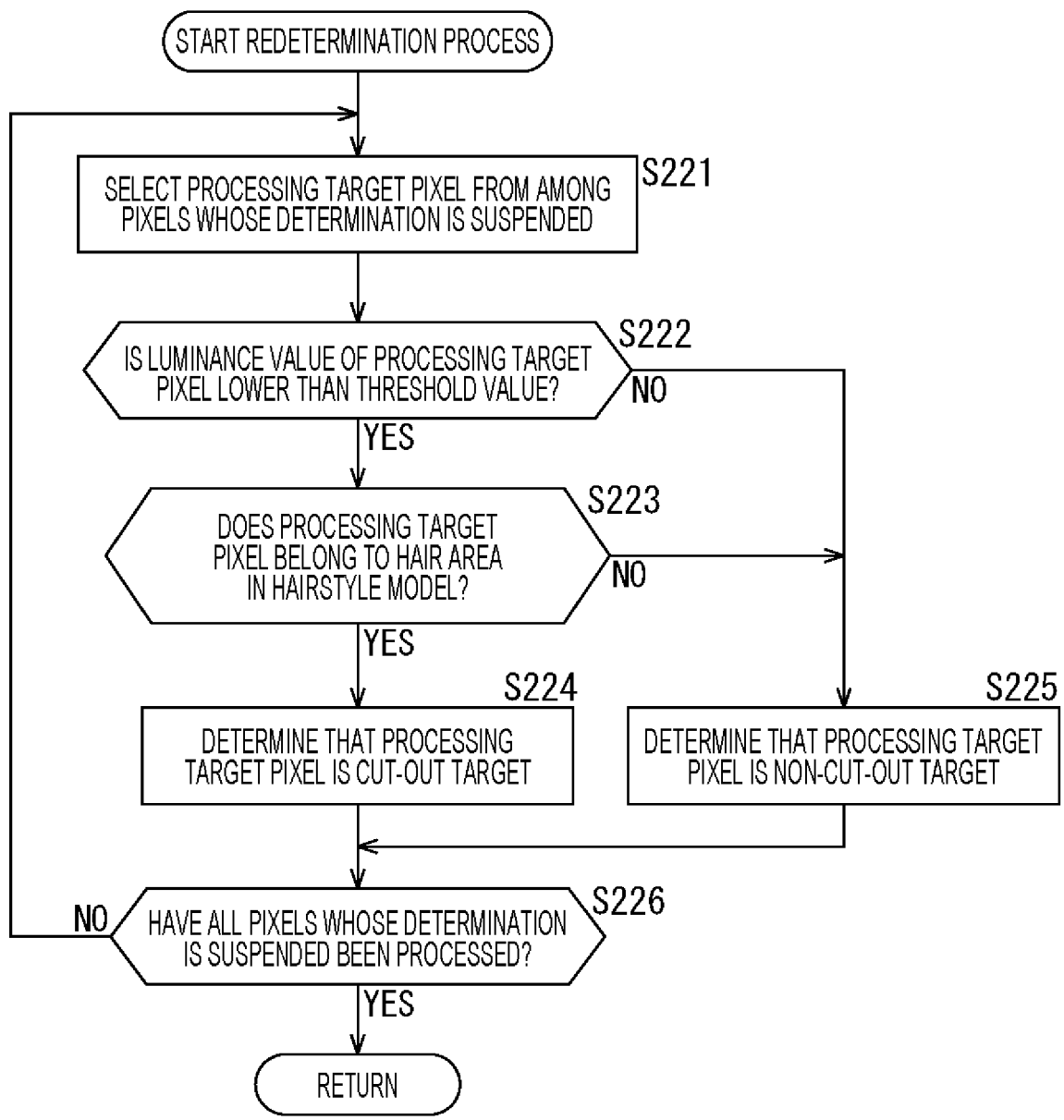
FIG. 23 is a flowchart describing an example of the flow of a redetermination process.

In this case, too, an image capturing/sending process, image processing, a cut-out target map creation process, etc., are performed in a similar manner to those for the case of the first embodiment. An example of the flow of a redetermination process for this case will be described with reference to a flowchart of FIG. 23.

When the redetermination process starts, at step S221, the luminance map determination unit 171 selects a processing target pixel from among pixels whose determination is suspended in the process at step S146.

At step S222, the luminance map determination unit 171 determines, on the basis of a luminance map, whether the luminance value of the processing target pixel is lower than a predetermined threshold value (an image having the processing target pixel is darker than brightness corresponding to the threshold value). In a case where it is determined that the luminance value is lower than the threshold value, processing proceeds to step S223.

At step S223, the hairstyle determination unit 361 determines whether the processing target pixel belongs to a hair area in an adopted hairstyle model (e.g., a hairstyle model selected by the user, etc.). In a case where it is determined that the processing target pixel belongs to the hair area, processing proceeds to step S224.

At step S224, the hairstyle determination unit 361 determines that the processing target pixel is a cut-out target (i.e., the processing target pixel belongs to a cut-out target area). When the process at step S224 is completed, processing proceeds to step S226.

In addition, in a case where it is determined at step S222 that the luminance value of the processing target pixel is not lower than the threshold value (greater than or equal to the threshold value (the image having the processing target pixel is brighter than the brightness corresponding to the threshold value)), processing proceeds to step S225. In addition, in a case where it is determined at step S223 that the processing target pixel does not belong to the hair area of the hairstyle model, processing proceeds to step S225.

At step S225, the hairstyle determination unit 361 determines that the processing target pixel is a non-cut-out target (not a cut-out target (i.e., the processing target pixel belongs to a non-cut-out target area)). When the process at step S225 is completed, processing proceeds to step S226.

At step S226, the luminance map determination unit 171 determines whether all pixels whose determination is suspended in the process at step S146 have been processed. In a case where it is determined that there is an unprocessed pixel, processing returns to step S221 and processes thereafter are repeated. That is, a flow from step S221 to S226 is performed for each pixel whose determination is suspended in the process at step S146. Then, in a case where it is determined at step S226 that all pixels whose determination is suspended in the process at step S146 have been processed, the redetermination process ends and processing returns to FIG. 13.

By performing each process in the above-described manner, target areas for image processing can be obtained on the basis of depth information with high reliability and other information, enabling to more accurately identify image processing target areas in an image.

5. Fifth Embodiment

<Redetermination Based on a Texture Model>

For example, a hair texture model may be used as other information used for a redetermination process, and on the basis of texture model data representing the texture model, an area having a texture similar to the texture model may be determined as a target area for image processing.

Figure 24:
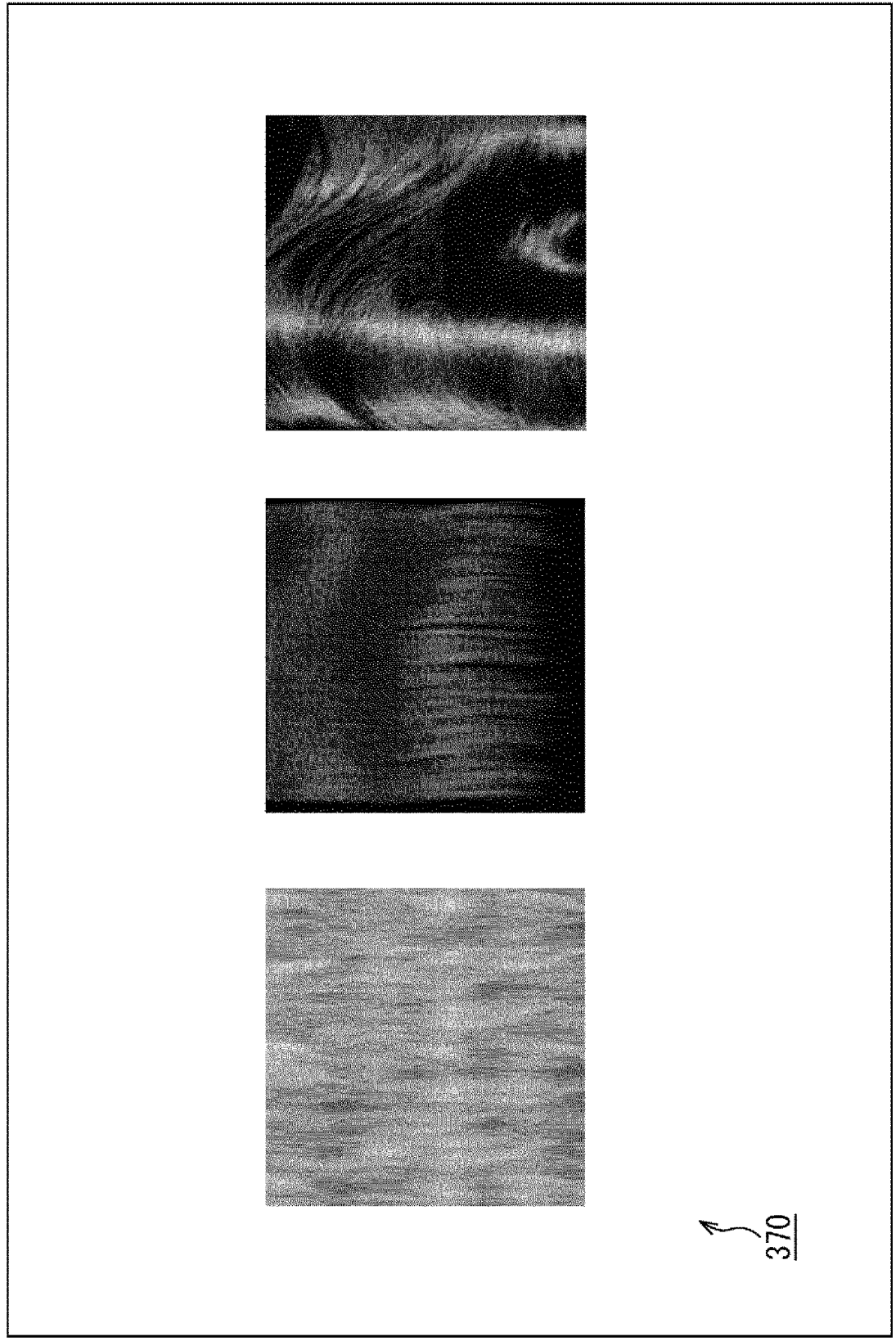
FIG. 24 is a diagram showing an example of texture model data.

For example, a plurality of models for hair textures (also referred to as texture models) such as those shown in FIG. 24 are prepared in advance, the user, etc., is allowed to select a texture model close to the actual head hair (color, hair quality, etc.) of a subject from among the texture models, and an area in a captured image that has a texture close to the selected texture model is set as a cut-out target.

Texture model data 370 shown in FIG. 24 is data including images of three types of texture models. Data of a texture model may be image data or may be information indicating a pattern, a color, etc. (information that can be formed into an image). In addition, other information regarding textures may be included in the texture model data 370.

The texture model data 370 is, for example, stored in advance in the storage unit 123, the removable medium 131, etc. The control unit 115 reads and obtains the texture model data 370 therefrom. Note that the texture model data 370 may be supplied from an external source through the input unit 121 and the communication unit 124.

The control unit 115 displays a GUI including a list of texture models (characters, images, etc.) which are included in the texture model data 370, on the monitor of the output unit 122 to allow the user to select a texture. The control unit 115 controls the input unit 121 to accept user input, i.e., selection of a texture, on the GUI and supplies data of the selected texture model to the image processor 113. The determination unit 144 of the image processor 113 performs a redetermination process using the supplied data of the texture model.

That is, using the texture, what kind of area the area is (e.g., whether the area is a head hair portion or not, etc.) is identified. Hence, by thus determining a target area for image processing on the basis of the texture, a more accurate determination can be made.

Note that texture models prepared (included in the texture model data 370) are any and are not limited to the example of FIG. 24. In addition, the number of texture models prepared is also any and is not limited to the example of FIG. 24. In addition, the textures may be other textures than hair (e.g., clothes, skin, wallpapers, etc.). Furthermore, the user may be allowed to process a texture model or create (or newly register) a texture model. For example, the user may be allowed to perform handwriting input of a new texture using a GUI, etc., or the user may be allowed to input another image, etc., so that a texture included in the image can be registered as a model.

In addition, an area with a texture close to a texture model may be set as a non-cut-out target. For example, texture models for wallpapers, furniture, nature, etc., may be prepared, and an area with a texture different than those may be determined as a subject (as a cut-out target).

Note that the method using a texture model and another method may be combined. For example, a method using a luminance value and the method using a texture model may be combined. That is, an area having a luminance lower than a predetermined threshold value and having a texture close to a texture model may be determined as a target area for image processing. By doing so, a more accurate determination can be made.

<Determination Unit>

Figure 25:
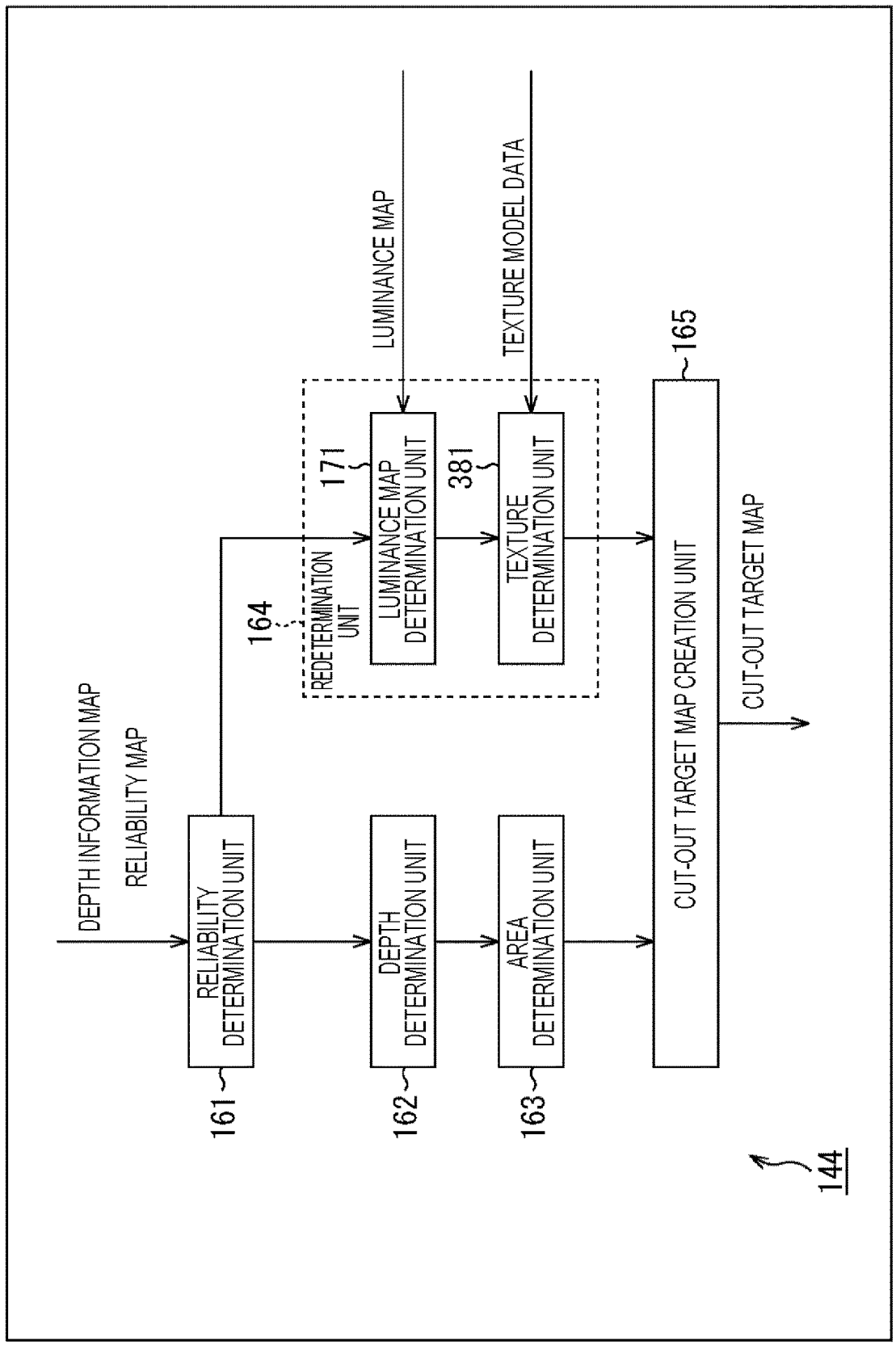
FIG. 25 is a block diagram showing an exemplary main configuration of a determination unit.

FIG. 25 is a block diagram showing an exemplary main configuration of the determination unit 144 for this case. In this case, too, the determination unit 144 basically has a similar configuration to that for the case described with reference to FIG. 3. Note, however, that in the case of FIG. 25, the redetermination unit 164 includes a texture determination unit 381 instead of the neighboring area determination unit 172. In addition, the area determination unit 163 does not supply a determination result to the redetermination unit 164. Note that, in this case, texture model data, etc., selected by the user, etc., is supplied, for example, from the control unit 115, etc., to the texture determination unit 381.

The luminance map determination unit 171 determines, as in the case of FIG. 3, whether an area is a cut-out target area, on the basis of a luminance value and supplies a determination result to the texture determination unit 381.

The texture determination unit 381 determines whether a texture of a predetermined area to which an area (e.g., a pixel) whose luminance value is determined by the luminance map determination unit 171 to be lower than a predetermined threshold value (or lower than or equal to the threshold value) belongs is similar to a texture of texture model data (e.g., whether the difference therebetween is less than or equal to a predetermined threshold value). Then, in a case where the texture is similar, the texture determination unit 381 determines that the area is a cut-out target. In addition, in a case where the texture is not similar, the texture determination unit 381 determines that the area is a non-cut-out target.

The texture determination unit 381 supplies a determination result to the cut-out target map creation unit 165. The cut-out target map creation unit 165 creates, in this case, too, as in the case of the first embodiment, a cut-out target map on the basis of determination results.

By doing so, target areas for image processing can be more accurately determined.

<Redetermination Process>

Figure 26:
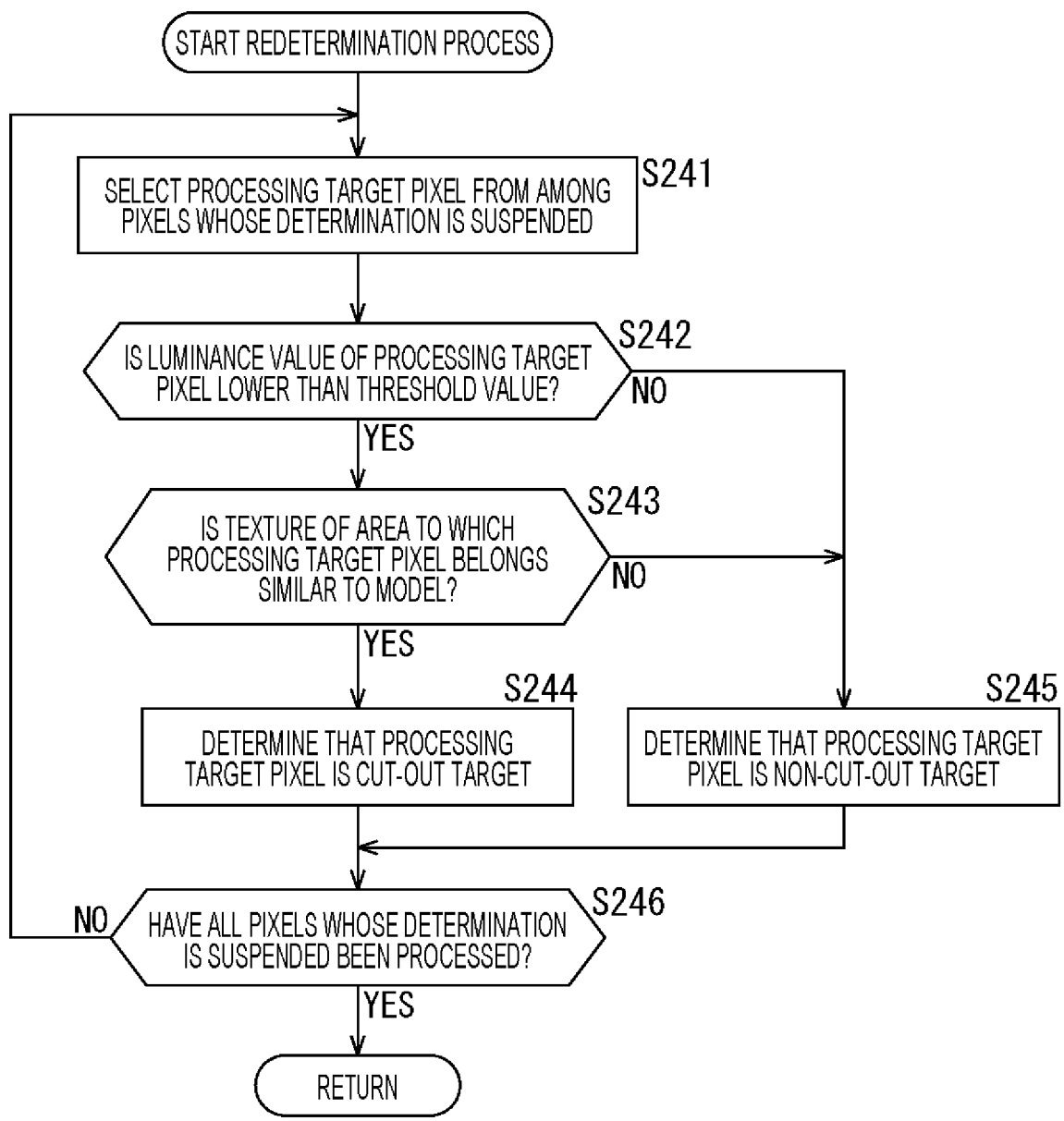
FIG. 26 is a flowchart describing an example of the flow of a redetermination process.

In this case, too, an image capturing/sending process, image processing, a cut-out target map creation process, etc., are performed in a similar manner to those for the case of the first embodiment. An example of the flow of a redetermination process for this case will be described with reference to a flowchart of FIG. 26.

When the redetermination process starts, at step S241, the luminance map determination unit 171 selects a processing target pixel from among pixels whose determination is suspended in the process at step S146.

At step S242, the luminance map determination unit 171 determines, on the basis of a luminance map, whether the luminance value of the processing target pixel is lower than a predetermined threshold value (an image having the processing target pixel is darker than brightness corresponding to the threshold value). In a case where it is determined that the luminance value is lower than the threshold value, processing proceeds to step S243.

At step S243, the texture determination unit 381 determines whether a texture of an area to which the processing target pixel belongs is similar to a texture of an adopted texture model (e.g., a texture model selected by the user, etc.). In a case where it is determined that those textures are similar to each other, processing proceeds to step S244.

At step S244, the texture determination unit 381 determines that the processing target pixel is a cut-out target (i.e., the processing target pixel belongs to a cut-out target area). When the process at step S244 is completed, processing proceeds to step S246.

In addition, in a case where it is determined at step S242 that the luminance value of the processing target pixel is not lower than the threshold value (greater than or equal to the threshold value (the image having the processing target pixel is brighter than the brightness corresponding to the threshold value)), processing proceeds to step S245. In addition, in a case where it is determined at step S243 that the textures are not similar to each other, processing proceeds to step S245.

At step S245, the texture determination unit 381 determines that the processing target pixel is a non-cut-out target (not a cut-out target (i.e., the processing target pixel belongs to a non-cut-out target area)). When the process at step S245 is completed, processing proceeds to step S246.

At step S246, the luminance map determination unit 171 determines whether all pixels whose determination is suspended in the process at step S146 have been processed. In a case where it is determined that there is an unprocessed pixel, processing returns to step S241 and processes thereafter are repeated. That is, a flow from step S241 to S246 is performed for each pixel whose determination is suspended in the process at step S146. Then, in a case where it is determined at step S246 that all pixels whose determination is suspended in the process at step S146 have been processed, the redetermination process ends and processing returns to FIG. 13.

By performing each process in the above-described manner, target areas for image processing can be obtained on the basis of depth information with high reliability and other information, enabling to more accurately identify image processing target areas in an image.

6. Sixth Embodiment

<Redetermination Based on Shape Recognition>

For example, the shape of a subject may be recognized in a captured image and a shape recognition result may be used as other information for a redetermination process. For example, an area that can be estimated as a target for image processing from the shape recognition result may be determined as a target area for image processing.

For example, from an area that is determined as a cut-out target on the basis of depth information, the shape of a subject belonging to the area is recognized, and a redetermination is further made for an area in the neighborhood of the area on the basis of the shape of the subject. In the redetermination, an area that is in the neighborhood of the area already determined as a cut-out target and that can be estimated as a part of the subject from the recognized shape of the subject is added to the cut-out target. That is, the shape of a subject is recognized on the basis of a cut-out target area, and an area that has not been determined as a cut-out target despite its being a part of the subject is estimated on the basis of the shape of the subject.

Figure 27B:
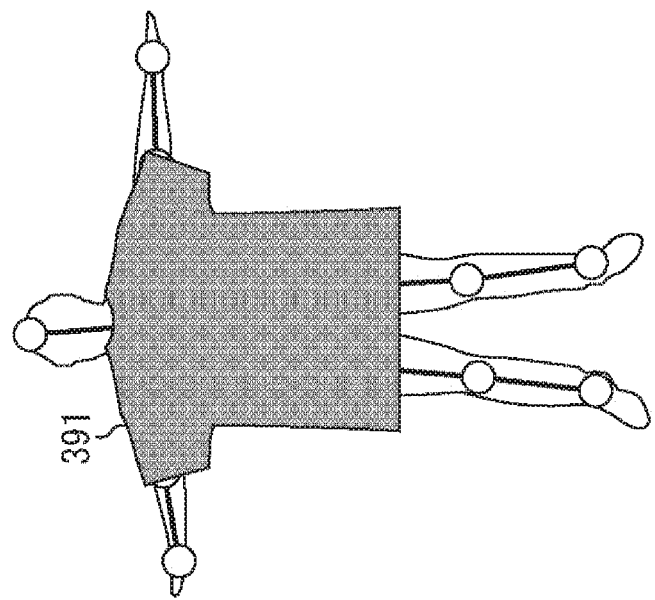
FIGS. 27A and 27 are diagrams showing an example of a state of shape recognition.
Figure 27A:
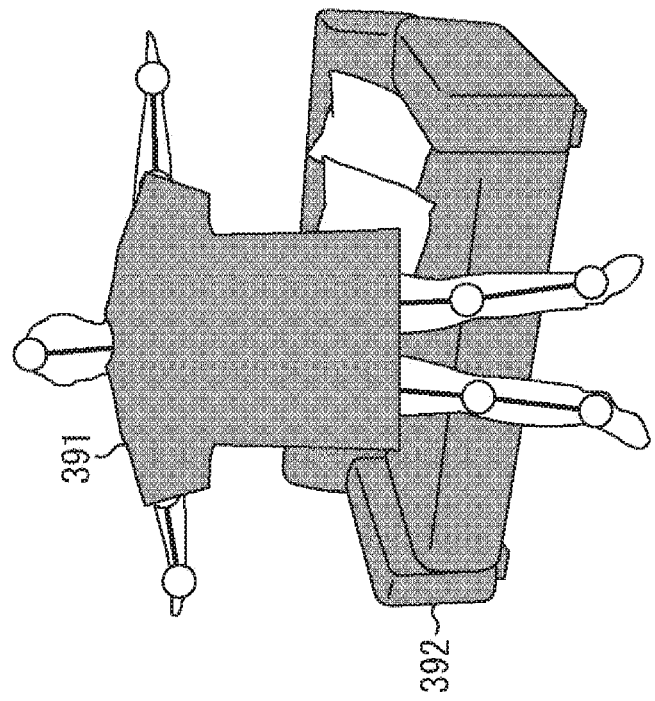

For example, in a case where, as shown in FIG. 27A, in a captured image with a composition in which a sofa 392 is placed right behind a subject 391, the color of clothing of the subject 391 is similar to the color of the sofa 392 (e.g., a case where both are black), it becomes difficult to detect a boundary between the clothing of the subject 391 and the sofa 392, and thus, there is a possibility that not only the subject 391 but also the sofa 392 may be determined as a cut-out target.

Hence, for example, the shape of the subject is recognized from the face, arm, and leg portions, etc., of the subject 391 that is determined as a cut-out target area on the basis of depth information, and on the basis of a recognition result, a body portion (i.e., a clothing portion) of the subject 391 is also estimated as a part of the subject 391. By determining a cut-out target area on the basis of such an estimation result, as shown in FIG. 27B, the clothing portion of the subject 391 can be determined as a cut-out target area and the "sofa 392" portion can be determined as a non-cut-out target area.

That is, the subject portion can be more accurately determined as a target for image processing.

Note that a method for recognizing the shape of a subject is any. Note also that the method using subject shape recognition and another method may be combined. For example, a method using a luminance value and the method using subject shape recognition may be combined. That is, an area that has a luminance lower than a predetermined threshold value and that can be estimated as a target area for image processing on the basis of the shape of a subject may be determined as a target area for image processing. By doing so, a more accurate determination can be made.

<Determination Unit>

Figure 28:
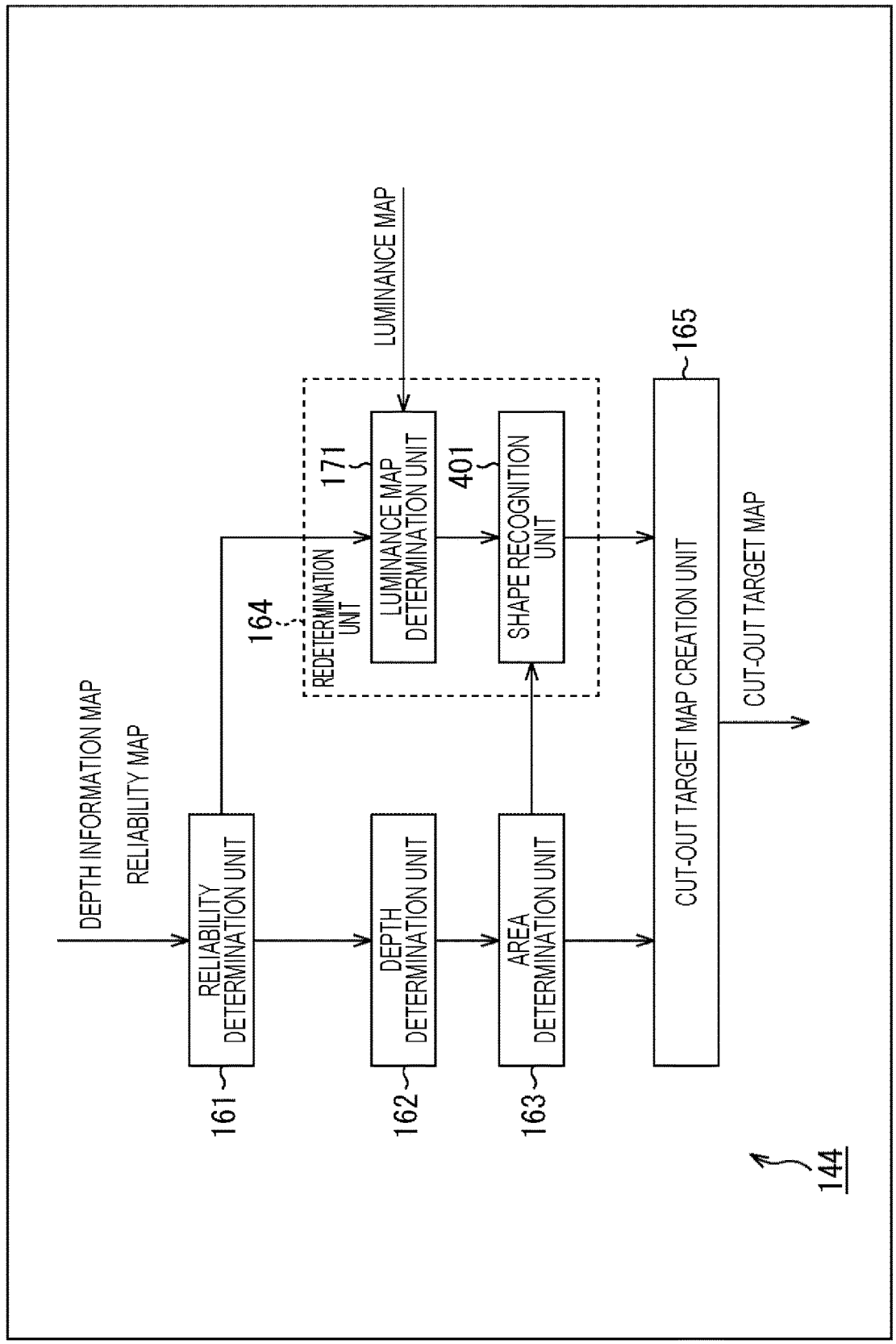
FIG. 28 is a block diagram showing an exemplary main configuration of a determination unit.

FIG. 28 is a block diagram showing an exemplary main configuration of the determination unit 144 for this case. In this case, too, the determination unit 144 basically has a similar configuration to that for the case described with reference to FIG. 3. Note, however, that in the case of FIG. 28, the redetermination unit 164 includes a shape recognition unit 401 instead of the neighboring area determination unit 172. In addition, the area determination unit 163 supplies a determination result to the shape recognition unit 401.

The luminance map determination unit 171 determines, as in the case of FIG. 3, whether an area is a cut-out target area, on the basis of a luminance value and supplies a determination result to the shape recognition unit 401.

The shape recognition unit 401 recognizes the shape of a subject belonging to a cut-out target area, on the basis of a determination result obtained by the area determination unit 163. In addition, the shape recognition unit 401 determines an area that can be estimated as a cut-out target on the basis of the recognized shape of the subject, as a cut-out target and determines an area that cannot be estimated, as a non-cut-out target.

The shape recognition unit 401 supplies a determination result to the cut-out target map creation unit 165. The cut-out target map creation unit 165 creates, in this case, too, as in the case of the first embodiment, a cut-out target map on the basis of determination results.

By doing so, target areas for image processing can be more accurately determined.

<Redetermination Process>

Figure 29:
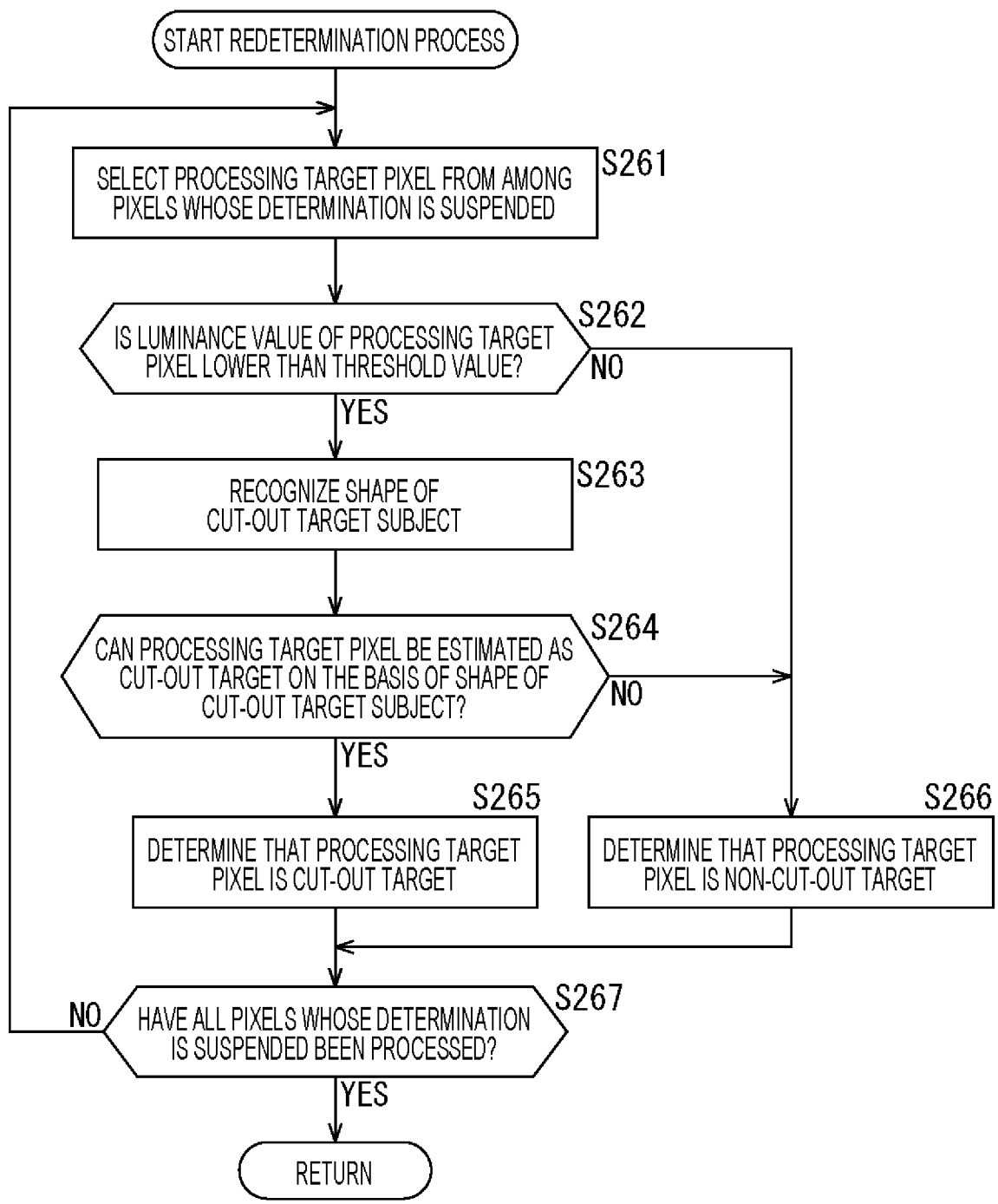
FIG. 29 is a flowchart describing an example of the flow of a redetermination process.

In this case, too, an image capturing/sending process, image processing, a cut-out target map creation process, etc., are performed in a similar manner to those for the case of the first embodiment. An example of the flow of a redetermination process for this case will be described with reference to a flowchart of FIG. 29.

When the redetermination process starts, at step S261, the luminance map determination unit 171 selects a processing target pixel from among pixels whose determination is suspended in the process at step S146.

At step S262, the luminance map determination unit 171 determines, on the basis of a luminance map, whether the luminance value of the processing target pixel is lower than a predetermined threshold value (an image having the processing target pixel is darker than brightness corresponding to the threshold value). In a case where it is determined that the luminance value is lower than the threshold value, processing proceeds to step S263.

At step S263, the shape recognition unit 401 recognizes, on the basis of an image of an area (cut-out target area) that is determined as a cut-out target in the process at step S144, the overall shape of a subject included in the cut-out target area.

At step S264, the shape recognition unit 401 determines whether the processing target pixel can be estimated as a cut-out target on the basis of the shape of the subject recognized at step S263. In a case where it is determined that the processing target pixel is located in the area recognized as the subject at step S263 and can be estimated as a cut-out target, processing proceeds to step S265.

At step S265, the shape recognition unit 401 determines that the processing target pixel is a cut-out target (i.e., the processing target pixel belongs to the cut-out target area). When the process at step S265 is completed, processing proceeds to step S267.

In addition, in a case where it is determined at step S262 that the luminance value of the processing target pixel is not lower than the threshold value (greater than or equal to the threshold value (the image having the processing target pixel is brighter than the brightness corresponding to the threshold value)), processing proceeds to step S266. In addition, in a case where it is determined at step S264 that the processing target pixel is not located in the area recognized as the subject at step S263 and cannot be estimated as a cut-out target, processing proceeds to step S266.

At step S266, the shape recognition unit 401 determines that the processing target pixel is a non-cut-out target (not a cut-out target (i.e., the processing target pixel belongs to a non-cut-out target area)). When the process at step S266 is completed, processing proceeds to step S267.

At step S267, the luminance map determination unit 171 determines whether all pixels whose determination is suspended in the process at step S146 have been processed. In a case where it is determined that there is an unprocessed pixel, processing returns to step S261 and processes thereafter are repeated. That is, a flow from step S261 to S267 is performed for each pixel whose determination is suspended in the process at step S146. Then, in a case where it is determined at step S267 that all pixels whose determination is suspended in the process at step S146 have been processed, the redetermination process ends and processing returns to FIG. 13.

By performing each process in the above-described manner, target areas for image processing can be obtained on the basis of depth information with high reliability and other information, enabling to more accurately identify image processing target areas in an image.

7. Seventh Embodiment

<Distance Measurement Scheme>

Although in the above the TOF scheme is described as an example of a distance measurement method, the distance measurement method is any. For example, a structured light scheme may be used in which a predetermined projection pattern of infrared light, etc., is projected onto a subject and by analyzing the deformation of the predetermined projection pattern, depth detection is performed.

In addition, as the distance measurement method, a stereo matching scheme may be used in which depth detection is performed using the parallax of a captured image. In addition, as the distance measurement method, an SfM scheme may be used in which using a plurality of captured images which are captured from different angles, a relationship between the images such as alignment of feature points is computed to perform optimization, by which depth detection is performed.

In the case of the stereo matching scheme and the SfM scheme, the sensor unit 112 may include a plurality of image sensors. In that case, the distance measurement unit 142 performs distance measurement using captured images (i.e., a plurality of captured images) obtained by the plurality of image sensors, and generates depth information and reliability information.

Note that in the case of performing distance measurement using a plurality of captured images (particularly, in the case of the stereo matching scheme), since infrared light is not used, a reduction in the reliability of depth information depending on how infrared light is reflected is less likely to occur like TOF, etc. Therefore, in this case, the reliability of depth information is less likely to be influenced by a material, etc., compared to the case of a distance measurement scheme using infrared light. However, since occlusion is likely to occur, the reliability of depth information is likely to decrease in a portion in which occlusion occurs. As such, there is a possibility that distributions of depth information and its reliability information may change according to the characteristics of distance measurement schemes.

However, in detection of cut-out target areas of the present technology, only portions with high reliability of depth information are adopted, and for portions with low reliability, other information is adopted. Thus, regardless of the distance measurement scheme, a desired portion in an image can be more accurately cut out (less likely to be influenced by changes in the distributions of depth information and its reliability information by distance measurement schemes).

Note, however, that for a method for a redetermination process, a method according to (more appropriate to) the characteristics of a distance measurement scheme may be adopted. For example, in general, occlusion is likely to occur in a boundary portion of a subject serving as a cut-out target (near a boundary between a subject portion and a background portion), and is also likely to occur in a portion that is not a dark portion. That is, in this case, there is a possibility that the reliability of depth information may decrease regardless of luminance. Therefore, in the case of performing distance measurement using a plurality of captured images like the stereo matching scheme, etc., a redetermination process may be performed on the basis of color information like the example described with reference to FIGS. 17 to 20, instead of being performed on the basis of luminance information.

In addition, it is, of course, possible to use a plurality of types of distance measurement schemes in combination. In that case, the distance measurement unit 142 may perform a process taking into account the characteristics of each distance measurement method so as to compensate for each other's drawbacks, and thereby generate optimal (more accurate) depth information and reliability information.

<Image Processing>

Image processing to which the present technology is applied can be performed on any image. For example, an image other than a captured image like an artificially created image like a computer graphics image can be used as a target for image processing to which the present technology is applied.

In addition, an image serving as a cut-out target is any, and for example, an image other than an image of a person such as an article may serve as a cut-out target. In addition, a single or a plurality of images serving as a cut-out target (s) may be included in a captured image.

In addition, an image serving as a target for image processing to which the present technology is applied may be a still image or a moving image. In the case of a moving image being a target, image processing to which the present technology is applied is performed on each frame image of the moving image. Image processing to which the present technology is applied can be implemented by simple processes such as creation of maps and determination processes, and does not require a process with a heavy load or large processing time like complex computation, etc. Therefore, in image processing to which the present technology is applied, even in the case of a moving image being a processing target, each frame can be processed instantly (in real time) without failure (image processing is delayed with respect to the frame rate of the moving image and ends up not being able to be performed).

In addition, in that case, a redetermination process by the redetermination unit 164 may be performed on the basis of information (e.g., luminance, color, etc.) regarding a frame image other than a processing target frame image (e.g., an image of a frame earlier in time than a processing target frame).

In addition, although the first to sixth embodiments describe examples of other information used for redetermination, the other information may be any information as long as the information is other than depth information. That is, of course, possible to use information other than those in the examples described in the first to sixth embodiments.

In addition, for a method for redetermination (and other information used for the redetermination), a plurality of methods (and a plurality of pieces of information) may be combined. How to combine them is any.

For example, a method in which a redetermination is made on the basis of a hairstyle model which is described in the fourth embodiment may be used in combination with a method in which a redetermination is made on the basis of a color map, instead of a method in which a redetermination is made on the basis of a luminance map. Likewise, a method in which a redetermination is made on the basis of a texture model which is described in the fifth embodiment may be used in combination with a method in which a redetermination is made on the basis of a color map. Likewise, a method in which a redetermination is made on the basis of shape recognition which is described in the sixth embodiment may be used in combination with a method in which a redetermination is made on the basis of a color map.

In addition, three or more of the methods described in the first to sixth embodiments may be used in combination. Furthermore, the methods described in the first to sixth embodiments may be used in combination with other methods.

Furthermore, the redetermination unit 164 may be allowed to select any method from among a plurality of methods. For example, a method for redetermination may be allowed to be changed depending on a processing target area. The above-described methods have different characteristics. That is, a given method may be suitable for some images but not for some images. For example, if an area is such that a subject portion and other portions have a large difference in luminance, it is highly likely that a method based on a luminance map is suitable (cut-out target areas can be more accurately determined). In addition, if an area is such that a subject portion and other portions have a large difference in color, it is highly likely that a method based on a color map is suitable (cut-out target areas can be more accurately determined). Therefore, by allowing the redetermination unit 164 to select a more appropriate method (a method by which cut-out target areas can be more accurately determined) according to the feature of an image of a processing target area, cut-out target areas can be more accurately determined.

Note that although the above describes, as image processing, a process of cutting out an image of a predetermined subject portion from an image (and a process of synthesizing the image having been cut out with another image), image processing to which the present technology is applied may be any processing as long as the processing is performed on an area that is determined as a target area on the basis of depth information with high reliability, and is not limited to this example. For example, the image processing may be processing in which an image (subject) in a processing target area is detected as a tracking target, a monitoring target, etc., or may be processing in which what the subject is (e.g., whether the subject is a person, an animal, an object, etc.) is analyzed.

Whatever the image processing is, by applying the present technology, image processing target areas in an image can be more accurately identified, and thus, the image processing can be performed in a more appropriate range. For example, in the case of performing the above-described identification of a tracking target or a monitoring target, a tracking target can be more accurately detected. In addition, in the case of performing the above-described analysis of a subject, what the subject is can be more accurately analyzed.

Although the above describes a case where the present technology is applied to the imaging apparatus 100, the present technology is not limited thereto and can be applied to any apparatus. That is, image processing to which the present technology is applied can be performed by any apparatus.

For example, image processing to which the present technology is applied may be performed by an apparatus that does not have an imaging function like the one provided to the imaging apparatus 100. In addition, for example, image processing to which the present technology is applied may be performed by apparatuses having functions other than a function provided to the imaging apparatus 100. For example, image processing to which the present technology is applied may be performed by image processing apparatuses that perform image processing, electronic devices such as AV devices and home appliances for an everyday life, information processing apparatuses such as servers and personal computers, portable information processing terminals such as tablet terminals and smartphones, communication apparatuses such as mobile phones, LAN devices, and wireless communication devices, etc. Of course, image processing to which the present technology is applied may be performed by apparatuses other than those described above.

<System>

In addition, image processing to which the present technology is applied may be performed by a plurality of apparatuses. For example, some processes of image processing to which the present technology is applied may be performed by a first apparatus, and other processes of the image processing to which the present technology is applied may be performed by a second apparatus. Namely, the present technology can be applied not only to an apparatus but also to a system including a plurality of apparatuses.

Figure 30:
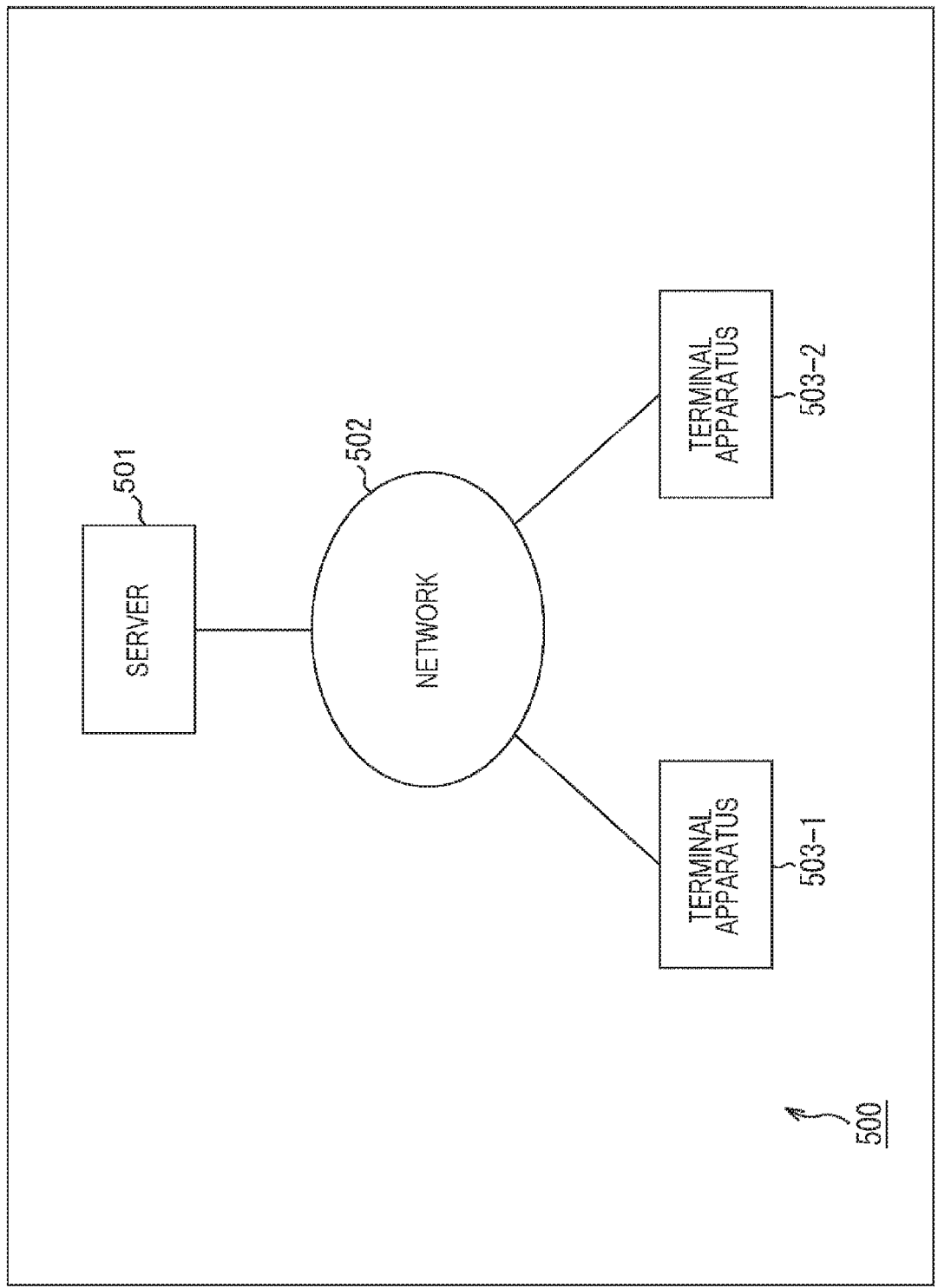
FIG. 30 is a block diagram showing an exemplary main configuration of an image processing system.

FIG. 30 is a block diagram showing an exemplary main configuration of an image processing system to which the present technology is applied. An image processing system 500 shown in FIG. 30 is a system that processes images, and includes a server 501, a terminal apparatus 503-1, and a terminal apparatus 503-2. These apparatuses are connected to a network 502 by wired communication or wireless communication or by both.

The network 502 is any communication network, and may be a communication network by wired communication or may be a communication network by wireless communication, or may include both. In addition, the network 502 may include a single communication network or may include a plurality of communication networks. For example, the network 502 may include communication networks and communication channels of any communication standard such as wide area communication networks for wireless mobile units such as the Internet, a public telephone network, and so-called 3G and 4G networks, wireless communication networks that perform communication conforming to the wide area network (WAN), local area network (LAN), and Bluetooth (registered trademark) standards, communication channels for near field communication such as near field communication (NFC), communication channels for infrared communication, and communication networks by wired communication conforming to standards such as high-definition multimedia interface (HDMI) (registered trademark) and universal serial bus (USB).

The server 501, the terminal apparatus 503-1, and the terminal apparatus 503-2 are connected to each other in a communicable manner through the network 502, and give and receive image data to/from each other. The server 501 provides services regarding image processing to the terminal apparatus 503-1 and the terminal apparatus 503-2. The terminal apparatus 503-1 and the terminal apparatus 503-2 operate as clients, and receive services regarding image processing from the server 501. In a case where the terminal apparatus 503-1 and the terminal apparatus 503-2 do not need to be distinguished from each other for description, the terminal apparatus 503-1 and the terminal apparatus 503-2 are referred to as terminal apparatuses 503. Although FIG. 30 shows that the image processing system 500 includes two terminal apparatuses 503, the number of terminal apparatuses 503 included in the image processing system 500 is any.

In such an image processing system 500, for example, the imaging apparatus 100 may be applied as a terminal apparatus 503, and a synthetic image which is created by performing image processing as described above may be sent from the terminal apparatus 503 to the server 501. In addition, the terminal apparatus 503 may perform a part of the above-described image processing, and the server 501 may perform the remaining processes.

For example, the terminal apparatus 503 may perform the processes of the digital signal processor 141 to the area division unit 143 and transmit a processing target image (captured image), a depth information map, a reliability map, a luminance map, etc. to the server 501, and the server 501 may perform the processes of the determination unit 144 and the image treatment unit 145. In addition, for example, the terminal apparatus 503 may perform the processes of the digital signal processor 141 to the determination unit 144, and the server 501 may perform the process of the image treatment unit 145. Of course, which processes are to be performed by the terminal apparatus 503 and by the server 501 is arbitrarily determined and is not limited to the above-described examples.

In addition, the process of the determination unit 144 may be performed by a plurality of apparatuses. For example, the terminal apparatus 503 may perform the processes of the reliability determination unit 161 to the area determination unit 163, and the server 501 may perform the processes of the redetermination unit 164 and the cut-out target map creation unit 165. Of course, which processes are to be performed by the terminal apparatus 503 and by the server 501 is arbitrarily determined and is not limited to the above-described example.

In addition, the terminal apparatus 503 may transfer a processing target image (captured image) to the server 501, and the server 501 may perform all of those image processing (all processes of the digital signal processor 141 to the image treatment unit 145).

Note that a terminal apparatus 503 may transfer an image, etc., to another terminal apparatus 503 without through the server 501. There may be one or a plurality of another terminal apparatuses 503 which are the transfer destinations. Then, as in the above-described case of the server 501, the terminal apparatus 503 (e.g., the terminal apparatus 503-1) which is the transfer source may perform a part of the above-described image processing, and another terminal apparatus 503 (e.g., the terminal apparatus 503-2) which is the transfer destination may perform the remaining processes. Which processes are to be performed by which terminal apparatus 503 is arbitrarily determined as in the case of the server 501.

<Use Cases>

Image processing of the present technology can be applied to any processing.

For example, the present technology can be applied to image processing in which upon relaying a live broadcasting site, a different moving image is displayed on a background portion which is other than a person. For example, the present technology can be applied to image processing in which, though relaying is performed from one's room, by showing video of a southern island in the background, a presentation as if the relaying were performed from the southern island is provided.

A service for a live broadcasting site will be described using the image processing system 500 of FIG. 30 as an example. For example, the server 501 provides a live broadcasting site in which the server 501 delivers moving images supplied from the terminal apparatuses 503, and the terminal apparatus 503-1 captures a subject (person) and transfers (uploads) a moving image of the subject (person) to the server 501, and the terminal apparatus 503-2 obtains and plays back (displays) the moving image delivered by the server 501.

In such a system, for example, the terminal apparatus 503-1 cuts out an image of a person from each frame of a captured image in which the person is captured, and uploads a moving image in which video of a southern island is synthesized as the background to the server 501. The server 501 delivers the uploaded moving image. The terminal apparatus 503-2 receives and displays the moving image. That is, on the terminal apparatus 503-2 is displayed a moving image in which the video of a southern island is synthesized as the background with the cut-out image of the person. By such image processing, a presentation as if the relaying were performed from the southern island can be provided. Of course, any image can be synthesized as the background and thus a desired presentation can be provided.

At that time, by performing image processing to which the present technology is applied, it becomes possible to more accurately cut out a desired portion in an image. For example, it becomes possible to more accurately cut out an image of a person and synthesize the image with a background image. Thus, video with a more natural synthesis result can be delivered. That is, more realistic video can be delivered. As described above, image processing to which the present technology is applied can process a moving image in real time, and thus, can be performed without failure in such relaying of a live broadcasting site, too. Note that image processing for this case may be performed by any apparatus. For example, the image processing may be performed by the terminal apparatus 503-1, or may be performed by the server 501, or may be performed by both.

In addition, for example, the present technology can be applied to image processing in which upon relaying a live broadcasting site, a background portion other than a person is made blurred. For example, the present technology can be applied to image processing in which, though relaying is performed from one's room, by making a background portion blurred (by making edges or boundaries between the shades of color blurred), only a person is made more impressively stand out.

For example, the terminal apparatus 503-1 uploads to the server 501 a moving image in which an image of a person is cut out from each frame of a captured image, only an image of a background portion is made blurred, and the image of the person having been cut out is synthesized with the blurred image of the background portion. The server 501 delivers the uploaded moving image. The terminal apparatus 503-2 receives and displays the moving image. That is, on the terminal apparatus 503-2 is displayed the moving image in which only the background portion is blurred. By such image processing, only the person can be made impressively stand out.

At that time, by performing image processing to which the present technology is applied, it becomes possible to more accurately cut out a desired portion in an image. For example, it becomes possible to more accurately cut out an image of a person. That is, an area to be blurred can be made more accurate (a portion other than a person can be more accurately blurred). Therefore, video in which only a person is more accurately made impressively standout can be delivered. As described above, image processing to which the present technology is applied can process a moving image in real time, and thus, can be performed without failure in such relaying of a live broadcasting site, too. Note that image processing for this case may be performed by any apparatus. For example, the image processing may be performed by the terminal apparatus 503-1, or may be performed by the server 501, or may be performed by both.

In addition, for example, the present technology can be applied to image processing in which in collaborative broadcasting with two or more people in a live broadcasting site or in a real-time moving image communication service with a small number of people, images obtained by cutting out only people from captured images of respective users are synthesized on the same screen. For example, images obtained by cutting out only people which are three users present at remote places are synthesized on an image of a conference room, by which a presentation as if the users were talking in the same conference room can be provided.

The real-time moving image communication service is, for example, a service provided in a so-called chat service or a communication service by communication through the network 502 such as a video conferencing system. The real-time moving image communication service will be described using the image processing system 500 of FIG. 30 as an example. For example, the server 501 provides communication services such as a chat service and a real-time moving image communication service, to the terminal apparatus 503-1 and the terminal apparatus 503-2. When the terminal apparatus 503-1 and the terminal apparatus 503-2 upload captured images in which users are captured to the server 501, the server 501 synthesizes the images and supplies a synthetic image to the terminal apparatus 503-1 and the terminal apparatus 503-2, and the terminal apparatus 503-1 and the terminal apparatus 503-2 each obtain and display the synthetic image.

In such a system, for example, the server 501 cuts out images of the users from each frame of each image supplied from the terminal apparatus 503-1 and the terminal apparatus 503-2, and synthesizes the images with video of a background. The server 501 supplies a moving image of the thus created synthetic image to the terminal apparatus 503-1 and the terminal apparatus 503-2. On the terminal apparatus 503-1 and the terminal apparatus 503-2 is displayed the synthetic image. Therefore, the users of the terminal apparatus 503-1 and the terminal apparatus 503-2 can communicate with each other as if they were meeting at the same location.

At that time, by performing image processing to which the present technology is applied, it becomes possible to more accurately cut out a desired portion in an image. For example, it becomes possible to more accurately cut out an image of a person and synthesize the image with a background image. Therefore, video with a more natural synthesis result can be delivered. That is, more realistic video can be delivered. As described above, image processing to which the present technology is applied can process a moving image in real time, and thus, can be performed without failure in such a real-time moving image communication service, too. Note that image processing for this case may be performed by any apparatus. For example, the image processing may be performed by the server 501, or may be performed by both the server 501 and the terminal apparatuses 503. For example, each terminal apparatus 503 may perform cutting out of an image of a user, and the server 501 may perform synthesizing of the images of the users having been cut out with a background image.

In addition, for example, the present technology can be applied to image processing in which in a moving image delivery service that uploads a captured image of a user singing in a karaoke room to a server and delivers the captured image, an image obtained by cutting out only a user portion from the captured image is synthesized with a predetermined background image. For example, the image obtained by cutting out the user portion is synthesized with video of a concert of an artist of that song, by which a presentation as if the user were singing right next to a vocalist, as a member of the band can be provided.

Such a moving image delivery service will be described using the image processing system 500 of FIG. 30 as an example. For example, the terminal apparatus 503-1 placed in a karaoke room uploads a captured image (moving image) in which a user singing is captured to the server 501. The server 501 provides a delivery or download service for the moving image. For example, the terminal apparatus 503-2 obtains the moving image (the moving image of the user singing) from the server 501 and displays the moving image.

In such a system, for example, the terminal apparatus 503-1 cuts out a user portion from each frame of the captured image (moving image) in which the user singing is captured, and synthesizes the image having been cut out with artist's concert video. Then, the terminal apparatus 503-1 uploads the synthetic image (moving image) to the server 501. The server 501 provides a delivery or download service for the synthetic image. For example, the terminal apparatus 503-2 obtains the moving image (the synthetic image in which the moving image of the user singing is synthesized with the artist's concert video) from the server 501 and displays the moving image. Therefore, a user of the terminal apparatus 503-2 can view an image that is presented as if the user singing in the karaoke room were singing right next to a vocalist, as a member of the band.

At that time, by performing image processing to which the present technology is applied, it becomes possible to more accurately cut out a desired portion in an image. For example, it becomes possible to more accurately cut out an image of a person and synthesize the image with a background image. Therefore, video with a more natural synthesis result can be delivered. That is, more realistic video can be delivered. As described above, image processing to which the present technology is applied can process a moving image in real time, and thus, can be performed without failure in such a moving image delivery service, too. Note that image processing for this case may be performed by any apparatus. For example, the image processing may be performed by the terminal apparatus 503-1, or may be performed by the server 501, or may be performed by both.

In addition, for example, the present technology can be applied to image processing in which in a game system (or a game device) that implements a video game, a computer game, etc., an image obtained by cutting out only a user portion from a captured image of a user is synthesized with a predetermined background image. For example, an image obtained by cutting out only a user portion is synthesized with an image of a game, by which a presentation as if the user has entered a game world can be provided, enabling to improve the user's feeling of immersion. Note that the image of a game may be an image that is artificially created like a computer graphics image, or may be a photographed image.

Such a game system performs processes such as capturing of a user, accepting of a user operation, a process regarding a game for the accepted user operation, image processing such as cutting out of a user portion from the captured image, creation of an image of the game according to the process regarding the game, and synthesizing of the image of the user with the image of the game according to the process regarding the game, and displaying of the synthetic image.

Such a game system will be described using the image processing system 500 of FIG. 30 as an example. For example, with the terminal apparatus 503-1 being a computer, a game device, etc., the above-described game system may be implemented by the terminal apparatus 503-1 alone. In that case, the terminal apparatus 503-1 performs all of the above-described processes.

At that time, in cutting out of a user portion from a captured image, the terminal apparatus 503-1 performs image processing to which the present technology is applied, by which it becomes possible to more accurately cut out a desired portion in the image. That is, for example, it becomes possible to more accurately cut out an image of the user and synthesize the image of the user with an image of a game. Therefore, video with a more natural synthesis result can be displayed as an image of the game. That is, more realistic video can be displayed. By this, the user's feeling of immersion can be further improved. As described above, image processing to which the present technology is applied can process a moving image in real time, and thus, can be performed without failure in such a game system, too.

In addition, for example, a game system may be implemented in which the server 501 provides the terminal apparatus 503-1 with a game, and a user of the terminal apparatus 503-1 plays the game by operating the terminal apparatus 503-1. In this case, too, in cutting out of a user portion from a captured image, by performing image processing to which the present technology is applied, it becomes possible to more accurately cut out a desired portion in the image. That is, more realistic video can be displayed and the user's feeling of immersion can be further improved. Of course, image processing to which the present technology is applied can process a moving image in real time, and thus, can be performed without failure in this case, too. Note that image processing for this case may be performed by the terminal apparatus 503-1, or may be performed by the server 501, or may be performed by both.

Furthermore, for example, users of the terminal apparatus 503-1 and the terminal apparatus 503-2 may play the same game by the terminal apparatus 503-1 and the terminal apparatus 503-2 communicating with each other without through the server 501. In this case, too, in cutting out of user portions from captured images, by performing image processing to which the present technology is applied, it becomes possible to more accurately cut out desired portions in the images. That is, more realistic video can be displayed and the users' feeling of immersion can be further improved. Note that, in this case, images of a plurality of users may be synthesized with the same image of the game or may be synthesized with different images. Of course, image processing to which the present technology is applied can process a moving image in real time, and thus, can be performed without failure in this case, too. Note that image processing for this case may be performed by any apparatus. For example, the image processing may be performed by the terminal apparatus 503-1, or may be performed by the terminal apparatus 503-2, or may be performed by both.

In addition, for example, the users of the terminal apparatus 503-1 and the terminal apparatus 503-2 may play the same game by the terminal apparatus 503-1 and the terminal apparatus 503-2 communicating with each other through the server 501. Note that image processing for this case may be performed by any apparatus. For example, the image processing may be performed by the terminal apparatus 503-1, or may be performed by the terminal apparatus 503-2, or may be performed by the server 501, or may be performed by a plurality of apparatuses among them, or may be performed by all.

In addition, upon a user practicing while watching a dance moving image, the user may be synthesized to be located right next to a model dancer in the dance moving image so that the user can dance while comparing him/herself with the model dancer.

This case will be described using the image processing system 500 of FIG. 30 as an example. For example, the terminal apparatus 503-1 displays a moving image of dancing which serves as a model. Data of the moving image may be stored in the terminal apparatus 503-1 (or a removable medium set on the terminal apparatus 503-1) or may be transmitted from another apparatus such as the server 501 or the terminal apparatus 503-2. The user of the terminal apparatus 503-1 dances, copying the dance of a dancer in the moving image serving as a model. The terminal apparatus 503-1 captures the user dancing.

Such a captured image of the user is subjected to image processing such as cutting out of a user portion from the captured image and synthesizing of the image of the user having been cut out with the moving image serving as a model such that, for example, the user is located next to a model dancer.

The terminal apparatus 503-1 displays a synthetic image of the image of the user and the image serving as a model that have been thus subjected to the image processing.

In such image processing, by performing image processing to which the present technology is applied, it becomes possible to more accurately cut out a desired portion in an image. That is, for example, it becomes possible to more accurately cut out an image of a user and synthesize the image with an image of a model. Therefore, video with a more natural synthesis result can be displayed. That is, more realistic video can be displayed. As described above, image processing to which the present technology is applied can process a moving image in real time, and thus, can be performed without failure in such a game system, too. Note that image processing for this case may be performed by any apparatus. For example, the image processing may be performed by the terminal apparatus 503, or may be performed by the server 501, or may be performed by both.

In addition, upon selling user's stuff on an auction site, when a picture of the item is taken, only the item may be cut out so as to effectively show the item. For example, in the case of taking a picture of a dress, the user performs capturing without caring about the background and synthesizes the captured image with a stylish wallpaper or a picture of a closet later on, by which a more appealing promotion picture can be created.

This case will be described using the image processing system 500 of FIG. 30 as an example. For example, the server 501 implements an auction site. The auction site provides a service for auctioning off an article, etc., provided by a user of a terminal apparatus 503. At that time, the terminal apparatus 503 provides the server 501 with information regarding the article, such as an image (a promotion picture) of the article. Users of other terminal apparatuses 503 who participate in the auction for the article refer to the information (a promotion picture, etc.) regarding the article that is auctioned off on the auction site, decide bids, and bid on the article. The server 501 gives any one of the users having bid (e.g., a user having bid at the highest price) the right to purchase the article.

The user of the terminal apparatus 503 who auctions off his/her article generally wants to present the article in a manner such that the article looks good quality (expensive), so that bids are taken at a higher price. For example, a promotion picture that is presented as if the article were good quality is desired. Hence, upon registering the promotion picture, upon, image processing may be performed in which an article portion is cut out from a captured image of an article to be auctioned off, and the image having been cut out is synthesized with a desired image. By doing so, a background image of the promotion picture can be changed from the actual image to an image that makes the article look better quality.

In such image processing, by performing image processing to which the present technology is applied, it becomes possible to more accurately cut out a desired portion in an image. That is, for example, it becomes possible to more accurately cut out an image of an article and synthesize the image of an article with a desired image. Therefore, an image with a more natural synthesis result can be created. That is, a promotion picture can be presented in a manner such that the article looks better quality (more expensive). Note that as shown in this example, an image serving as a cut-out target is any and the image is not limited to an image of a person, for example, like an article, etc.

Image processing for this case may be performed by any apparatus. For example, the image processing may be performed by the terminal apparatus 503, or may be performed by the server 501, or may be performed by both.

Of course, image processing to which the present invention can be applied is not limited to the above-described examples.

<Software>

The above-described series of processes can be performed by hardware and can be performed by software. In the case of performing the above-described series of processes by software, for example, the imaging apparatus 100, the server 501, or the terminal apparatus 503 has a configuration of a computer that can execute the software. The computer includes, for example, a computer that is built in dedicated hardware, a general-purpose computer capable of performing arbitrary functions by installing various types of programs, etc.

Figure 31:
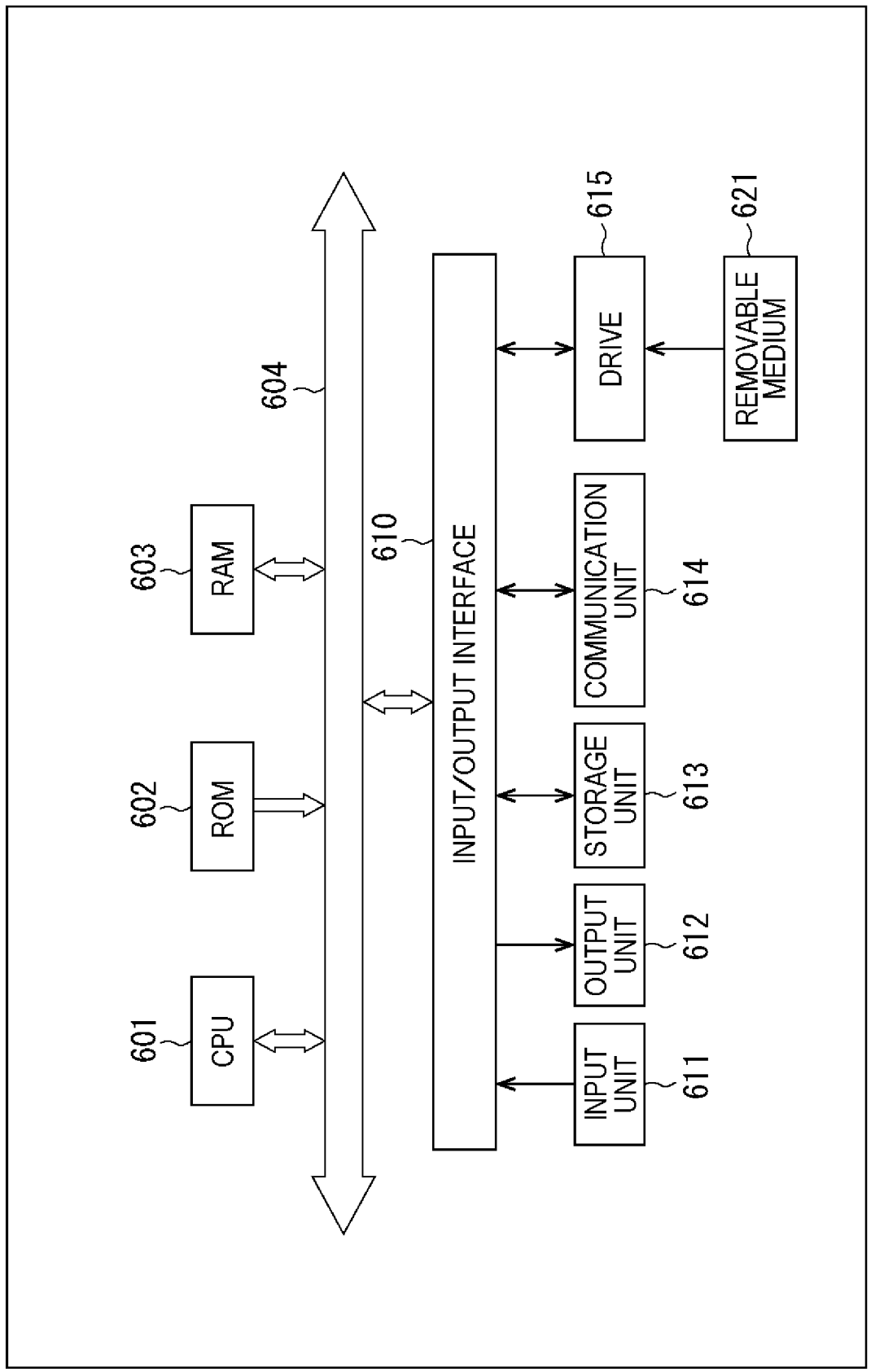
FIG. 31 is a block diagram showing an exemplary main configuration of a server and a terminal apparatus.

For example, the server 501 and the terminal apparatus 503 have a configuration such as that shown in FIG. 31. FIG. 31 is a block diagram showing an exemplary configuration of hardware of a computer that performs the above-described series of processes by a program.

In the server 501 (or the terminal apparatus 503) shown in FIG. 31, a central processing unit (CPU) 601, a read only memory (ROM) 602, and a random access memory (RAM) 603 are connected to each other through a bus 604.

An input/output interface 610 is also connected to the bus 604. To the input/output interface 610 are connected an input unit 611, an output unit 612, a storage unit 613, a communication unit 614, and a drive 615.

The input unit 611 includes arbitrary input devices, e.g., a keyboard, a mouse, a touch panel, an image sensor, a microphone, a switch, an input terminal, etc. The output unit 612 includes arbitrary output devices, e.g., a display, a speaker, an output terminal, etc. The storage unit 613 includes an arbitrary storage medium such as a nonvolatile memory like, for example, a hard disk, a RAM disk, a solid state drive (SSD), a universal serial bus (USB) memory, etc. The communication unit 614 has a wired or wireless or wired and wireless communication interface(s) of an arbitrary communication standard, e.g., Ethernet (registered trademark), Bluetooth (registered trademark), USB, high-definition multimedia interface (HDMI) (registered trademark), IrDA, etc. The drive 615 drives a removable medium 621 having an arbitrary storage medium such as a magnetic disc, an optical disc, a magneto-optical disc, or a semiconductor memory.

In the computer configured in the above-described manner, the CPU 601 loads a program stored in, for example, the storage unit 613 into the RAM 603 through the input/output interface 610 and the bus 604 and executes the program, and thereby performs the above-described series of processes. The RAM 603 also stores, as appropriate, data required for the CPU 601 to perform various types of processes, etc.

The program executed by the computer is provided recorded in, for example, a recording medium which is a package medium, etc.

For example, in the case of the imaging apparatus 100 of FIG. 1, the recording medium is configured by the removable medium 131 separately from an apparatus main body, the removable medium 131 recording the program and being distributed to deliver the program to a user. In that case, for example, by placing the removable medium 131 into the drive 125, the program stored in the removable medium 131 can be read and installed in the storage unit 123.

In addition, for example, in the case of the server 501 and the terminal apparatus 503 of FIG. 31, the recording medium is configured by the removable medium 621 separately from an apparatus main body, the removable medium 621 recording the program and being distributed to deliver the program to a user. In that case, for example, by placing the removable medium 621 into the drive 615, the program stored in the removable medium 621 can be read and installed in the storage unit 613.

In addition, the program can also be provided through a wired or wireless transmission medium such as a local area network, the Internet, or digital satellite broadcasting. For example, in the case of the imaging apparatus 100 of FIG. 1, the program is received by the communication unit 124 and can be installed in the storage unit 123. In addition, for example, in the case of the server 501 and the terminal apparatus 503 of FIG. 31, the program is received by the communication unit 614 and can be installed in the storage unit 613.

In addition to the above, the program can also be installed in advance in a storage unit, a ROM, etc. For example, in the case of the imaging apparatus 100 of FIG. 1, the program can also be installed in advance in the storage unit 123, a ROM included in the image processor 113 or the control unit 115, etc. In addition, for example, in the case of the server 501 and the terminal apparatus 503 of FIG. 31, the program can also be installed in advance in the storage unit 613, the ROM 602, etc.

Note that the program executed by the computer may be a program in which processes are chronologically performed in the order described in the present specification, or a program in which processes are performed parallelly or at necessary timing such as when a call is made.

In addition, in the present specification, steps that describe the program recorded in the recording medium include, of course, processes that are chronologically performed in the order described, and also include processes that are not always processed chronologically but are performed parallelly or individually.

In addition, a process at each of the above-described steps can be performed by each of the above-described apparatuses or by any apparatus other than the above-described apparatuses. In that case, an apparatus that performs the process has the above-described function (a functional block, etc.) required to perform the process. In addition, information required for the process is transmitted to the apparatus, as appropriate.

<Others>

In addition, in the present specification, a system refers to a set of a plurality of components (apparatuses, modules (parts), etc.), and it does not matter whether all components are present in the same casing. Therefore, a plurality of apparatuses that are accommodated in different casings and are connected to each other through a network, and a single apparatus having a plurality of modules accommodated in a single casing are both a system.

In addition, a configuration that is described above as a single apparatus (or processor) may be divided and formed as a plurality of apparatuses (or processors). Reversely, configurations that are described above as a plurality of apparatuses (or processors) may be put together and formed as a single apparatus (or processor). In addition, it is, of course, possible to add configurations other than those described above to a configuration of each apparatus (or each processor). Furthermore, as long as the configuration and operation of the entire system are substantially the same, a part of a configuration of a given apparatus (or processor) may be included in a configuration of another apparatus (or another processor).

Although preferred embodiments of the present disclosure have been described in detail above with reference to the accompanying drawings, the technical scope of the present disclosure is not limited to such examples. It is obvious that a person with average knowledge of the technical field of the present disclosure can come up with various examples of changes or modifications within the scope of the technical idea described in the claims, and it is to be understood that those examples of changes or modifications also fall within the technical scope of the present disclosure as a matter of course.

For example, the present technology can adopt a configuration of cloud computing in which one function is processed by a plurality of apparatuses through a network in a sharing and cooperative manner.

In addition, each step described in the above-described flowcharts can be performed not only by a single apparatus but also by a plurality of apparatuses in a sharing manner.

Furthermore, in a case where one step includes a plurality of processes, the plurality of processes included in the one step can be performed not only by a single apparatus but also by a plurality of apparatuses in a sharing manner.

<Examples of Use>

Figure 32:
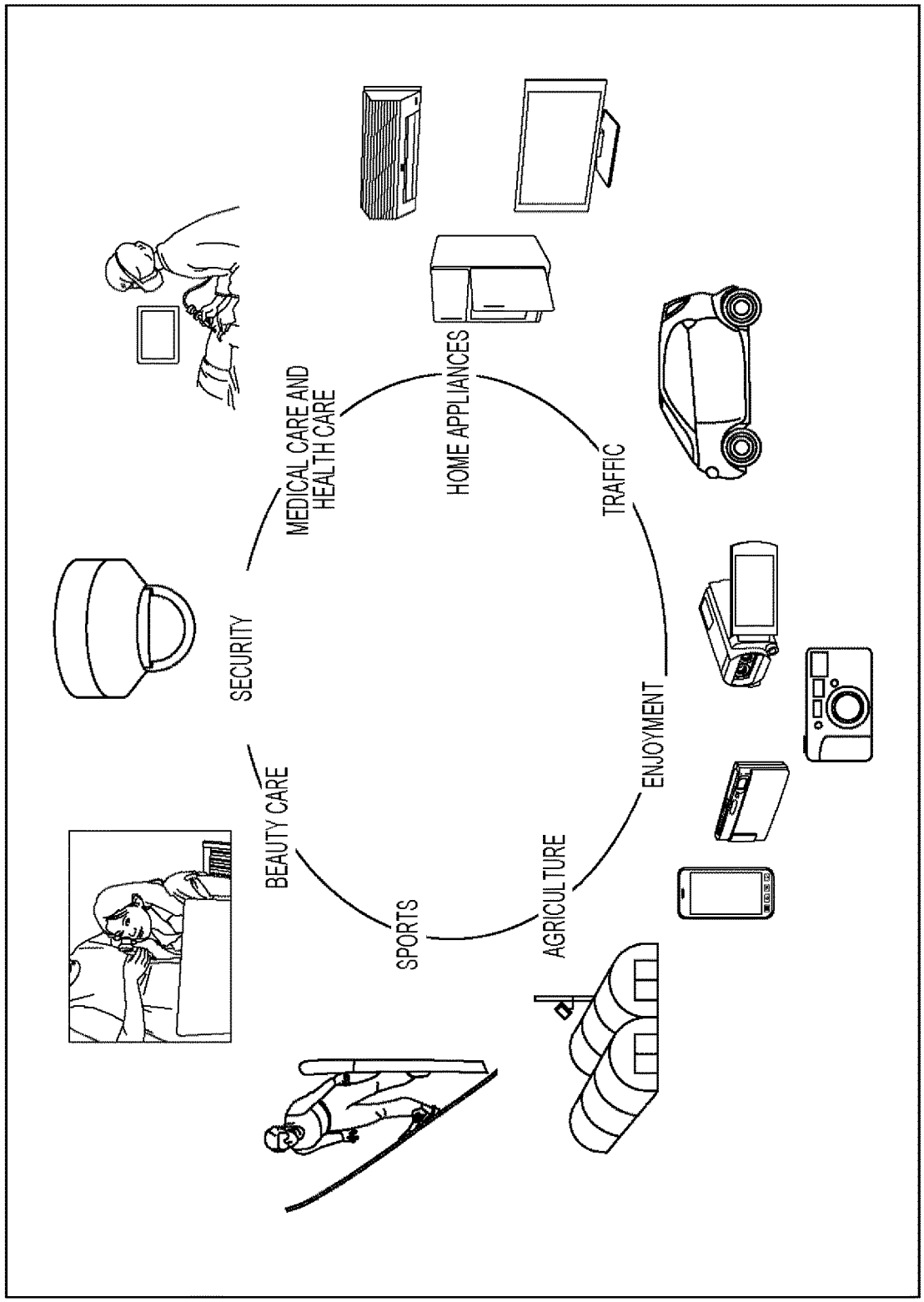
FIG. 32 is a diagram describing examples of use.

As in examples shown in FIG. 32, the present technology can be used in apparatuses and systems in various fields.

Apparatuses and systems that capture images provided for enjoyment, such as a digital camera, a system using the digital camera, a portable device with a camera function, and a system using the portable device Apparatuses and systems provided for traffic, such as a vehicle-mount electronic device that captures areas in front of, behind, around, and inside an automobile, etc., for safe driving such as automatic stop, recognition of the state of a driver, etc., a system using the electronic device, a surveillance camera that monitors traveling vehicles and roads, a surveillance system using the surveillance camera, a distance measuring apparatus that measures a distance between vehicles, etc., and a system using the distance measuring apparatus Apparatuses and systems provided in home appliances such as a TV, a refrigerator, and an air conditioner in order to capture a user's gesture and perform a device operation according to the gesture Apparatuses and systems provided for medical care and health care, such as an endoscope, a system using the endoscope, an apparatus that captures blood vessels by reception of infrared light, and a system using the apparatus Apparatuses and systems provided for security, such as a surveillance camera for a crime prevention purpose, a system using the surveillance camera, a camera for a person recognition purpose, and a system using the camera Apparatuses and systems provided for beauty care, such as a skin measuring device that captures skin, a system using the skin measuring device, a microscope that captures scalp, and a system using the microscope Apparatuses and systems provided for sports, such as an action camera for sport applications, etc., a system using the action camera, a wearable camera, and a system using the wearable camera Apparatuses and systems provided for agriculture, such as a camera for monitoring the states of a field and crops and a system using the camera Note that embodiments of the present technology are not limited to those described above, and various changes may be made thereto without departing from the spirit and scope of the present technology. For example, the present technology is not limited to an apparatus and a system on which the above-described determination unit 144 is mounted or a manufacturing apparatus and a manufacturing method for the apparatus and system, and can also be implemented as various configurations on which the above-described determination unit 144 is mounted, e.g., a processor serving as a system large scale integration (LSI), etc., a module using a plurality of processors, etc., a unit using a plurality of modules, etc., a set in which other functions are further added to a unit, etc., or a manufacturing apparatus and a manufacturing method for manufacturing those configurations.

Note that the present technology can also adopt configurations such as those shown below.

(1) An image processing apparatus including
a determination unit that determines, on the basis of reliability information indicating reliability of depth information, whether to make a determination on the basis of the depth information, the determination being as to whether an area is a target area for predetermined image processing, and the depth information indicating a depth of an image.

(2) The image processing apparatus according to (1), in which the determination unit determines, on the basis of the depth information, whether an area whose reliability of depth information is higher than a predetermined threshold value is a target area for the image processing.

(3) The image processing apparatus according to (2), in which the determination unit determines that an area whose depth is nearer than a predetermined threshold value is a target area for the image processing.

(4) The image processing apparatus according to any one of (1) to (3), in which the determination unit determines, on the basis of other information different than the depth information, whether an area whose reliability of depth information is not higher than a predetermined threshold value is a target area for the image processing.

(5) The image processing apparatus according to (4), in which the determination unit determines whether the area is a target area for the image processing, on the basis of luminance information indicating a luminance of the image, the luminance information being used as the other information.

(6) The image processing apparatus according to (5), in which the determination unit determines that an area whose luminance is lower than a predetermined threshold value is a target area for the image processing.

(7) The image processing apparatus according to (6), in which the determination unit determines that an area having a luminance lower than the predetermined threshold value and adjacent to another target area for the image processing is a target area for the image processing.

(8) The image processing apparatus according to any one of (4) to (7), in which the determination unit determines whether the area is a target area for the image processing, on the basis of color information indicating a color of the image, the color information being used as the other information.

(9) The image processing apparatus according to (8), in which the determination unit determines that an area whose color difference from a neighboring target area for the image processing is smaller than a predetermined threshold value is a target area for the image processing.

(10) The image processing apparatus according to any one of (4) to (9), in which the determination unit determines, on the basis of hairstyle model data representing a hairstyle model, that an area belonging to a hair area in the hairstyle model is a target area for the image processing, the hairstyle model data being used as the other information.

(11) The image processing apparatus according to any one of (4) to (10), in which the determination unit determines, on the basis of texture model data representing a texture model, that an area whose texture is similar to the texture model is a target area for the image processing, the texture model data being used as the other information.

(12) The image processing apparatus according to any one of (4) to (11), in which the determination unit recognizes a shape of a subject belonging to the cut-out target area and determines that an area that can be estimated as a target for the image processing on the basis of the shape of the subject is a target area for the image processing, the shape of the subject being recognized as the other information.

(13) The image processing apparatus according to any one of (1) to (12), in which the determination unit determines, on a per single or plurality of pixels basis, whether to make the determination on the basis of the depth information, the determination being as to whether the area is a target area for the image processing.

(14) The image processing apparatus according to any one of (1) to (13), in which the determination unit creates an image processing target map indicating a distribution of determination results as to whether areas are target areas for the image processing.

(15) The image processing apparatus according to any one of (2) to (14), further including a setting unit that sets the threshold values.

(16) The image processing apparatus according to any one of (1) to (15), further including an imaging unit that creates the image by capturing a subject.

(17) The image processing apparatus according to any one of (1) to (16), further including
a generating unit that generates the depth information and the reliability information.

(18) The image processing apparatus according to any one of (1) to (17), further including
a treatment unit that performs, as the image processing, cutting out of the target area for the image processing from the image on the basis of a determination result obtained by the determination unit, and synthesizing of the image having been cut out with another image to create a synthetic image.

(19) The image processing apparatus according to (18), further including
a sending unit that sends the synthetic image created by the treatment unit to another apparatus.

(20) An image processing method including
determining, on the basis of reliability information indicating reliability of depth information, whether to make a determination on the basis of the depth information, the determination being as to whether an area is a target area for predetermined image processing, and the depth information indicating a depth of an image.

REFERENCE SIGNS LIST

100 Imaging apparatus
110 Bus
111 Optical unit
112 Sensor unit
113 Image processor
114 Encoding/decoding unit
115 Control unit
121 Input unit
122 Output unit
123 Storage unit
124 Communication unit
125 Drive
131 Removable medium
141 Digital signal processor
142 Distance measurement unit
143 Area division unit
144 Determination unit
145 Image treatment unit
161 Reliability determination unit
162 Depth determination unit
163 Area determination unit
164 Redetermination unit
165 Cut-out target map creation unit
171 Luminance map determination unit
172 Neighboring area determination unit
321 Cut-out target color information referring unit
322 Color determination unit
361 Hairstyle determination unit
381 Texture determination unit
401 Shape recognition unit
500 Image processing system
501 Server
502 Network
503 Terminal apparatus

The invention claimed is:

1. An image processing apparatus, comprising:
circuitry configured to:
determine reliability information and depth information for each pixel of an image, wherein the reliability information indicates reliability of the depth information, and the depth information indicates a depth of the image;
determine first pixels with reliability of the depth information greater than a first threshold value and the depth information lower than a second threshold value as first target pixels of the image;
recognize a shape of a subject in the image based on the depth information of the first target pixels;
determine second pixels with reliability of the depth information less than the first threshold value and a luminance value less than a first threshold luminance value as second target pixels of the image based on a comparison of a position of each of the second pixels with a position of an area corresponding to a hair portion of a hairstyle model superimposed with the subject in the image;
create a target map, based on the determined first target pixels and the determined second target pixels;
cut out a target area from the image based on the target map;
determine an additional area in a neighborhood of the cut out target area based on the recognized shape of the subject;
determine a luminance value of the additional area is less than a second threshold luminance value; and
add the additional area to the cut out target area based on the determination of the luminance value of the additional area.

2. The image processing apparatus according to claim 1, wherein the circuitry is further configured to determine a second pixel as a second target pixel of the image based on adjacency of the second pixel with a neighboring target pixel.

3. The image processing apparatus according to claim 1, wherein color information of the image comprises a plurality of color values.

4. The image processing apparatus according to claim 3, wherein
the circuitry is further configured to determine a second pixel as a second target pixel of the image based on a color difference value of the second pixel from a neighboring target pixel, and
the color difference value is smaller than a threshold color value.

5. The image processing apparatus according to claim 1, wherein the circuitry is further configured to determine, based on texture model data that indicates a texture model and the luminance value of a second pixel, the second pixel as a second target pixel that has texture similar to the texture model.

6. The image processing apparatus according to claim 1, wherein
the circuitry is further configured to set a plurality of threshold values, and
the plurality of threshold values includes the first threshold value and the second threshold value.

7. The image processing apparatus according to claim 1, further comprising an imaging device configured to capture the subject to create the image.

8. The image processing apparatus according to claim 1, wherein the circuitry is further configured to create a synthetic image, based on synthesis of the cut out target area with a next image.

9. The image processing apparatus according to claim 8, wherein the circuitry is further configured to transmit the synthetic image to an external apparatus.

10. An image processing method, comprising:
- determining reliability information and depth information for each pixel of an image, wherein
  - the reliability information indicates reliability of the depth information, and
  - the depth information indicates a depth of the image;
- determining first pixels with reliability of the depth information greater than a first threshold value and the depth information lower than a second threshold value as first target pixels of the image;
- recognizing a shape of a subject in the image based on the depth information of the first target pixels;
- determining second pixels with reliability of the depth information less than the first threshold value and a luminance value less than a first threshold luminance value as second target pixels of the image based on a comparison of a position of each of the second pixels with a position of an area corresponding to a hair portion of a hairstyle model superimposed with the subject in the image;
- creating a target map, based on the determined first target pixels and the determined second target pixels;
- cutting out a target area from the image based on the target map;
- determining an additional area in a neighborhood of the cut out target area based on the recognized shape of the subject;
- determining a luminance value of the additional area is less than a second threshold luminance value; and
- adding the additional area to the cut out second area based on the determination of the luminance value of the additional area.

* * * * *